United States Patent [19]
McInerney et al.

[11] Patent Number: 6,067,641
[45] Date of Patent: May 23, 2000

[54] DEMAND-BASED GENERATION OF SYMBOLIC INFORMATION

[75] Inventors: Peter J. McInerney, Cupertino; Lawrence L. You, San Jose; Michael D. Wimble, Sunnyvale, all of Calif.

[73] Assignee: Object Technology Licensing Corporation, Cupertino, Calif.

[21] Appl. No.: 09/246,789

[22] Filed: Feb. 9, 1999

Related U.S. Application Data

[63] Continuation of application No. 08/557,767, Nov. 13, 1995, Pat. No. 5,956,479.

[51] Int. Cl.[7] ............................. G06F 15/82; G06F 11/34
[52] U.S. Cl. ............................................. 714/38; 712/227
[58] Field of Search ............................. 714/38; 712/227; 707/532, 103

[56] References Cited

U.S. PATENT DOCUMENTS

| | | | |
|---|---|---|---|
| 4,821,220 | 4/1989 | Duisberg | 364/578 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |

(List continued on next page.)

OTHER PUBLICATIONS

Dumas, Joseph and Paige Parsons. "Discovering the Way Programmers Think: New Programming Environments." *Communications of the ACM*, Jun. 1995: pp. 45–56.

Pascoe, Geoffrey A. "Encapsulators: A New Software Paradigm in Smalltalk-80." *OOPSLA '86 Proceedings*, Sep. 1986: pp. 341–346.

Purtilo, James M. and Joanne M. Atlee. "Module Reuse by Interface Adaptation." *Software—Practice and Experience*, Jun. 1991: pp. 539–556.

Lam, Siman S. "Protocol Conversion." *IEEE Transactions on Software Engineering*. Mar. 1988: pp. 353–362.

Thatte, Satish R. "Automated Synthesis of Interface Adapters for Reusable Classes." *POPL '94*, Jan. 1994: pp. 174–187.

Yellin, Daniel M. and Robert E. Strom. "Interfaces, Protocols, and the Semi–Automatic Construction of Software Adaptors." *OOPSLA '94*, Oct. 1994: pp. 176–190.

Jacobson, Ivar and Fredrik Lindstrom. "Re–engineering of old systems to an object–oriented architecture." *OOPSLA '91*, pp. 340–350.

(List continued on next page.)

*Primary Examiner*—Ly V. Hua
*Attorney, Agent, or Firm*—Kudirka & Jobse LLP

[57] ABSTRACT

A human-oriented object programming system (HOOPS) and its debugger provide an interactive and dynamic modeling system to assist in the incremental generation of symbolic information of computer programs that facilitates the development of complex computer programs such as operating systems and large applications with graphic user interfaces (GUIs). A program is modeled as a collection of units called components. A component represents a single compilable language element such as a class or a function. One major functionality built in HOOPS is the debugger, using symbolic properties. The database stores the components and properties. The debugger, using a GUI, displays to the user the execution state of the program. To display the execution state in terms of the programmer's source code, the debugger demands retrieval and/or generation of the symbolic properties of the program. The compiler, which is responsible for calculating the dependencies associated with a component, uses those dependencies to generate the information stored in symbolic properties. The debugger matches versions of source and object code and retrieves source code configuration as needed. Symbolic properties that are stored in the database can be removed to reduce database and disk memory usage; they can be later reconstructed using the same method of demand-based generation of symbolic information.

8 Claims, 40 Drawing Sheets

U.S. PATENT DOCUMENTS

| | | | |
|---|---|---|---|
| 5,060,276 | 10/1991 | Morris et al. | 382/8 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,151,987 | 9/1992 | Abraham et al. | 395/575 |
| 5,181,162 | 1/1993 | Smith et al. | 364/419 |
| 5,297,284 | 3/1994 | Jones et al. | 395/700 |
| 5,315,703 | 5/1994 | Matheny et al. | 395/164 |
| 5,317,741 | 5/1994 | Schwanke | 395/700 |
| 5,325,533 | 6/1994 | McInerney et al. | 395/700 |
| 5,327,562 | 7/1994 | Adcock | 395/700 |
| 5,339,430 | 8/1994 | Lundin et al. | 395/700 |
| 5,339,438 | 8/1994 | Conner et al. | 395/700 |
| 5,361,351 | 11/1994 | Lenkov et al. | 395/704 |
| 5,408,665 | 4/1995 | Fitzgerald | 395/710 |
| 5,412,799 | 5/1995 | Papadopoulos | 395/500 |
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |
| 5,454,086 | 9/1995 | Alpert et al. | 395/568 |
| 5,513,317 | 4/1996 | Borchardt et al. | 395/183.21 |
| 5,533,192 | 7/1996 | Hanley et al. | 395/183.04 |
| 5,560,009 | 9/1996 | Lenkov et al. | 395/704 |
| 5,815,653 | 9/1998 | You et al. | 714/38 |
| 5,819,093 | 10/1998 | Davidson et al. | 395/704 |

OTHER PUBLICATIONS

Filman, Robert E. "Retrofitting Objects." *OOPSLA '87*, Oct. 1987: pp. 342–353.

Duntemann, Jeff and Chris Marinacci. "New Objects for Old Structures." *BYTE*, Apr. 1990: pp. 261–266.

Dietrich, Walter C., Lee R. Nackman and Franklin Gracer. "Saving a Legacy with Objects." *OOPSLA '89*, Oct. 1989: 77–83.

Dotts, Alan and Don Birkley. "Development of Reusable Test Equipment Software Using Smalltalk and C." *OOPSLA '92*, Oct. 1992: pp. 31–35.

Alabiso, Bruno. "Transformation of Data Flow Analysis Models to Object–Oriented Design." *OOPSLA '88*, Sep. 1988: pp. 335–353.

Madhavji, Nazim H., Jules Desharnais, Luc Pinsonneault, and Kamel Toubache. "Adapting Modules to an Integrated Programming Environment." *IEEE International Conference on Programming Languages*, 1988: pp. 364–371.

Dutt, Nikil D. "Legend: A Language for Generic Component Library Description." *IEEE International Conference on Computer Languages*, 1990: 198–207.

DATA MAP

| KEY | VARIABLE | PC LOCATION | READ FORMULA | WRITE FORMULA | OPTIMIZATION ANNOTATION | LOCATION |
|---|---|---|---|---|---|---|
| -3 | A | 0..0 | DIRECT | DIRECT | | 1(SP) |
| | | 1..1 | DIRECT | DIRECT | | 2(SP) |
| | | 2..16 | DIRECT | DIRECT | | 2(FP) |
| | | 17..17 | DIRECT | DIRECT | | 1(SP) |
| -1 | FOO | 6..6 | DIRECT | DIRECT | 1 | R1 |
| | | 8..17 | DIRECT | DIRECT | 1 | R1 |
| 1 | YES | 6..6 | DIRECT | DIRECT | 2 | R1 |
| | | 8..17 | DIRECT | DIRECT | 2 | R1 |

1. SHARED LIFETIME WITH 'YES'.
2. SHARED LIFETIME WITH 'FOO'.

FIG. 3

STATEMENT MAP

| KEY | KIND | PARENT | BREAKPOINT | SOURCE |
|---|---|---|---|---|
| 1 | DEFINITION | 11 | 2 | BOOL YES=A=='Y'; |
| 2 | IF_EXPRESSION | 10 | 9 | (YES) |
| 3 | FUNCTION_CALL | 5 | 8 | PRINTF("%C=OK\N",A); |
| 4 | RETURN | 5 | 16 | RETURN YES; |
| 5 | BLOCK | 10 | 8 | {PRINTF("%C=OK\N",A); RETURN YES;} |
| 6 | FUNCTION_CALL | 8 | 8 | PRINTF("%C=NO\N",A); |
| 7 | RETURN | 8 | 16 | RETURN YES; |
| 8 | BLOCK | 9 | 8 | {PRINTF("%C=NO\N",A); RETURN YES;} |
| 9 | IF_ELSE | 10 | 8 | ELSE{PRINTF("%C=NO\N",A); RETURN YES;} |
| 10 | IF_STATEMENT | 11 | 0 | IF(YES){...}ELSE{...} |
| 11 | FUNCTION | 0 | 0 | INT FOO(CHAR A) {...} |

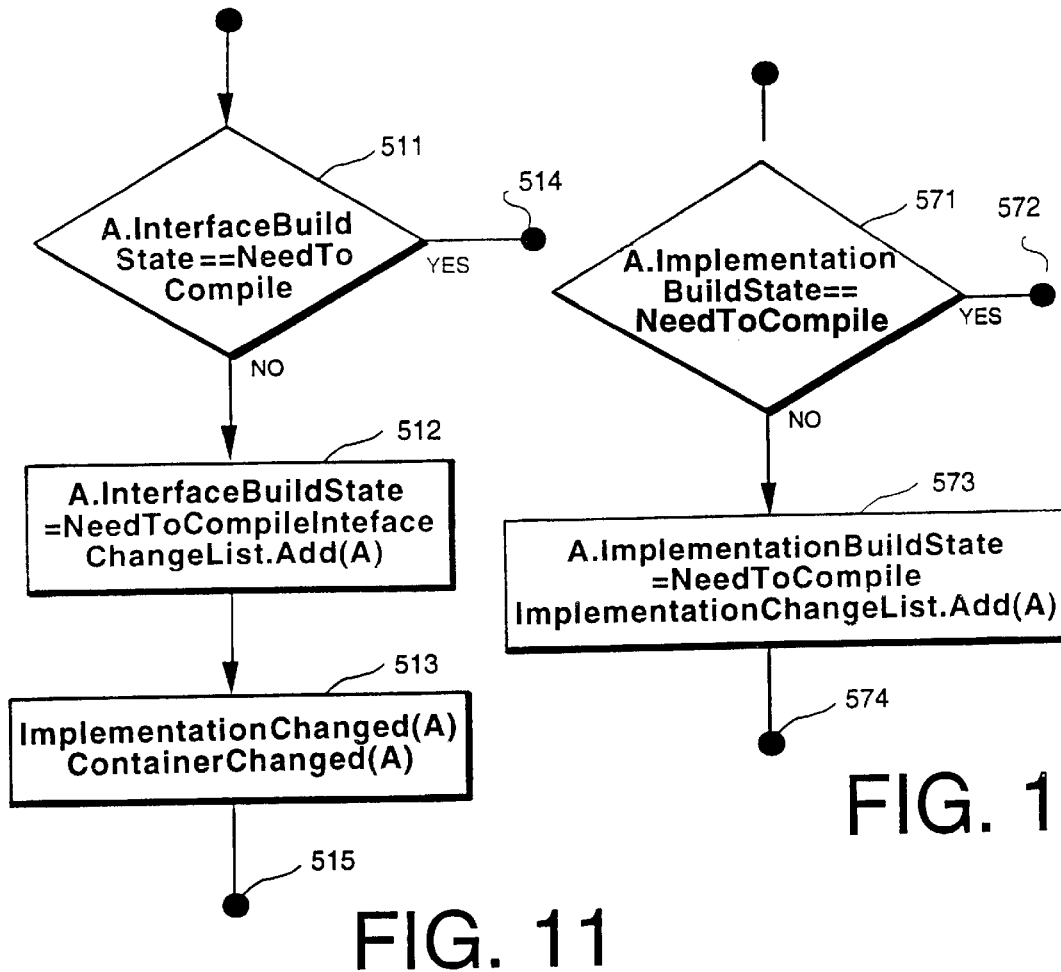
FIG. 11
FIG. 12
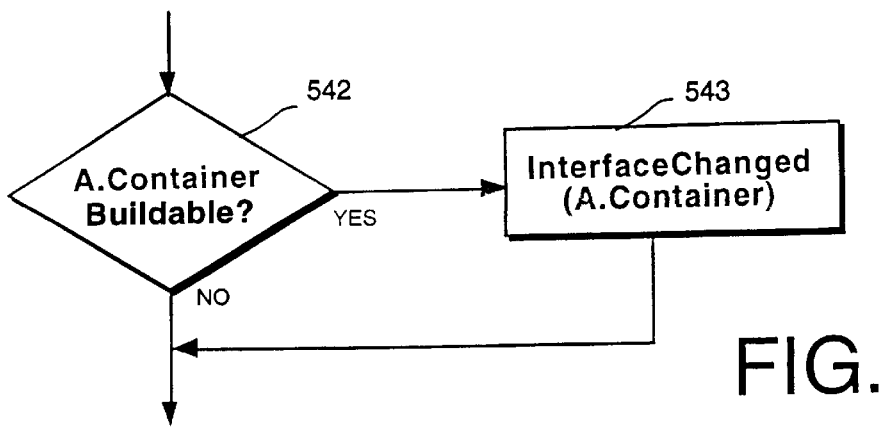
FIG. 13

FIG. 25

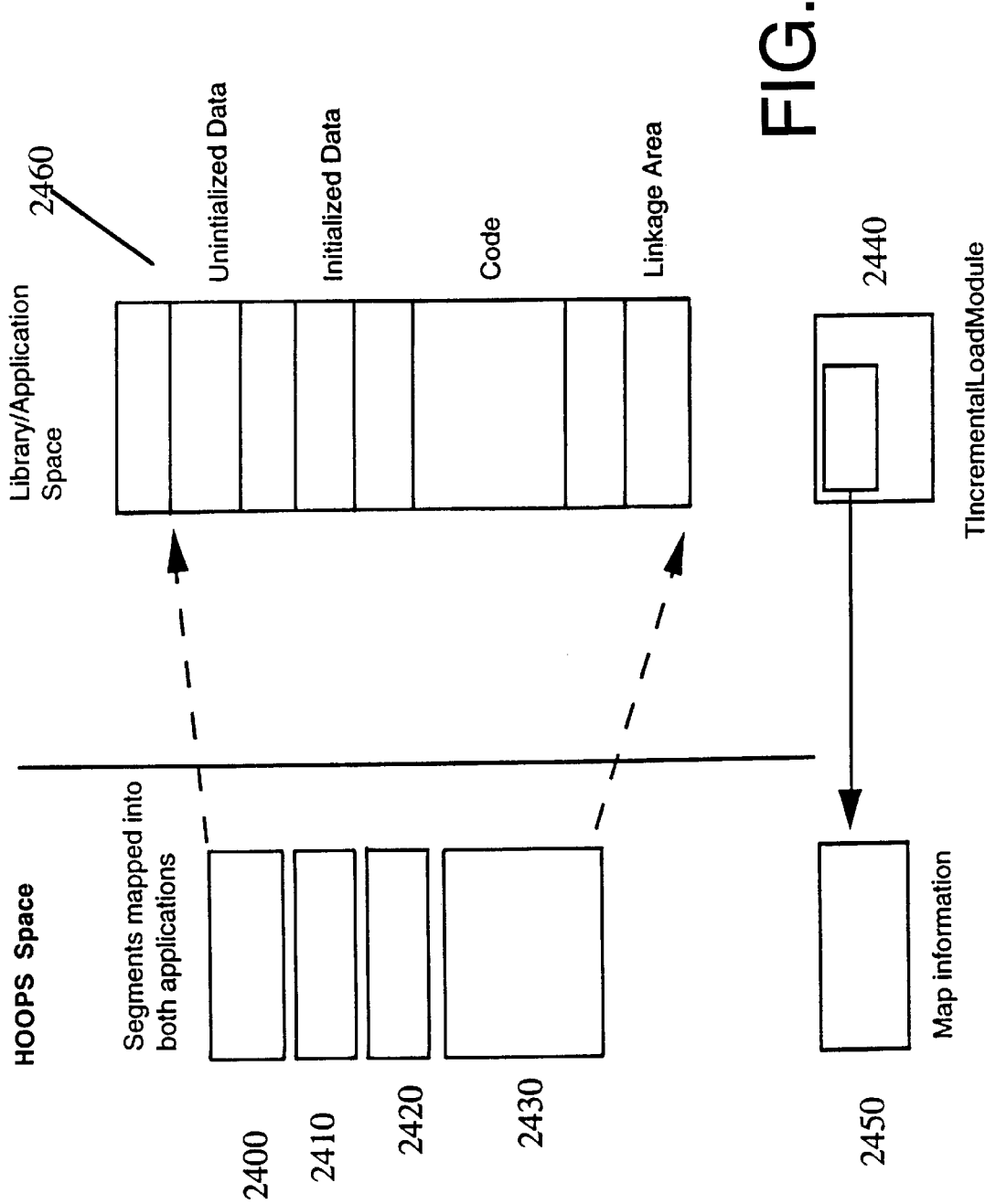

| Reference Type | Example | linker returns... | Result |
|---|---|---|---|
| code-to-code | Foo(); | j_Foo | code: bsr j_Foo<br>data: j_Foo: bra Foo |
| code-to-data | gN=1; | r_gN | code: movea r_gN(pc),a0<br>move #1,(a0)<br>data: r_gN: gN |
| data-to-data | int& pi=i; | wait | data: pi: (i @ load time) |
| (static initialization)<br>data-to-code | PtrToFn pnf = Foo; | wait | data: pnf: (j_Foo @ load time) |
| (dynamic initialization)<br>data-to-code | pnf = Foo; | wait | code: movea r_Temp(pc),a0<br>data: r_Temp: (j_Foo @ load time) |

FIG. 42

DEMAND-BASED GENERATION OF SYMBOLIC INFORMATION

CROSS-REFERENCE TO RELATED APPLICATIONS

This is a 37 C.F.R. §1.53(b) continuation of application Ser. No. 08/557,767 filed on Nov. 13, 1995 and now issued as U.S. Pat. No. 5,956,479.

BACKGROUND OF THE INVENTION

1. Field of the Invention

The present invention generally relates to computer-aided software engineering (CASE) and, more particularly, to demand-based generation of symbolic debugger information that provides an interactive and dynamic environment for computer program building and debugging. The invention allows a programmer to debug their programs without incurring the cost of generating symbolic information. Debugger symbolic information refers to the information that a program compiler communicates to the program debugger. This information describes to the debugger how to show the user a program's variable values, variable types, program counter, and stack backtrace. The costs of generating symbolic information include performance cost at compile time, storage cost associated with the symbolic information overhead, startup time for the debugger, variable value and program location access time while debugging, and linkage time associated with building the information associated with symbolic debugging. Demand based generation of symbolic information reduces the costs by eliminating additional compilation overhead until necessary, by removing additional storage requirements for symbolic debugging data, by matching and retrieving source to ensure correctness of debugging, and by enabling debugging at all times.

2. Description of the Prior Art

Object-oriented programming (OOP) is the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three kev elements are common to OOP languages, most OOP languages implement the three kev elements differently.

Examples of OOP languages are Smalltalk and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating-the right order of a message and using the right message. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs.

The complete process of running a computer program involves translation of the source code written by the programmer to machine executable form, referred to as object code, and then execution of the object code. The process of translation is performed by an interpreter or a compiler. In the case of an interpreter, the translation is made at the time the program is run, whereas in the case of a compiler, the translation is made and stored as object code before running the program. That is, in the usual compile and execute system, the two phases of translation and execution are separate, the compilation being done only once. In an interpretive system, such as the Smalltalk interpreter, the two phases are performed in sequence. An interpreter is required for Smalltalk since the nature of that programming environment does not permit designation of specific registers or address space until an object is implemented.

A compiler comprises three parts; the lexical analyzer, the syntax analyzer, and the code generator. The input to the lexical analyzer is a sequence of characters representing a high-level language program. The lexical analyzer divides this sequence into a sequence of tokens that are input to the syntax analyzer. The syntax analyzer divides the tokens into instructions and, using a database of grammatical rules, determines whether or not each instruction is grammatically correct. If not, error messages are produced. If correct, the instruction is decomposed into a sequence of basic instructions that are transferred to the code generator to produce a low-level language. The code generator is itself typically divided into three parts; intermediate code generation, code optimization, and code generation. Basically, the code generator accepts the output from the syntax analyzer and generates the machine language code.

To aid in the development of software, incremental compilers have been developed in which the compiler generates code for a statement or a group of statements as received, independent of the code generated later for other statements, in a batch processing operation. The advantage of incremental compiling is that code may be compiled and tested for parts of a program as it is written, rather than requiring the debugging process to be postponed until the entire program has been written. However, even traditional incremental compilers must reprocess a complete module each time.

Optimizing compilers produce highly optimized object code which, in many cases, makes debugging at the source level more difficult than with a non-optimizing compiler. The problem lies in the fact that although a routine will be compiled to give the proper answer, the exact way it computes that answer may be significantly different from that described in the source code. Some things that the optimizing compiler may do include eliminating code or variables known not to affect the final result, moving invariant code out of loops, combining common code, reusing registers allocated to variables when the variable is no longer needed, etc. Thus, mapping from source to object code and vice versa can be difficult given some of these optimizations. Inspecting the values of variables can be difficult since the value of the variable may not always be available at any location within the routine. Modifying the values of variables in optimized code is especially difficult, if not impossible. Unless specifically declared as volatile, the compiler "remembers" values assigned to variables and may use the "known" value later in the code without rereading the variable. A change in that value could, therefore, produce erroneous program results.

Once a program has been compiled and linked, it is executed and then debugged. Because logical errors, also known as "bugs," are introduced by programmers, they will want to detect and understand the errors, using a program debugger. After correcting the errors and recompiling, they use the debugger to confirm that those errors have been eliminated. Other uses for the debugger include inspecting executing programs to understand their operation, monitoring memory usage, instrumenting and testing programs, verifying the correctness of program translation by the compiler, verifying the correctness of operation of other dependent programs, and verifying the operation of computer hardware.

Debuggers provide the program with information about the execution state of the running program as well as control of it. Program state includes program and data memory; hardware registers; program stacks; and operating system objects such as queues, synchronization objects, and program accounting information. Debuggers control programs with operations to start, stop, suspend, terminate, step over instructions, step into branches, step over statements, step through subroutine calls, stop at breakpoints, and stop at data watchpoints. Source-level, or symbolic debuggers present the state of executing programs at the high-level of abstraction, closely representing the execution of the program as if the source code were native computer operations.

Noninteractive debuggers usually lack the ability to control programs. They often only allow the programmer to inspect the state after a program has terminated. These are generally called "postmortem debuggers."

Interactive debuggers provide the programmer access to the state of programs while they are running. They allow the programmer to interact with the running program with control of its execution.

Hardware debuggers are another class of debuggers that are often used to check the operation of programs only at a primitive level. For instance, they allow a programmer to view the operation of the CPU as it executes each instruction, or to view data in memory with a limited presentation such as a binary or hexadecimal output. These debuggers are not usually useful to programmers using high-level languages such as C++ because the type of data they provide is highly mismatched with the source code that a programmer is debugging.

High-level symbolic debuggers represent an attempt to let a programmer view running programs with the same level of abstraction as the original source code. Because the source code is compiled into machine instructions, the running programs are not actually being executed in the CPU itself. Instead, machine code translations execute "as if" the source code were real operations that could be carried out by the CPU. To present the programmer with a view of their program that closely matches their own perception of how the program is operating, high-level symbolic debuggers must use symbolic debugging information provided by the compiler to perform a reverse translation from the machine instructions and binary data, back into the source code.

The symbolic information used to perform this translation exists in the form of maps that allow the debugger to translate addresses of machine instructions back into source code locations, or to translate data on a CPU program stack back into the local variables declared in the source code.

However, because the translation process may produce "optimized code," the mapping between may not always be straightforward. Optimizing compilers may not preserve a 1:1 correlation between program statements and blocks of machine instructions, nor do they necessarily preserve a direct correlation between variables and the hardware memory in which they are stored. To provide a mapping from a program's machine code instructions to the program's source code, the symbolic information can be complex and large.

Alfred V. Aho, Ravi Sethi, and Jeffrey D. Ullman describe symbolic debugging in *Compilers: Principles, Techniques, and Tools*. In particular, they briefly discuss methods for debugging optimized code. Polle T. Zellweger (in *Interactive Source-Level Debugging for Optimized Programs*) and John Hennessey (in *Symbolic Debugging of Optimized Code*) further expand on the techniques for debugging optimized code, in particular the recovery of variables, mapping program execution to inline expanded code, and cross-jumping. These works address the type of information that is generated but do not use an incremental approach to generating symbolic information.

Hölzle, Urs, Craig Chambers, and David Ungar. *Debugging Optimized Code with Dynamic Deoptimization*. ACM SIGPLAN '92 PLDI-6/92/CA describes a language called SELF, a dynamic object-oriented language in which types can change at runtime. The major differences between this language and C++ is that C++ is a statically-typed language and the generation of symbolic information. Dynamically typed languages allow for structures and objects to change during a program's execution. Statically typed languages restrict the type change to optimize execution. Although the debugger for the SELF language generates symbolic information for a single subroutine at a time, doing so with a C++ compiler would take a long time. The compiler in essence would have to recompile entire files, which would take much longer than the incremental compilation that is possible in a development environment such as a Human Object-Oriented Programming System (HOOPS) development environment. The SELF system claims to solve the problem for C++, but only addresses this by keeping both optimized and unoptimized copies of the code as well as the debugging information for them.

The programmer can elect to generate symbolic information for often-used types and methods by changing the state in the database. The symbolic information stored in the symbolic property allows us to debug optimized code whereas the SELF debugger requires "deoptimization" where optimized code is replaced with nonoptimized code. This can perturb the program being debugged, including changing instruction counts which may change timing in race conditions. In addition, SELF only allows debugging at "interrupt points" as opposed to arbitrary instruction boundaries, which the HOOPS debugger can handle.

The Centerline integrated development system uses a C++ interpreter, which doesn't use a compiler to generate machine instructions. Instead, the source code is interpreted in a mode that affords the programmer rapid turnaround at the expense of not having efficient programs. Later, the program is compiled but must be debugged using a traditional debugger.

Traditional debuggers take a completely different approach. Unix debuggers such as adb, sdb, dbx, and gdb all use file-based debugging information such as the a.out, coff and xcoff file formats. Because these files are used by the target program at the time they are being debugged, they cannot be changed. Since they cannot be changed, the symbolic information must be generated at the time the program is linked.

While there have been many advances in the art of computer program building, testing and developing, the known software development tools still place a substantial burden on the programmer, often requiring insightful intuition. In addition, traditional batch-oriented programming systems provide for very long edit-compile-test cycles, which is very disruptive to the creative act of programming.

SUMMARY OF THE INVENTION

It is therefore an object of the present invention to provide a human-oriented, interactive and dynamic process for debugging computer programs which promotes better programmer focus and concentration, and hence greater productivity.

According to the invention, a debugger is designed to be used with a program development system. An example of one possible program development system is reviewed, followed by a discussion of the debugger of the present invention.

One possible program development system that may be used with the debugger of the present invention is one in which there is a HOOPS in which there is an interaction between an incremental program model, called a project, and three major functionalities. A program is modeled as semantic units called components made up of a list of named data items called properties. Rather than storing a program as a loose collection of files as is done in traditional systems, HOOPS stores all the information about the program in the project.

In HOOPS, the component governs the granularity for incremental compilation; that is, a component represents a single compilable language element such as a class or a function. A component is composed of a set of properties that are divided into two parts an externally visible (or public part) called the Interface and an Implementation (the private part). This means that a component can be dependent only on the interface of another component. All the components in a project are organized into a tree structure, with the base of the tree being a root component called the project component.

The three major functionalities are the database, the compiler and the build mechanism. The database persistently stores and retrieves the components and their properties. The compiler, along with compiling the source code of a property, is responsible for calculating the dependencies associated with a component. The build mechanism uses properties of components along with the compiler-generated dependencies to correctly and efficiently sequence the compilation of components during a build process. The build mechanism has a global view of a program at all times. This contrasts with traditional approaches where the program is represented by a set of files that are compiled independently of each other. Files used in traditional programming environments impose a particular fixed order of processing on the semantic units contained in the files.

The system automatically keeps track of editing changes in components, including whether a change was in the Interface or Implementation. This in contrast to conventional systems that track only at the file level. Dependency analysis is automatic and is based on relations between components. The system includes a mechanism that allows the compiler to record not only that a dependency exists, but what sort of dependency it is. This allows the build mechanism to determine with more precision which components actually need compilation, making the system more efficient than recompiling all components for which a dependency exists whether recompilation is needed or not.

The dependencies also allow the build mechanism to determine which components are recompiled to generate symbolic information, using a smaller amount of time and memory by only recompiling the components that are necessary.

Conventional compilers use software construction tools in the programming environment to facilitate generating the software. For example, it is customary in conventional program construction to partition the overall program into modules, typically stored within individual files, each of which may be processed in different ways. A Make command is employed to manage and maintain the modules making up the computer program; that is, the Make function keeps track of the relationships between the modules of the program and issues only those commands needed to make the modules consistent after changes are made. It is necessary, however, for the programmer to generate a Makefile specification that defines the relationships (dependencies) between the modules. The requirement for a Makefile specification means that the programmer must be able to decide when a dependency occurs and places the burden of synchronizing dependencies on the programmer. In practice, this usually means both the existence of unnecessary dependencies and the omission of necessary dependencies, both of which can be a source of error in the building of the computer program.

In contrast to the Make function, the build mechanism differs in that the programmer does not generate a specification like the Makefile specification. The build mechanism assumes no pre-knowledge of dependencies; in effect, it "discovers" the dependencies of the components and keeps track of those dependencies. This means that the build mechanism will build a program from scratch when there is no pre-existing dependency information. In the initial build operation, all components are listed in a change list. A compilation of a component in the change list is attempted, but if that compilation is dependent on the compilation of another component, the compilation of the first component is either suspended or aborted and the compilation of the second component is attempted and so on until a component is found that can be compiled. Then the build mechanism works back through components for which compilation was earlier suspended or aborted making use of any information already generated earlier in this process.

The build mechanism orders compilations so that all Interfaces are compiled before any Implementation. This reduces the number of possible cross-dependencies and hence increases efficiency. The build mechanism uses a form of finite state machine to control the processing of components and to help ensure their ordering in a manner to minimize the suspended or aborted compilations of components.

A build operation after a change has been made (editing a component or adding or deleting a component) is similar to the initial build operation except that the change list contains only those components that have been changed, and the build mechanism uses the previously developed client and source reference lists to recompile only those components requiring recompilation. The function-level incremental compilation implemented by the invention greatly reduces the turnaround time from program change to test since a much smaller proportion of a program will typically be rebuilt.

The program model provides a method for storing and reusing an internally processed form for Interfaces (called the Declaration property). The compiler stores the internally processed form of an Interface so that it can be used more efficiently when compiling some other component. This is in contrast to traditional systems where interfaces to be used are "included" in every file where a use is made and reprocessed to an internal form by the compiler every time. Additionally, the program model of components and properties provides a natural way to store information closely coupled with a particular component. This information can be used either directly by the programmer or indirectly by other tools. In traditional systems, such data is either forgotten at the end of a compile or is only loosely coupled with the program source.

The invention further provides an incremental debugging capability that builds only the information required for the debug operation rather than the entire program. The build operation for programs using symbolic information builds the symbolic information only once, and then performs dynamic builds of the changes. If the desired information is not available, the system creates the information for that component dynamically at the point of interest for the debug operation. Creating the information occurs transparently without input from the user. It is possible to discard old or used information to conserve memory because the information can be generated again on the fly. The system can be built in advance and only the pieces of interest can be built on the fly as the need arises. The component can also be divided into as many logical levels as desired by a user to assure the proper granularity is achieved.

To reduce latency in generating code in the present invention, a cache is used whereby symbolic information can be compiled and stored in the database. The system allows reconstruction of symbolic information for source code that has been stored in a configuration.

The preferred embodiment of the invention is written in C++ and is used to build programs in C++, C and Assembler, these being the most popular languages currently in use. The programs built using the invention typically use all three of these languages. Thus, while the invention is itself an object-oriented program written in an object-oriented programming language, it is not limited to building programs in object-oriented programming languages but is equally useful in building programs in procedural languages. Moreover, the invention is not limited to the C++ language, but may be implemented in other programming languages, and the invention is not limited in its application to these three languages; that is, the teachings of the invention may be used in a human-oriented object programming system of more general application.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is an example of a Data Map in accordance with a preferred embodiment which is used to map source program variables to information describing characteristics of the variables;

FIG. 4 illustrates the entries and structure of a Statement Map;

FIGS. 10 to 13, taken together, are a flowchart of the logic of registering editing changes through BuildStates;

FIG. 25 is a screen shot of a debugger browser in accordance with a preferred embodiment;

FIG. 30 is a pictorial representation of the computer screen shown in FIG. 29 with the browser wiring turned on;

FIG. 41 is a memory map of a load module in accordance with a preferred embodiment; and FIG. 42 illustrates different types of references and linker modification of the references in accordance with a preferred embodiment.

DETAILED DESCRIPTION OF A PREFERRED EMBODIMENT OF THE INVENTION

The present invention is discussed in terms of a collection of apparatus and methods. Because the present system may be implemented as software executed on a machine, it should be understood that where methods are discussed, there are underlying elements that support the performance of the method, and where elements are discussed, the function performed by the element may be considered to support the recitation of a step in a method of operation.

Figure 1:
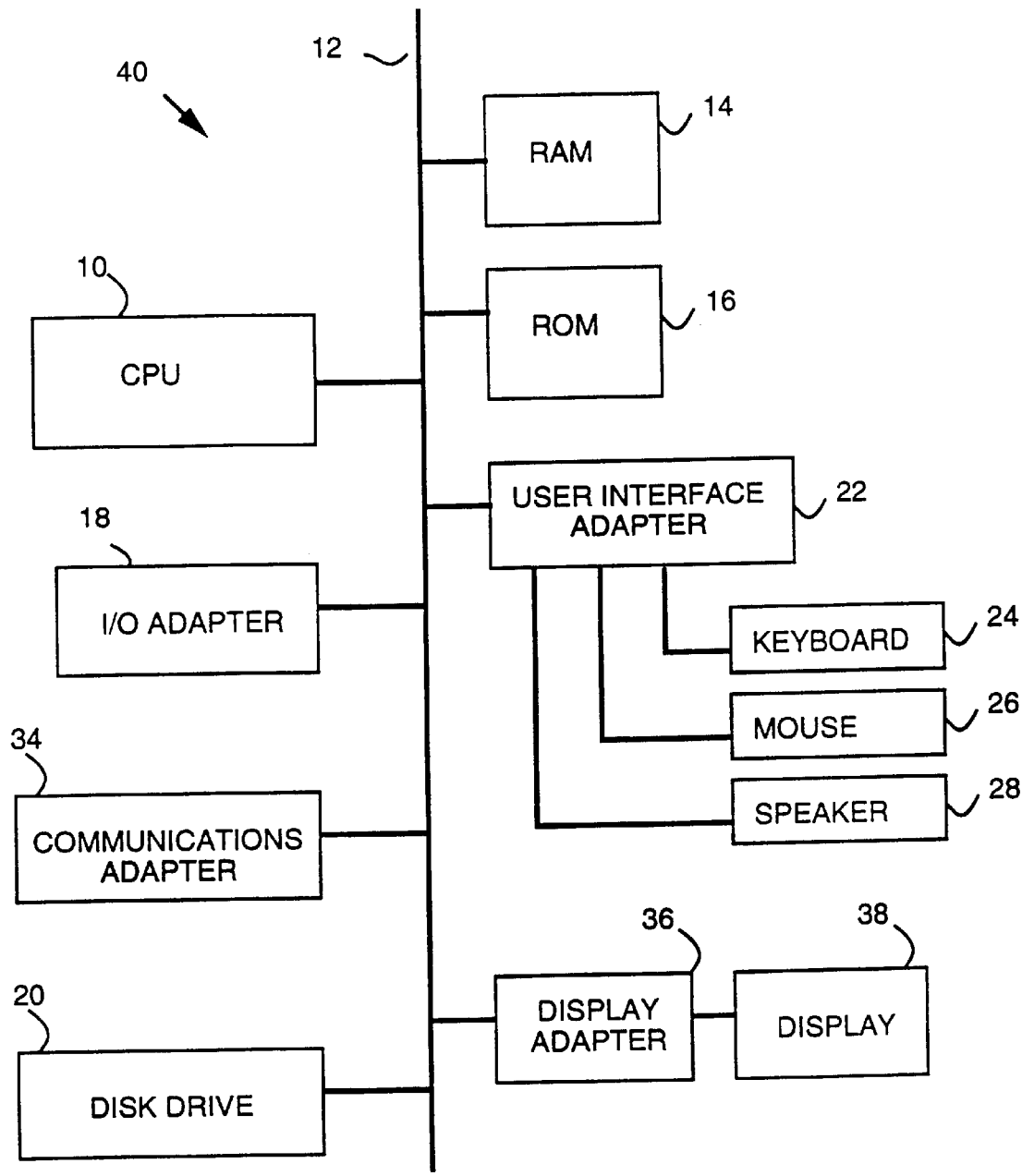
FIG. 1 is a pictorial diagram showing a general purpose computer system capable of supporting a high resolution graphics display device and a cursor pointing device, such as a mouse, on which the invention may be implemented.

The invention is preferably practiced in the context of an operating system resident on a personal computer such as the IBM®, PS/2®, or Apple® (Macintosh®) computer. A representative hardware environment is depicted in FIG. 1, which illustrates a suitable hardware configuration of a Workstation 40 in accordance with the present invention. The Workstation 40 has a Central Processing Unit (CPU) 10, such as a conventional microprocessor, and a number of other units interconnected via a System Bus 12. The illustrated Workstation 40 shown in FIG. 1 includes a Random Access Memory (RAM) 14, a Read Only Memory (ROM) 16, an I/O Adapter 18 for connecting peripheral devices such as disk units to the Bus 12, a User Interface Adapter 22 for connecting a Keyboard 24, a Mouse 26, a Speaker 28, a Microphone 32, a Disk 20 (or other mass storage), and/or other user interface devices such as a touch screen device (not shown) to the Bus 12. The Workstation 40 may also have a Communications Adapter 34 for connecting the Workstation 40 to a data processing network and a Display Adapter 36 connecting the Bus 12 to a Display 38. The Workstation 40 has resident thereon an operating system such as the Apple System/7 (operating system, or other commercially available operating system. Other examples include various workstations such as the IBM RISC System/6000 and the Sun Microsystems computers.

The CPU 10 may be any of several commercially-available microprocessors such as the PowerPC commonly used in the Apple Macintosh® computers or the Pentium microprocessors commonly used in the IBM PS/2 computers. Other microprocessors, such as RISC ("reduced instruction set computer") microprocessors typically used in workstations, can also be used. The ROM 16 stores the basic microcode, including the basic input/output system (BIOS), for the CPU 10. The operating system (OS) for the Workstation 40 may also be stored in ROM 16 or, alternatively, the OS is stored in RAM 14 as part of the initial program load (IPL). RAM 14 is also used to store portions of application programs and temporary data generated in the execution of the programs. The Bus 12 may be the Apple NuBus®, the IBM MicroChannel® or one of the industry standards such as the ISA (industry standard adapter) or EISA (extended industry standard adapter) buses.

The Disk Drive 20 may be a floppy disk drive or a hard disk drive, or other storage device. A floppy disk drive allows reading and writing of data and programs from and to removable media, while a hard disk drive typically stores data and programs that are paged in and out of RAM 14. The Display 38 is connected to the Bus 12 via a Display Adapter 36. A Communication Adapter 34 provides an interface to a network.

Other supporting circuits (not shown), in the form of integrated circuit (IC) chips, are connected to the bus 12 and/or the CPU 10. These may include, for example, a bus master chip which controls traffic on the Bus 12. The Bus 12 may, in some computers, be two buses; a data bus and a display bus allowing for higher speed display operation desirable in a graphic user interface.

The present invention may be run on virtually any computer system similar to that shown in FIG. 1, the particular hardware not being of particular importance.

Definitions

Program

As used in the description of the invention, a HOOPS program consists of one non-buildable component called the Project and a collection of "buildable components". It is also possible to store non-buildable components, but in this description, whenever an unqualified component is mentioned, what is meant is a "buildable component". Non-buildable components will not be compiled during a build operation.

Component

A component has a unique identity and is named. Different components are distinguished by some form of unique Identifier called an ID. There is a distinguished ID called NullID that belongs to no component. The ID is assigned when a component is created and is never changed during the existence of the component. If a component is deleted, its ID is never reused. In practice, IDs are usually numerical.

A component also has a name that consists of a string of text containing no white space. There is no requirement that different components have different names. It is possible to obtain a list (possibly empty) of all components whose names match some given text string. A component's name may be changed any number of times during the existence of the component.

Each buildable component is associated with a specific computer language. In practice, the computer language is usually identified by a string of text. Each computer language has a compiler associated with it that is to be used when compiling any component with that language. In practice, it is possible for a given computer language to be associated with more than one compiler. In this case, the component must record both the language and some way of identifying the specific compiler.

A specific language has a specific set of component kinds associated with it and a specific set of property implementations, possibly differing for every kind. Thus, distinct semantic elements in a particular language may be structured in different ways according to need.

Components have BuildStates. A BuildState is a value from the list NeverCompile, Compiled, NeedToCompile, Uncertain, BeingCompiled, CompileError, and UncertainError. In practice, these values are usually numerical. Each component has a pair of BuildStates called InterfaceBuildState and ImplementationBuildState. Every component has both these buildstates whether it is buildable or non-buildable. For a non-buildable component, these BuildStates are both NeverCompile.

BuildStates may be accessed and changed. Setting a component's BuildState to the same value again is allowed and causes no effect. Changing a BuildState may have well defined side-effects such as changing the BuildState of another property of the same or a different component or, for example, adding or deleting references from some list such as a list of changes or a list of errors.

Components are used to represent semantic language elements. The way that this is done depends on the particular computer language being modeled. For example, in C++ a partial list of language elements represented by components includes global data, a global functions, classes, data members, member functions, typedefs, enums, enumerators, macros, unions and structs. Typically, each semantic element will have an associated distinct kind.

Components are also used to represent dynamic program elements, such as the execution state of the programs that are being debugged by the development environment. For example, components represent the target host on which a program is being debugged, the executing processes, and their threads.

Properties

A component consists of a collection of named properties. A property represents some data associated with the component. It is possible to retrieve or store data given a component's ID and a property name. In practice, property names are usually internally represented by numbers identifying the names (such numbers are sometimes called tokens). There is a distinguished property name called NullProperty which belongs to no property.

The data associated with a given property is different for different components. Changing the data for a given property for one component does not imply changing the data for the same property of any other component. However, it is possible for a change in one property of a component to cause a change in another property of the same or another component.

A pair consisting of an ID and a property name is called a reference. A reference uniquely identifies a particular piece of property data. Often a reference is loosely used as though it were the component and/or property to which it refers. In practice, a reference typically contains other information that is not used directly in program building, identifying which version of the data and which subsection of the data in the property is being referenced.

All components must have the properties Name and Container. The Name property stores the component's name. The Container property contains a single reference in which the property name is NullProperty. Starting from any component and successively replacing it with the component referred to by its Container ID will always eventually result in the Project component. The Container ID of the Project is NullID. Thus, all components are described as being in the Project.

The built property (also called the components built list) records the list of properties correctly compiled in the last build, in the order that they were built. The same property should only appear at most once on this list. It is used for testing and debugging.

Project Component

A project is a component that has, in addition, the properties ChangeList and ErrorList. The ChangeList property is a list of references. The references describe the components and properties that have changed since the last build. In practice, the ChangeList may be represented by more than one list sorted in some fashion for efficiency in building a program. The ErrorList property is also a list of references. These references describe the components that were listed as having errors during the last program build. The references all have Errors as their property. Associated with each reference is a numerical key. This key is used in conjunction with the specified Errors property to locate a specific message and a particular subrange of specified property of the component.

Buildable Component

A buildable component must also have properties Declaration, ObjectCode, Clients, SourceReferences, Errors and may have properties Initerface, Implementation, Members, and Symbolic.

The Declaration property represents a data cache for the compiler. This may be empty, as for example before the component has ever been compiled. In practice, it may be thought of as an entry in the compiler's symbol table, although the stored representation may differ from the compiler's internal representation.

The ObjectCode property represents the executable code for the component. This may be empty, as for example before the component has ever been compiled or because no object code is associated with this component. In practice, it usually provides a means of pointing at the actual code which is stored elsewhere.

The Clients and SourceReferences properties are collections of pairs consisting of a reference and a dependency. A dependency is a list of changes. A change may be represented as a string of text chosen from a distinguished finite list of strings. There is a distinguished change called Public, which is used to distinguish references to a component in the Implementation property only, as opposed to uses in the Interface property. A dependency can be represented as a bit vector with the nth bit being "1" if the nth change in the list is present and "0" otherwise.

The Errors property consists of a list of triples. Each triple consists of a key, a property name, and a message. A key is a numerical identifier. A given key may appear only once in a particular Errors property at one time. The property name is usually Interface or Implementation. The message is some piece of text and/or graphics.

The Interface and Implementation properties are properties representing the source text of the component. The Source text may be stored as tokens rather than text and be accessed in different forms if required. The text represented by these properties may be changed by editing it manually in the programming environment. One possibility is for the Interface data to be stored as structured fields from which the source text can be reconstructed as required.

The Members property is the collection (possibly empty) of references, one for each component in the Project that has this component as its Container.

The Symbolic property is a set of five types of symbolic information that allows a debugger to map an executing program's state back into the buildable components of the program.

Attributes

A component has a number of attributes. An attribute is either True or False. In practice, an attribute is usually represented by a single bit of memory with the values True and False represented by the numbers "1" and "0". All components have the attribute IsBuildable. If this attribute is true, and the component is buildable; otherwise, it is non-buildable. A component may be always non-buildable or temporarily non-buildable (because of the action of some temporary condition).

Buildable components also have the attribute IsInline. When this attribute is True, the Implementation of a component is public, and this means that other components can be dependent on changes to the Implementation. If it is False, Implementation changes never cause changes in other components.

Buildable components also have the attribute IsSynthetic. This attribute is True for components that are created during the build process by the compiler. It is False for components created manually by the programmer. Synthetic components are provided to allow compilers to create components corresponding to default language elements that are required but do not need to be explicitly created by the programmer. In practice, it may be possible to change the IsSynthetic attribute from True to False, for example if a synthesized component is manually edited, but the reverse transformation from False to True is never allowed. Synthetic components often do not have an Interface or Implementation property, but in any case always have their Interface and Implementation BuildStates Compiled.

Kinds

Each component has a kind. A kind is a string of text that is used to classify components into groups sharing for example the same properties or the same language specific behavior. Most kinds are specific to a particular computer language and are used to designate semantically distinct language elements.

There are, however, some kinds defined by the system. These are the kinds Project, Library and Container. These kinds are applied only to non-buildable components. The Project kind is the kind of the Project component. The Library kind is applied to collections of components that are to be linked into a single external block of object code such as a shared library or application. The Container kind is applied to components that are used to group other components for organizational purpose. In practice, kinds are usually internally represented numerically.

When a program is executing on the computer, it is said to be a process. The process consists of the memory holding the program and one or more execution states called threads. It may also be assigned ownership of hardware or software resources by the operating system. A program does not execute without a process. Operating systems create processes to run programs and upon their completion (whether correctly or erroneously) the processes are terminated. Processes can be in various execution states, including running, stopped, dead or killed, active, suspended, all depending on the operating system.

A thread contains a set of states that embody the execution of a program. The execution states of a thread contains a set of registers, a program counter, and a program stack. There are one or more threads in a process. A thread shares memory with other threads in a the same process. An executing program is said to be multithreaded when there is more than one thread in a process. Computers with multiple CPUs can execute more than one thread concurrently. Computers with single CPUs can only execute one thread at a time but the CPU switches between threads to give the user the appearance of a concurrent system.

A program debugger, or simply, a debugger, is a programming tool that allows a programmer to inspect and control a program. Inspection and control of the program allows the programmer to detect errors and confirm the correct operation of a program by displaying the internal state of the program including the types and values of variables that were expressed in the original program source code, the lines or statements of the program corresponding to the machine instructions generated by the compiler, and the program stack representing the current sequence of subroutine calls executed to get to the current state.

The debugger controls the execution of the program by stopping, continuing, stepping through lines or statements of source code, terminating programs, as well as letting the user set breakpoints, data watchpoints, completing the execution of subroutines, handling language and hardware exceptions, and adjusting the program's program counter.

Symbolic Property

The symbolic property is a particular instance of a property that is associated with various components. The information stored in the symbolic property includes different kinds of information. The maps and their purposes are described below with particular attention to the associated figures.

Token Map

Figure 2:
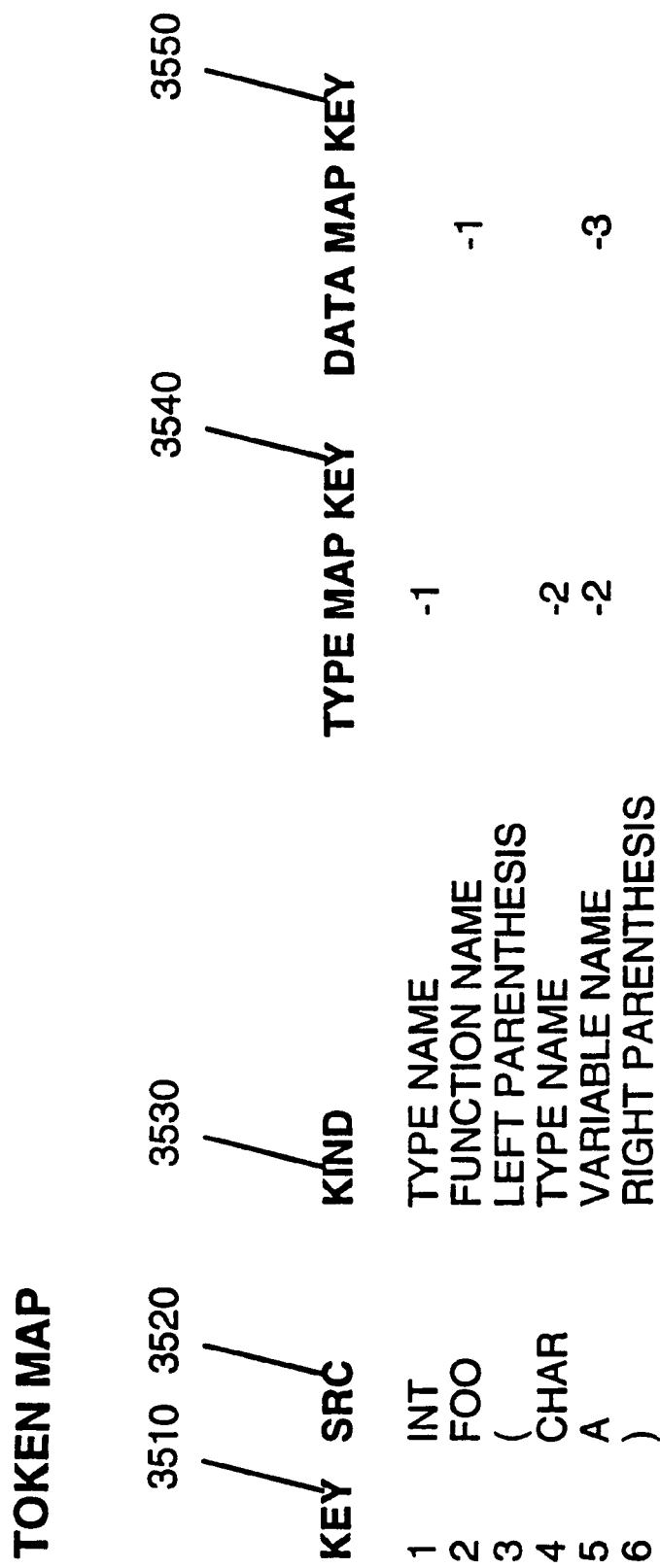
FIG. 2 is a table of examples of entries found in a Token Map.

FIG. 2 is an example Token Map in accordance with a preferred embodiment. The Token Map is used to map tokens representing computer language elements to information describing each respective token. Key 3510 is a unique number corresponding to each entry in the Token Map. Source 3520 references characters described by the Token Map entry uniquely identified by Key 3510. Kind 3530 is a language specific enumeration for each possible token in the computer language. Type Map Key 3540 value corresponds to a Key in the Type Map if there is an entry in the Type Map. Each entry in a Type Map describes everything necessary to interpret a value for the program. For example, the number of bits of storage required to store a value whether a scalar, array or other language type. If a scalar, whether signed or unsigned. Data Map Key 3550 corresponds to the unique identifier Key in the Data Map which is illustrated in FIG. 3 at 3651.

Data Map

FIG. 3 is a Data Map in accordance with a preferred embodiment. The Data Map is used to map source program variables to information describing characteristics of the variables. Key 3651 in the Data Map is a unique number corresponding to each entry in the Data map. Variable 3652 corresponds to a variable in the source program and although not required, it typically references an entry in the Token Map. PC Location 3653 indicates a range of instructions in the Instruction Map (FIG. 5) at label 501 for which the Variable 3652 is live. A live variable has storage allocated for its use.

Location 3657 is an address or register corresponding to the storage allocated for a variable's use. Read Formula 3654 defines how a variable is read from Location 3657. Write Formula 3655 defines how a variable is written to a location 3657. Optimization Annotation 3656 corresponds to a data optimization annotation describing any optimizations performed by the compiler. In the sample program, the function's return value is always equal to the variable "ves", so data optimization 3658 indicates that the function's return value has a shared lifetime with variable "yes". By shared lifetime, changing the value of one variable necessarily entails a mirrored change to the other variable. Similarly, data optimization 3659 indicates that the "yes" variable has a shared lifetime with return value for function "Foo"

Statement Map

FIG. 4 is a Statement Map in accordance with a preferred embodiment. The Statement Map is used to map source statements to characteristics of the statements, including a the relationship between statements. The Key 3770 in the Statement Map is a unique number corresponding to each entry in the Statement Map. The Source 3774 corresponds to the text of the Statement in the source program. The Kind 3771 is a language-sensitive enumeration describing the statement. The Parent 3772 refers to an entry in Key 3770 or has a value zero assigned to it. The Parent relationship describes the statements as a program in a tree relationship. So, for example, a Statement Map entry whose parent value is zero is the root of the tree. The Breakpoint 3773 refers to a Location value 3801 in the Instruction Map set forth in FIG. 5 and corresponds to the compiler's choice of the best instruction where a breakpoint should be installed for this statement.

Type Map

The Type Map will not be discussed in detail. Entries in the Token Map in FIG. 2 contain a handle, or key, which correspond to an entry in the corresponding Type Map. The provider must create a Type Map entry to satisfy each handle referenced in the Token Map except for references to standard, or "built-in" types, such as integer or floating point types. These built-in types are referenced by special, reserved Type Map handles.

Each entry in the Type Map describes, in a language-neutral way, a value type. There are subclasses that describe integer, floating point, pointer, reference, array, subprogram, etc. types. Each entry describes the bit size of an object of the type. Scalar type entries describe if and how the value sign is formed, the minimum and maximum values for the type, and so forth. Enumeration types include a list mapping each valid value to a value name. Array types indicate whether the index bounds are static or dynamic, and how to get the bounds.

The above is merely representative of the variety of information that may be represented in the Type Map.

Instruction Map

Figure 5:
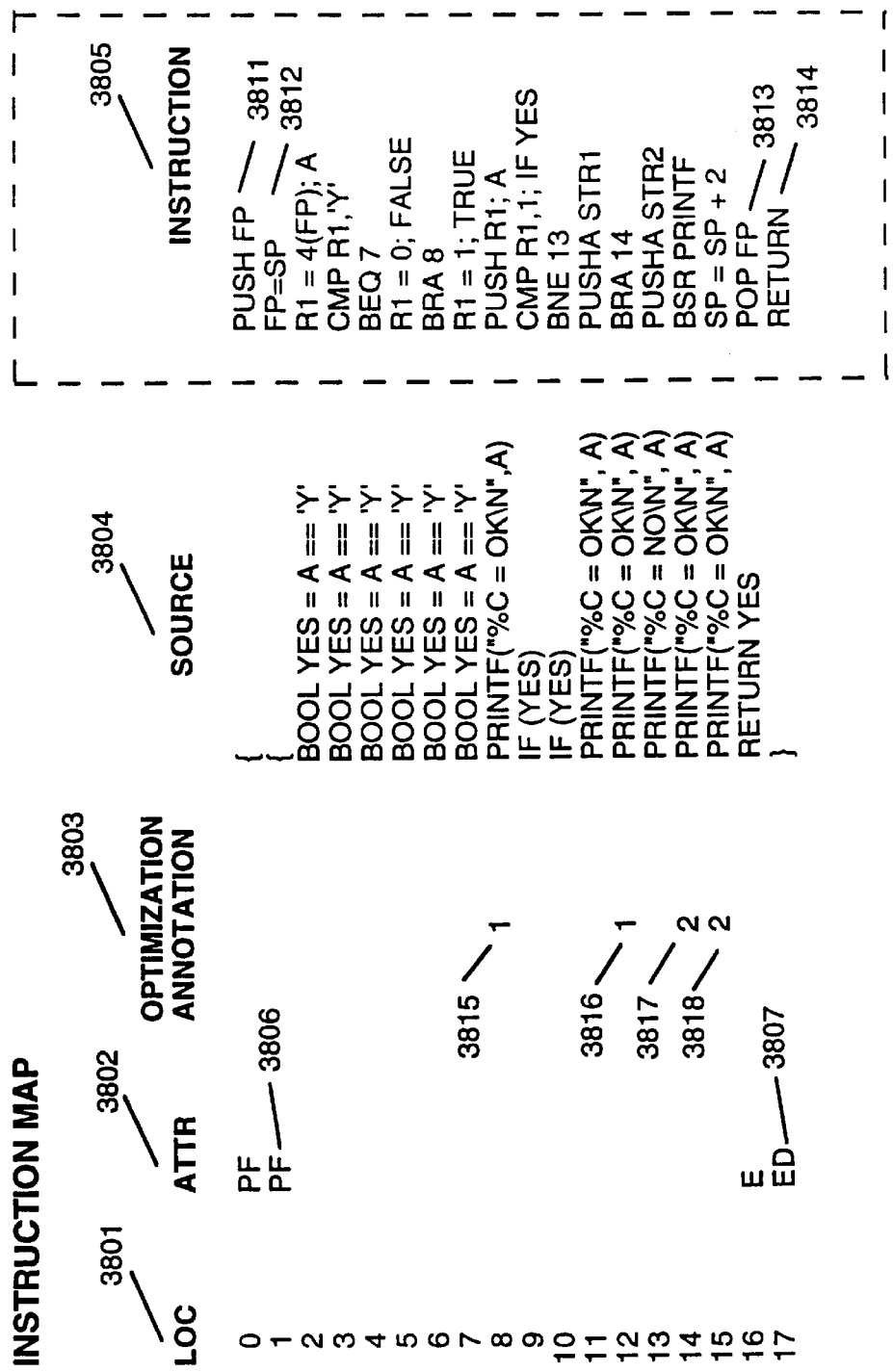
FIG. 5 illustrates entries and structure of an Instruction (Program Counter to Source) Map.

FIG. 5 is an Instruction Map, or Program Counter (PC) to Source Map, in accordance with a preferred embodiment of the invention. The Instruction Map is used to map instructions to source positions, and provide a variety of other information regarding the instructions. Location 3801 is a number representative of the op code of the machine instruction corresponding to an instruction in the sample program set forth above. The Attributes 3802 defined in a preferred embodiment includes: In_Prologue, In_Epilogue, Frame_Not_Constructed and Frame_Destructed. Instructions marked with In_Prologue are involved in setting up a function for execution, such as saving registers, establishing a frame, or making copies of actual parameters. The instructions map to some predefined source position, such as the opening brace in a C or C++ function.

Instructions marked with In_Epilogue are involved in finishing up a function's execution, such as restoring registers, destroying a frame, or copying a result to the caller. The instructions map to some predefined source position, such as the closing brace in a C or C++ function.

Instructions marked with Frame_Not_Constructed are usually part of the prologue sequence. The marking indicates that any frame for the function has not been set up yet. The instruction(s) that actually set up the frame also will be marked with this attribute. Keep in mind that instruction attributes describe the state of things if you were to stop on that particular instruction, before that instruction was executed. So, Frame_Not_Constructed would be unset (i.e., not set) beginning with the instruction after the frame is constructed. Instructions marked with Frame_Destructed are usually part of the epilogue sequence. The marking indicates that any frame for the function has been thrown away. The instruction(s) that actually throw away the frame (e.g., restore a frame pointer to the caller's value) will not be marked with this attribute as would the instructions immediately afterwards. In FIG. 5, PF 3806 the P is shorthand for the In_Prologue attribute as discussed above and the F is shorthand for a Frame_Not_Constructed attribute. In ED 3807, the E is shorthand for In_Epilogue attribute and the D is shorthand for the Frame_Destructed attribute.

An Optimization Annotation 3803 describes if the instruction is affected by optimization performed by the compiler. Source 3804 corresponds to the source code related to the instruction according to the compiler. Instruction 3805, shown in broken line is FIG. 5, is not part of the actual map in accordance with a preferred embodiment, but is included as an aid for clarifying the invention to assist in understanding the preferred embodiment. The Instructions 3805 are for a hypothetical machine and loosely correspond to the sample program set forth above.

Figure 6:
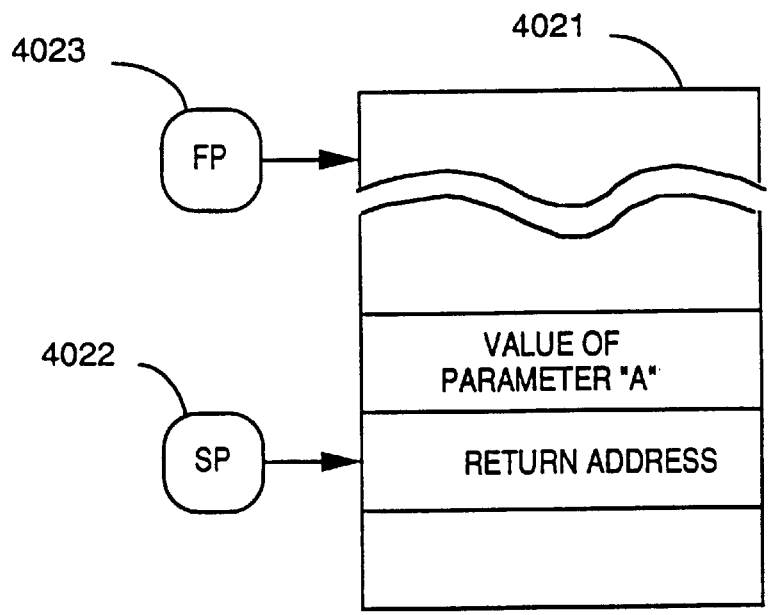
FIG. 6 illustrates the use of the Frame Pointer (FP) and the Stack Pointer (SP) during the execution of a sample program.

FIG. 6 illustrates a frame in accordance with a preferred embodiment at the time the sample program is invoked. A frame 4021 is a range of memory locations in a computer containing parameters passed to a function, return addresses, saved register values, values for program variables and locations to store expression values as they are computed. A frame is typically accessed via one or two logical registers:

a Stackpointer 4022 pointing to the beginning of the frame's stack in memory and a Frame Pointer 4023 is a pointer to the beginning of the frame in memory. In FIG. 5 at label 3811, the old framepointer value is pushed onto the stack, and at label 3812, the framepointer is set equal to the Stackpointer 4022 to create a new frame.

Figure 7:
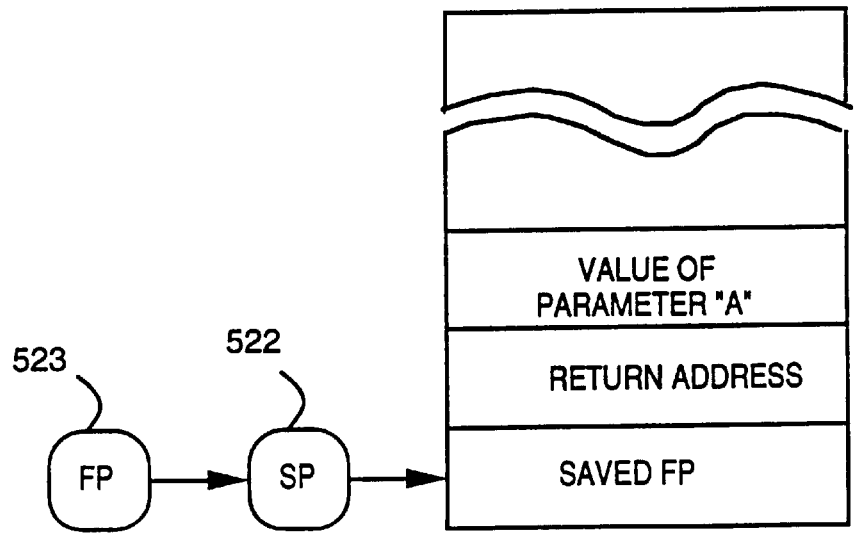
FIG. 7 corresponds to the creation of a frame in accordance with a preferred embodiment.

FIG. 7 corresponds to the creation of a frame in accordance with a preferred embodiment. As shown in FIG. 7, Frame Pointer 523 points to Stackpointer 522, which points to a saved Framepointer. The frame is created when the instructions shown at label 3811 and 3812 of FIG. 5 are executed. Instructions 3811 and 3812 are prologue code that initialize the environment for the sample program's execution. This corresponds to the "P" attributes shown at 3806 as discussed above. Until the instruction at 3812 has been executed, the frame for the sample program has not been initialized, which condition is captured in the map with the "F" attributes 3806. When a function is about to end, it must restore the caller's frame and return any resulting value. These operations are typically performed in the epilogue and are exemplified by the instructions at 3813 and 3814 having the "E" attribute 3807. Also, the instruction at label 3813 restores the caller's frame value. So at label 3814, the sample program's frame has been destroyed as indicated by the "D" attribute 3807. The compiler indentifies the sample program's source code that best motivates the generation of the instructions 3805. The source 3804 could correspond to a character range in the actual program listing or could refer to a set of tokens in a Token Map. One skilled in the art could envision many other ways to map instructions to source code without departing from the claimed invention.

The code optimization annotation 3803 contains zero or more code optimization annotations for each instruction. The code optimization annotation 3815 indicates that the common operation corresponding to passing a variable "a" to a "printf" routine in the sample program is performed only once even though there are two statements in the sample program that execute this code. Code optimization annotation 3816 indicates that many of the instructions necessary for invoking the first "printf" routine corresponds to the second "printf" invocation. Likewise code optimization 3817 and 3818 indicates that much of the code in the second "printf" invocation corresponds to the first.

Overview of the Invention

Figure 8:
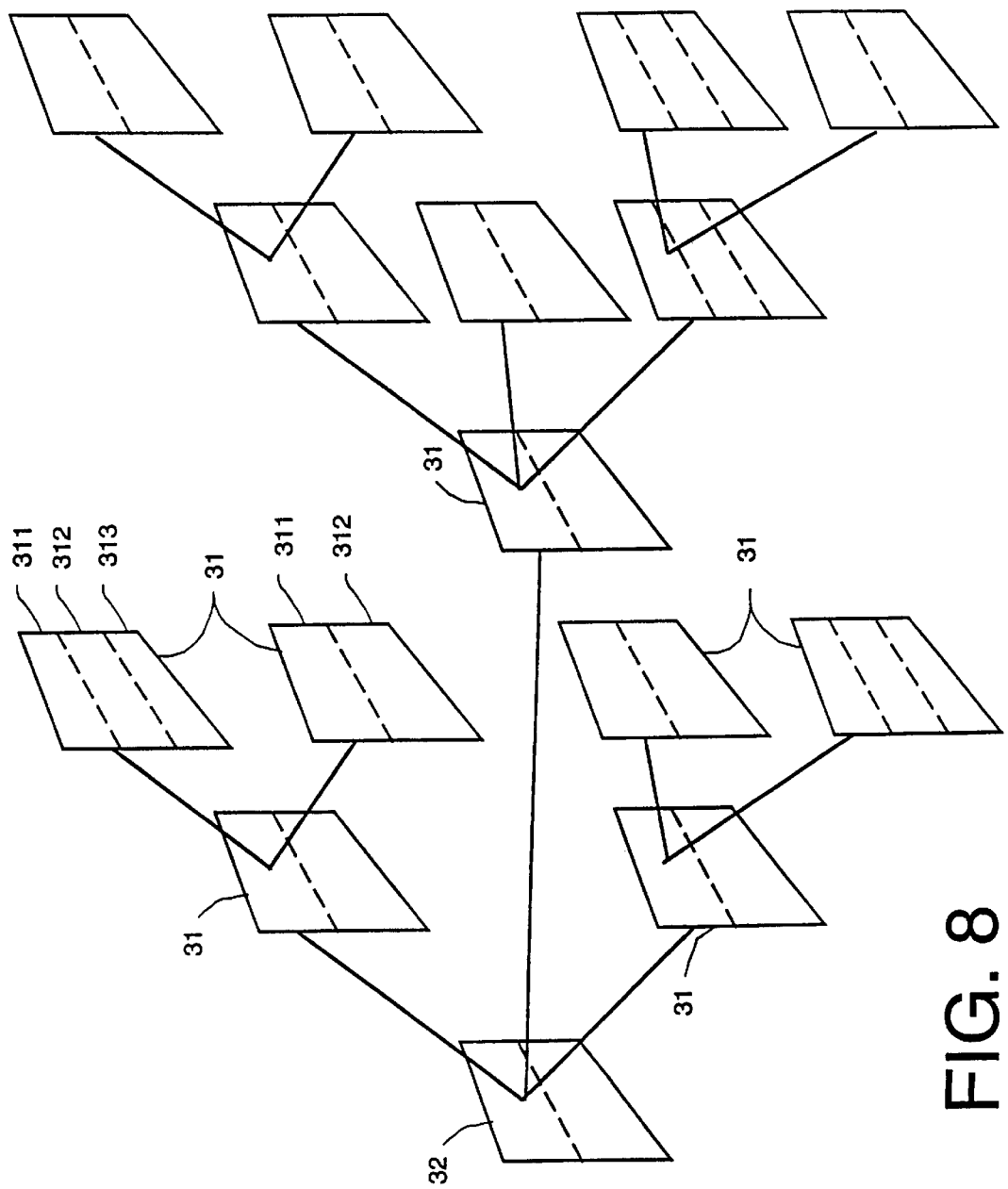
FIG. 8 provides a conceptual representation of a program as composed of a set of components.

FIG. 8 provides a conceptual representation of a program including of a set of components 31. Each component includes a set of properties that are divided into at least two parts, the externally visible (or public) part 311 called the Interface and the Implementation 312 (the private part). As shown in FIG. 8, components depends only on the interface of another component. All the buildable components in a project are organized into a tree structure, with the base of the tree being a root component 32 called the project component. As will be understood by those skilled in the art, the components are not necessarily self-contained entities but may include pointers to storage locations for actual code. Nevertheless, this tree-structured representation is useful in presenting the organization of a program and, therefore, a similar tree-structured representation is used in one of the user screens described hereinafter. An addition to each source component is a property called the symbolic property 313. It is created at the time the component is created but does not contain any data.

Figure 9:
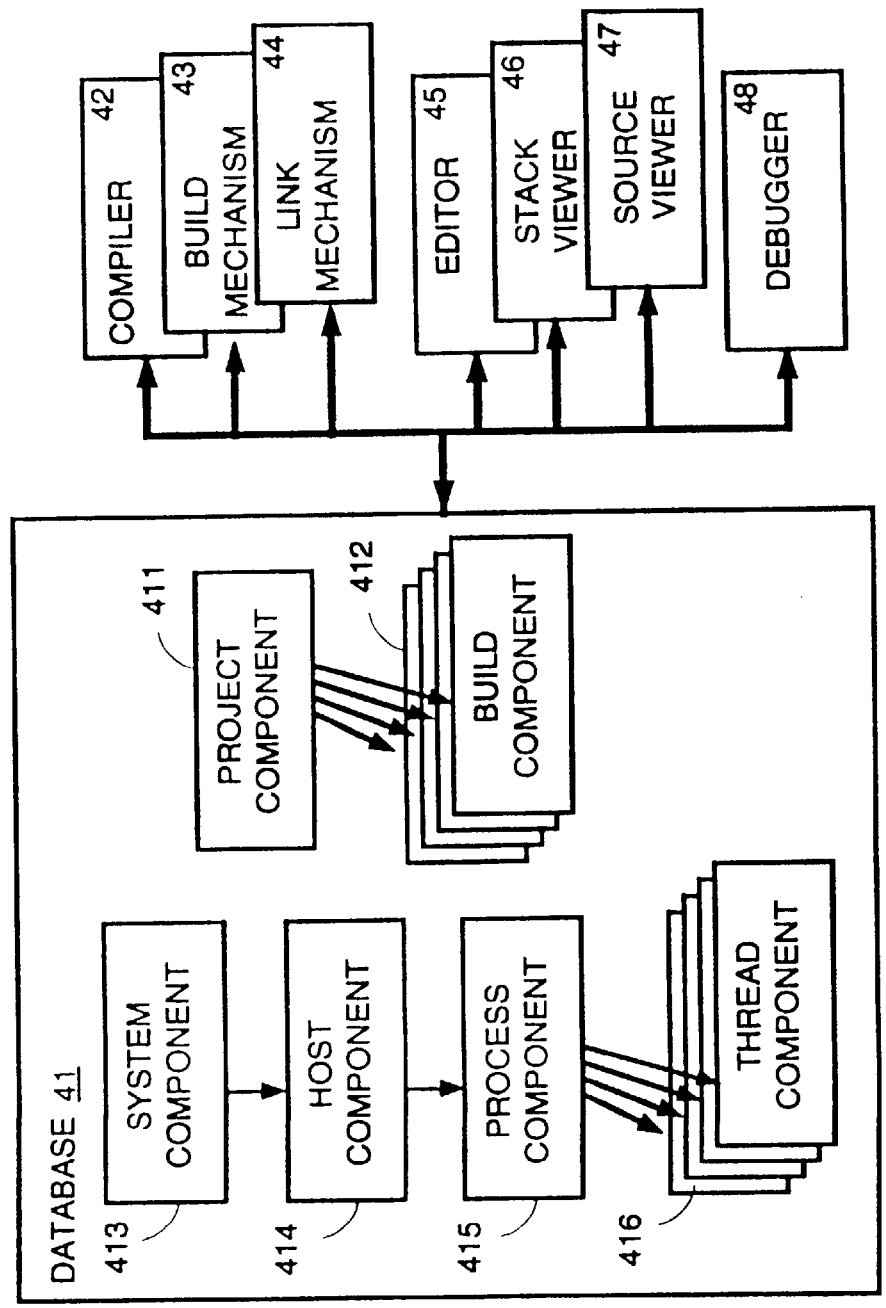
FIG. 9 is a block diagram showing the principles functionalities of the invention.

FIG. 9 is a block diagram showing the eight major functionalities of the invention. These are the Database 41; the Compiler 42; the Build Mechanism 43; the Link Mechanism 44; the Editor 45; a Graphical Viewer; a Stack Viewer 46; a Source Viewer 47 (also called the Dynamic Source Viewer); and the Debugger 48. The Database 41 includes of a set of buildable components, here shown as a Project Component 411 and a collection of Buildable Components 412, which model a program that is to be built. The Database 41 also contains non-buildable components within the System Component 413. The Debugger 48 creates and modifies Host Components 414, which model to target machines; the Process Components 415 and Thread Components 416 model the dynamic state of the executing programs that are being debugged. The Compiler 42 calculates the dependencies associated with the components in the Database 41. The Build Mechanism 43 uses properties of components with dependencies generated by Compiler 42 to build the program. The Link Mechanism 44 connects properties of the built programs to create an executable binary.

A programmer changes the program by means of an Editor 45. The Editor 45 is capable of creating and deleting components, and typically of cutting, copying, pasting and moving components. The Editor 45 is also capable of changing the data in the Interface and Implementation properties usually by allowing direct modification of text, although other more structured approaches such as selection from menus are possible. In practice, Editor 45 may consist of a number of editors, possibly as many as one for each type of Interface or Implementation property or possibly even for subfields of data in those properties.

The Stack Viewer 46 displays the stack property of a single thread component that represents a thread being debugged in a target program. The Stack Viewer 46 displays one part of the dynamic state of the program—the program call stack—that displays the functions currently being called as subroutines. The user can select by direct manipulation using an input mouse, causing the Viewer output to refer to the thread component, stack property, and stack frame selection, which is an ordinal of the stack frame, counting from the currently executing function.

The Dynamic Source Viewer 47 is similar to Editor 45 in that it displays the Interface or implementation property and the program ext. Instead of taking a program component as input, it takes a thread component. The input can be more specific, such as is set as output by the Stack Viewer 46, in which the input reference may also indicate the stack property and a stack frame selection. In this case, the Dynamic Source Viewer 47 will compute the program's location based on the stack frame property, and then the program source component corresponding to the function associated with that stack frame.

Once the programmer requests execution of program under the control of the Debugger 48, it creates components in the same Database 41 representing the processes and threads. Properties in these components contain data that change during the execution of the program. This data includes memory, registers, state, and the properties, which also allow the Debugger 48 to control the debugged program. The Debugger 48 use the symbolic properties of the Components 412. These symbolic properties change on demand to generate the symbolic data that is stored within.

Method For Registering Editing Changes

Figure 10:
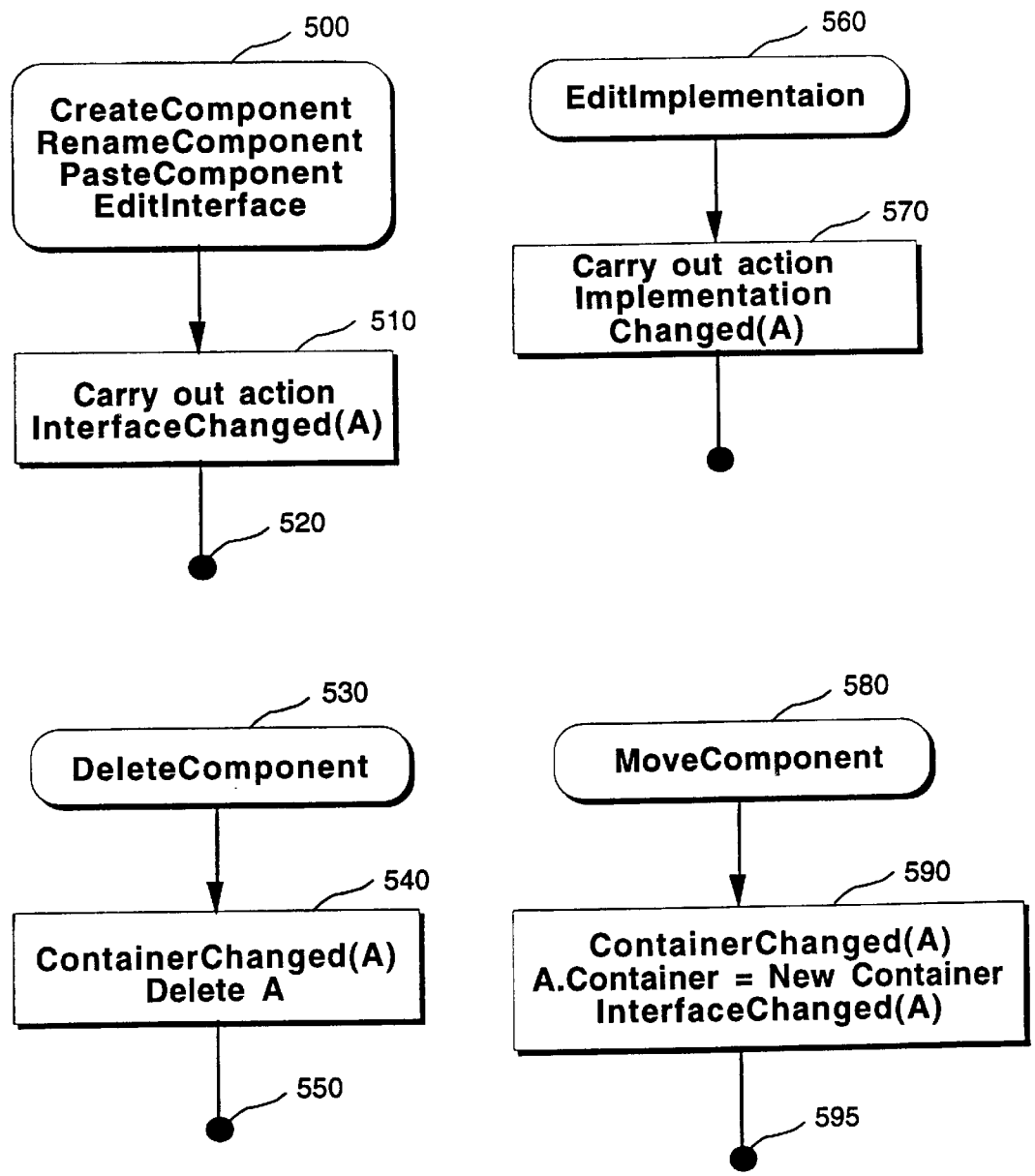

Reference is made to FIGS. 10–13, which show flowcharts illustrating the logic of the functions performed by the Editor associated with incremental building. For buildable non-synthetic components, BuildStates are confined to the values Compiled and NeedToCompile outside the build process. If the Interface property is not present, the InterfaceBuildState is Compiled. If the Implementation property is not present, the ImplementationBuildState is Compiled. In FIG. 10, the various editing state changes are presented. At label 500, when the system identifies a CreateComponent, RenameComponent, PasteComponent or EditInterface command, control passes to function block 510 to process the Interface change. The detailed logic for the change is set forth in FIG. 11.

In FIG. 11, processing commences at decision block 511 where a test is performed to determine if InterfaceBuildState is NeedToCompile. If so, then control is passed via label 514 and editing is continued. These actions take place during editing, not during the rebuild. The next action is most likely another editing action. If not, then at function block 512, the InterfaceBuild state is set to NeedToCompile and the InterfaceChange list is updated accordingly. Then, at function block 513, the ImplementationChanged and ContainerChanged processing is completed. The details of the ImplementationChanged operation are presented in FIG. 12 and the ContainerChanged operations are detailed in FIG. 13.

FIG. 12 sets forth the detailed processing associated with ImplementationChanged. At decision block 571, a test is performed to determine if the ImplementationBuildState is already set to NeedToCompile. If so, then control is passed via label 572 to continue editing. If not, then at function block 573, ImplementationBuildState is set equal to NeedToCompile and ImplementationChangeList is updated accordingly. Then, control is passed back via label 574.

FIG. 13 sets forth the detailed logic associated with a ContainerChange operation. A test is performed at decision block 542 to determine if the variable is buildable. If so, then at function block 543, InterfaceChanged is called with component's container as detailed above in the discussion of FIG. 11. Then, control returns via label 544.

If an EditImplementation command is detected at label 560 of FIG. 10, then processing carries out an action ImplementationChanged as set forth in function block 570 and detailed above in the discussion of FIG. 12.

If a DeleteComponent command is detected at 530 of FIG. 10, then the ContainerChanged processing for component A is initiated as shown in function block 540 and detailed in the discussion of FIG. 13. Then, Container A is deleted, and control is returned via label 550.

If a MoveComponent command is detected at 580 of FIG. 10, then the ContainerChanged processing for Component A is initiated as shown in function block 590 and detailed in FIG. 13. Then, the Component's Container is set equal to NewContainer, and the InterfaceChanged processing for component A is initiated as detailed in FIG. 11. Finally, processing is returned via label 595.

Method of Determining Components of a Build

During a program build, the Project component maintains private lists of references called CompileLists. There is an InterfaceCompileList and an ImplementationCompileList. The Project also maintains a private List of references called the InternalErrorList. In practice, each of these Lists may be physically represented by more than one List for reasons of efficiency.

Figure 14:
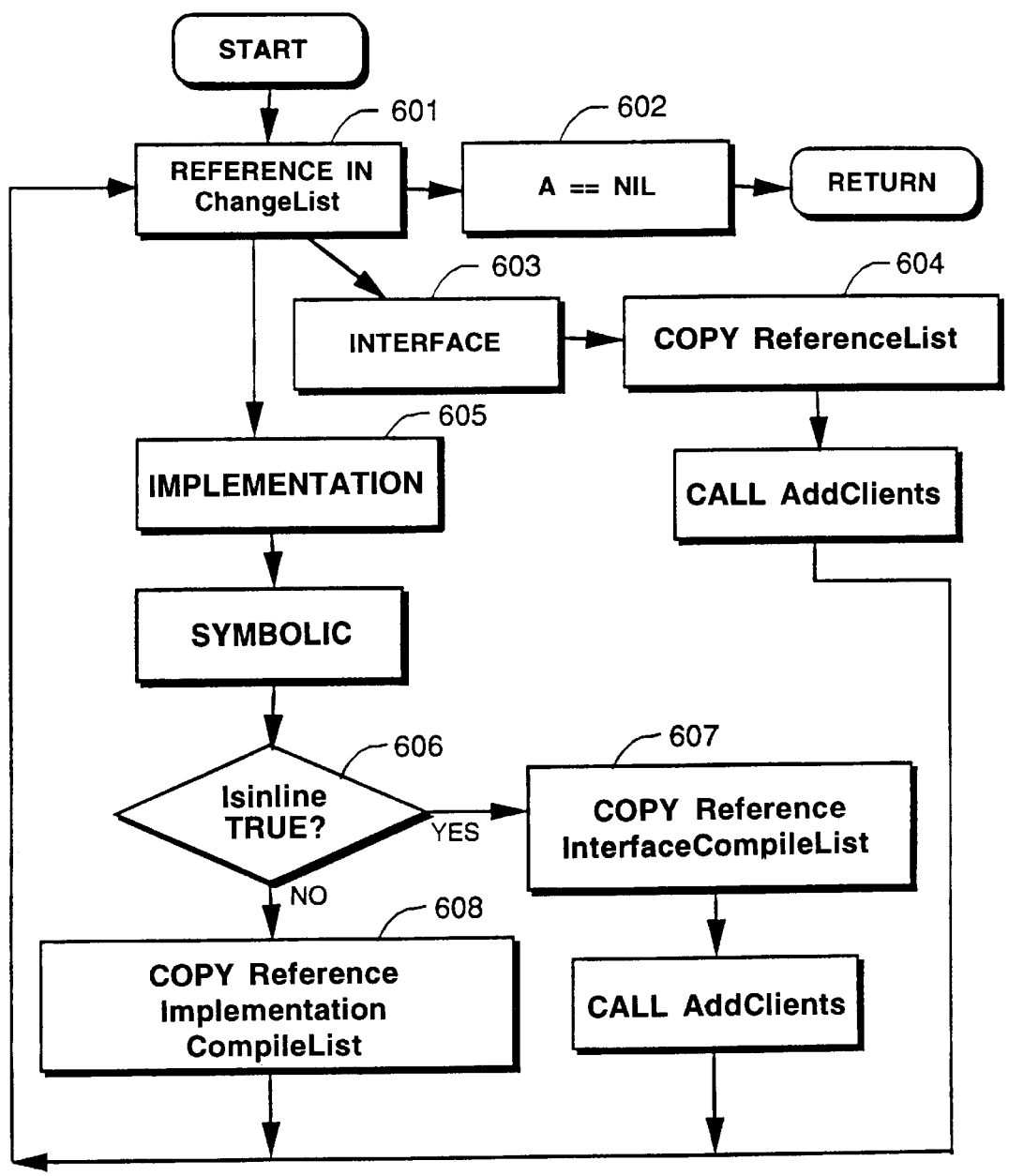
FIG. 14 is a flowchart showing the logic of determining the possible components in the first stage of the operation of the build mechanism according to the invention.

The process is shown in FIG. 14. For each reference in the Project's ChangeList, as indicated by function block 601, a reference is chosen from the front of the List. If there are no more references on the List, processing is complete as indicated at 602. If the reference is an Interface, as indicated at 603, a copy of the reference is placed in the Interface- CompileList in and the function AddClients is called to the reference in function block 604 before processing continues at 601. If the Property Name is not Interface, then its Property Name is Implementation, as indicated at 605, and a test is made in decision 606 to determine if its IsInline attribute is True. If so, a copy of the reference is placed in the InterfaceCompileList and the function AddClients is called on the reference in function 607 before processing continues at 601. Otherwise, its property name must be Implementation and its IsInline attribute must be False, and a copy of the reference is placed on the Implementation CompileList in function block 608 before processing continues at block 601.

The pseudocode for the function CreateCompileLists is as follows:

```
CreateCompileLists() {
    for each A in ChangeList{
        if( A.PropertyName == Interface ) {
            InterfaceCompileList.Add( A ) ;
            AddClients( A ) ;
        }
        else if( A.PropertyName == Implementation ) {
            if( IsInLine == True ) {
                InterfaceCompileList.Add( A ) ;
                AddClients( A ) ;
            }
            else if( IsInLine == False ) {
                ImplementationCompileList.Add( A ) ;
            }
        }
    }
}
```

The function AddClients, for each reference in the parameter references clients property, examines the reference and, if its BuildState is Compiled, sets the reference's BuildState to Uncertain, adds a copy of the reference to the appropriate CompileList, and calls AddClients on the reference. This process is called creating the Client Closure of the ChangeList. The Client Closure represents the subset of components that may need to be recompiled as the result of a build. In practice, dependencies and changes generated by the Compiler 42 as the build progresses are used to avoid having to compile as many components as possible in the Client Closure.

The following is the pseudo-code for the AddClients function:

```
AddClients( A ) {
    for each B in A.ClientList{
        if( B.BuildState == Compiled ) {
            B.SetBuildState( Uncertain ) ;
            if( B.PropertyName == Interface ) {
                InterfaceCompileList.Add( B ) ;
                AddClients( S ) ;
            }
            else if( B.PropertyName == Implementation ) {
                ImplementationCompileList.Add( B ) ;
                AddClients( B ) ;
            }
        }
    }
}
```

Method of Processing Interfaces

Figure 15:
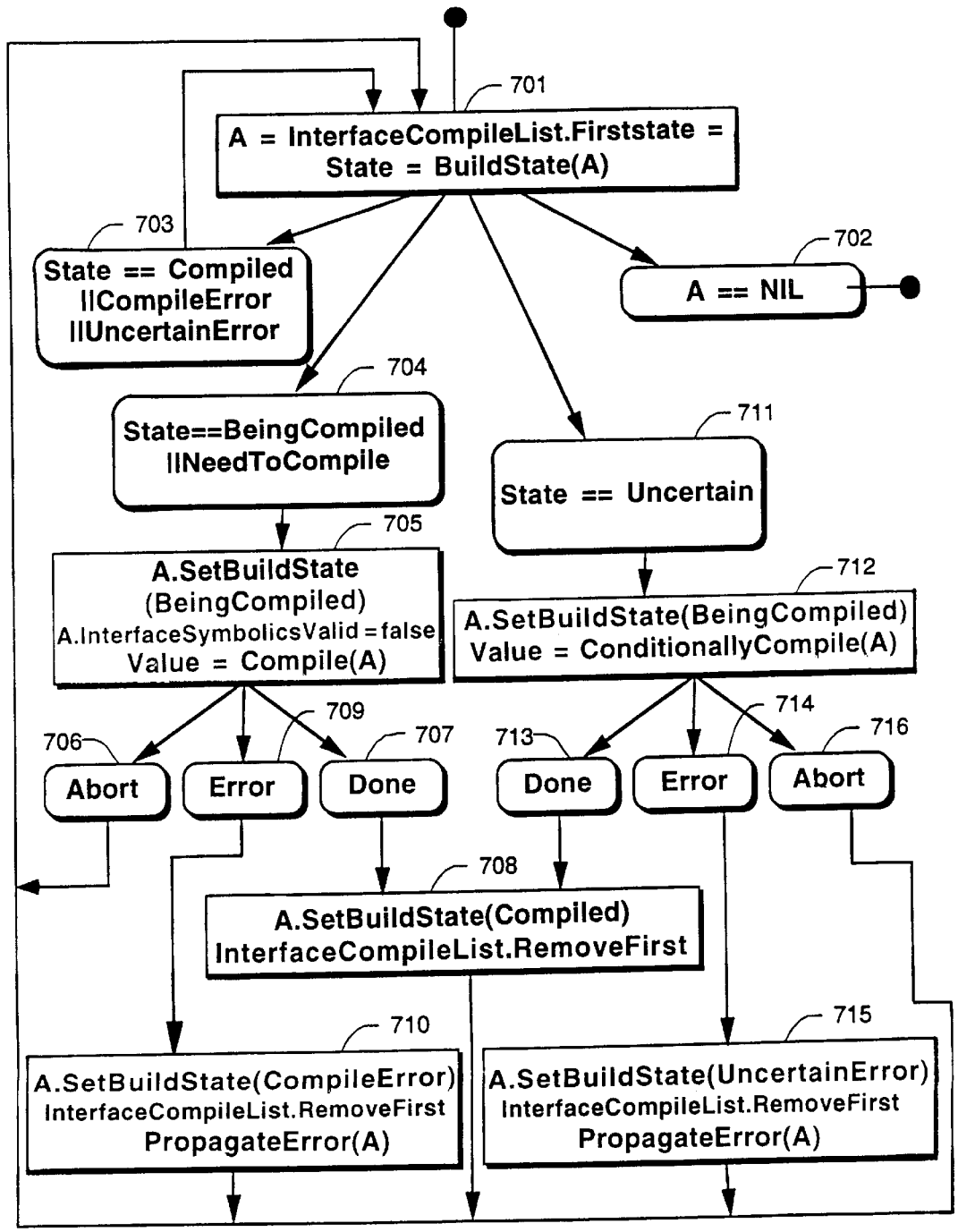
FIG. 15 a flowchart showing the logic of processing Interfaces in the second stage of the operation of the build mechanism according to the invention.

Processing Interfaces is the second stage of the Build process. The possible BuildStates for items on the Interface-CompileList are Compiled, BeingCompiled, NeedToCompile, Uncertain, CompileError or UncertainError. The Interface CompileList is processed until it is empty as shown in the flowchart of FIG. 15.

The process is entered at block 701 where a reference is chosen from the front of the InterfaceCompileList. If there are no more references on the list, processing is complete at block 702. If the InterfaceBuildState of the component associated with the reference is Compiled, CompileError or UncertainError, as indicated in block 703, the reference is removed from the front of the list and processing continues in block 701.

If the InterfaceBuildState of the component associated with the reference is BeingCompiled or NeedToCompile, as indicated in block 704, the BuildState of the component is set to BeingCompiled and the InterfaceSymbolicsValid flag is set to false in function block 705. Then the Compile function (which invokes the Compiler 42) is called on the Interface of the component. This function will return one of the values Abort, Done and Error.

If the value returned is Abort at block 706, then processing continues at block 701. If the value returned is Done at block 707, then the InterfaceBuildState of the component is set to Compiled and the reference is removed from the front of the list at block 708 before processing continues with block 701. If the value returned is Error at block 709, then the InterfaceBuildState of the component is set to CompileError, the reference is removed from the front of the list, and the function PropagateError is called on the component in function block 710 before processing continues at block 701.

If the InterfaceBuildState of the component associated with the reference is Uncertain, as determined at block 711, the BuildState of the component is set to BeingCompiled at function block 712. Then the ConditionallyCompile function (which may or may not call the Compiler 42) is called on the Interface of the component. This function will also return one of the values Abort, Done and Error. If the value returned is Abort, then processing continues at block 701. If the value returned is Done at block 713, then the reference is removed from the front of the list at function block 708, and processing continues at block 701. If the value returned is Error at block 714, then the reference is removed from the front of the list and the function PropagateError is called on the component in function block 715 before processing continues at block 701.

The pseudocode for the ProcessInterfaces function is as follows:

```
ProcessInterfaces() {
    until( ( A = InterfaceCompileList.First ) == NIL ) {
        state = A.BuildState;
        if( A = Compiled _ CompileError _ Uncertainerror ) {
            InterfaceCompileList.RemoveFirst();
        }
        else if( A = BeingCompiled _ NeedToCompile ) {
            A.SetBuildState( BeingCompiled ) ;
            A.InterfaceSymbolicsValid = false;
            value = Compile( A ) ;
            if( value == Abort ) {
                continue;
            }
            else if( value == Done ) {
                A.SetBuildState( Compiled ) ;
                InterfaceCompileList.RemoveFirst () ;
            }
```

-continued

```
        else if( value == Error ) {
            A.SetBuildState( CompileError ) ;
            InterfaceCompileList.RemoveFirst() ;
            PropagateError( A ) ;
        }
    }
    else if( A = Uncertain ) {
        A.SetBuildState( BeingCompiled ) ;
        value = ConditionallyCompile( A ) ;
        if( value == Abort ) {
            continue;
        }
        else if( value == Done ) {
            A.SetBuildState( Compiled ) ;
            InterfaceCompileList.RemoveFirst() ;
        }
        else if( value == Error ) {
            A.SetBuildState( UncertainError ) ;
            InterfaceCompileList.RemoveFirst() ;
            PropagateError( A ) ;
        }
    }
}
```

The function PropagateError adds a reference corresponding to the component to the Project's InternalErrorList and carries out the following for every reference on the component's Client list: If the reference's BuildState is CompileError or UncertainError, the process continues with the next reference. If the reference's BuildState is NeedToCompile, the process sets its BuildState to CompileError, adds the reference to the InternalErrorList, and calls PropagateError on the reference before continuing with the next reference. If the reference's BuildState is Uncertain, the process sets its BuildState to UncertainError, adds the reference to the InternalErrorList, and calls PropagateError on the reference before continuing with the next reference.

The pseudocode of the function PropagateError is as follows:

```
PropagateError( A ) {
    for each B in A.ClientList {
        state = B.BuildState;
        if( state == CompileError _ UncertainError ) [
            continue;
        }
        else if( state == NeedToCompile ) {
            B.SetBuildState( CompileError ) {
            InternalErrorList.Add( B ) ;
            PropagateError( B ) ;
        }
        else if( state == Uncertain ) {
            B.SetBuildState( UncertainError ) ;
            InternalErrorList.Add( B ) ;
            PropagateError( B ) ;
        }
    }
}
```

Method of Processing Implementations

Figure 16:
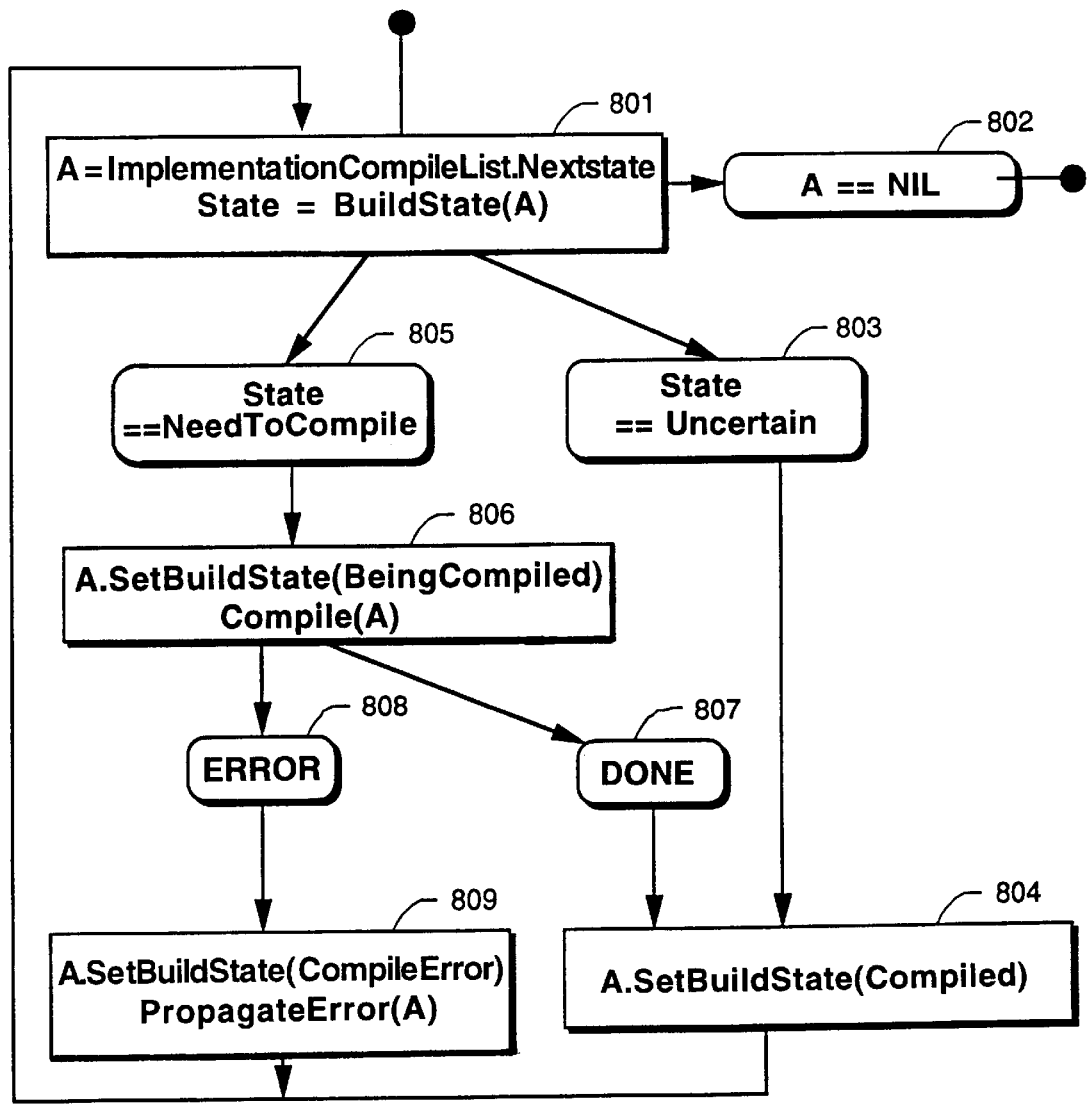
FIG. 16 is a flowchart showing the logic of processing Implementations in the third stage of the operation of the build mechanism according to the invention.

Processing Implementations is the third stage of the Build process. Each reference in the ImplementationCompileList is processed as shown in the flowchart of FIG. 16. The process is entered at block 801 where a reference is chosen from the front of the ImplementationCompileList. If there are no more references on the list, processing is complete at block 802. If the BuildState of the reference is Uncertain, as determined in block 803, the BuildState is set to Compiled in function block 804 before processing continues in block 801. If the BuildState of the reference is NeedToCompile, as determined in block 805, the component is compiled in function block 806. The possible values returned from the Compiler 42 are Done and Error. If the value returned is Done at block 807, the BuildState of the reference is set to Compiled in function block 804 before processing continues in block 801. If the value returned is Error in block 808, the BuildState of the reference is set to CompileError and the function PropagateError is called on the component in function block 809 before processing continues in block 801. If the BuildState of the reference is CompileError or UncertainError, nothing is done. Note that the processing of Implementations is order independent at this stage because dependencies can only be on Interfaces or Implementations whose IsInline attribute is True, and these have already been processed.

The pseudocode for ProcessImplementations is as follows:

```
ProcessImplementations() {
    for each A in ImplementationCompileList{
        state = A.BuildState;
        if( A = Uncertain ) {
            A.SetBuildState( Compiled ) ;
        }
        else if( A = NeedToCompile ) {
            value = Compile( A ) ;
            if( value == Done ) {
                A.SetBuildState( Compiled ) ;
            }
            else if( value == Error ) {
                A.SetBuildState( CompileError ) ;
                PropagateError( A ) ;
            }
        }
        else if(A = CompileError _ UncertainError ) {
        }
    }
}
```

Compiler Which Supports Build Process

The Compiler 42 is called via the Compile function. The Compiler 42 processes the Source Text and identifies the names of possible external components. The Compiler 42 next obtains a list of references to all components. The Compiler 42 may eliminate references from the list using language-specific knowledge such as component kinds. The Compiler 42 then calls the function GetDeclaration for each external component identified in the text. The Compile function clears any existing errors on a component before invoking the Compiler 42. This will clear any error messages from the Errors property and remove any references from the Project's ErrorList property.

Figure 17:
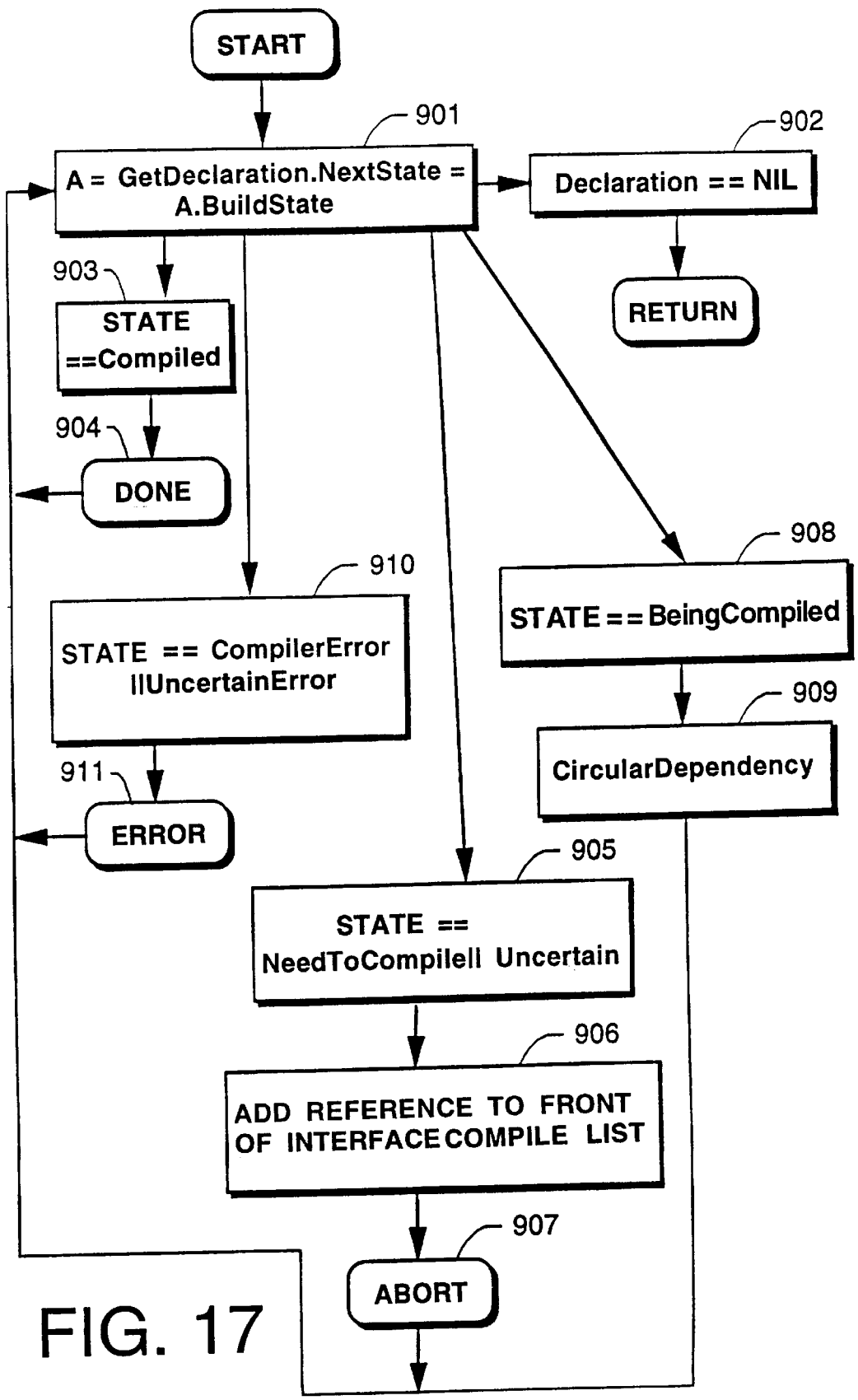
FIG. 17 is a flowchart showing the logic of the GetDeclarations function called by the compiler according to the invention.

The Compiler 42 first calls the GetDeclaration function, which is illustrated by the flowchart of FIG. 17. The GetDeclaration function returns one of the values Abort, Done, CircularDependency or Error and may additionally return the data of the Declaration. The process is entered at block 901 where each reference is examined for its BuildState. If there are no more references to process, as indicated by block 902, processing is complete and a return is made. If the BuildState of the component is Compiled, as indicated at block 903, the function returns Done at function block 904, and the stored Declaration data is also returned, before processing continues at block 901. If the BuildState of the component is NeedToCompile or Uncertain, as indicated at block 905, a reference corresponding to the component is added to the front of the InterfaceCompileList in function block 906 and the function returns Abort in function block 907 before processing continues at block 901. Declaration data is not returned in this case. If the BuildState of the component is BeingCompiled, as indicated by block 908, then the function returns Circulardependency at function block 909 before processing continues at block 901. Declaration data is not returned for this case either. If the BuildState of the component is CompileError or UncertainError, as indicated in block 910, then the function returns Error in function block 911 before processing continues at block 901. Again, declaration data is not returned.

The pseudocode for the GetDeclaration function is as follows:

```
value GetDeclaration( A, Declaration ) {
    Declaration = NIL;
    state = A.BuildState;
    if( state == Compiled ) {
        Declaration = CurrentDeclaration() ;
        return( Done ) ;
    }
    else if( state == NeedToCompile _ Uncertain ) {
        InterfaceCompileList.AddToFront( A ) ;
        return( Abort ) ;
    }
    else if( state == BeingCompiled ) {
        return( Circulardependency ) ;
    }
    else if( state == CompileError _ UncertainError ) {
        return( Error ) ;
    }
}
```

After calling GetDeclaration, the Compiler 42 continues as follows. If the value returned was Abort, the Compiler 42 must terminate processing and return the value Abort. An alternative implementation would be for the Compiler 42 to suspend compilation, to be restarted or abandoned after compiling the returned component. This would require the Compiler 42 to be reentrant but otherwise would require no essential change to the procedure as described. If the value returned was Compiled, the Compiler 42 can continue processing. If the Declaration is used, this will constitute a SourceReference dependency, and the Compiler 42 should keep track of both the dependency and its nature. If the value returned was Circulardependency or Error, then the Compiler 42 must terminate processing, call the SetError function on the component, and return the value Error. The Compiler 42 may optionally continue processing to possibly find more errors before terminating.

If the calls to GetDeclaration return Compiled, the Compiler 42 will continue processing the source text in a conventional manner. If any error is encountered in the processing, the Compiler 42 will call the SetError function on the component and return the value Error. If no errors are encountered, the Compiler 42 then returns the value Done. If the Compiler 42 has been processing an Interface, then it will store the new value of the Declaration property.

Method for Processing Errors

Before the Compiler 42 is called to compile an Interface or Implementation, any existing Errors are cleared. This will ensure that all error messages are up to date. Because of the built-in dependency between Interfaces and Implementations and the fact that the errors are propagated, it is never possible to get compiler errors on both the Interface and the Implementation on the same build.

When the Compiler 42 encounters an error, it calls the function SetError which communicates information about the error, including the location of the error and a message describing the error, back to the erroneous component. This information is stored in the Errors property and the appropriate source property (Interface or Implementation) of the component. Also a reference is stored in a global error list maintained by the Project which allows convenient access to all errors.

The error will be propagated to any dependent component so that these components need not be compiled later, since it is known that these compiles will fail. Furthermore, the build will continue after errors are encountered and will correctly build as many components as possible that are not themselves explicitly in error or which depend on components with errors.

The SetError function takes the error message passed to it by the Compiler 42 and creates an entry in the component's Errors property corresponding to the appropriate property (Interface or Implementation). It also creates an entry in the Project's ErrorList property corresponding to the error. The two entries created in this way share the same kev so that they remain "linked". The function also typically records the position of the error in the program source using a "sticky marker" which remains attached to the same range of characters during later user editing.

If the Compiler 42 successfully completes processing of the source text, it will produce object code and pass that to the Linker function to incrementally link. Alternatively, the object code could be stored until the end of the build process and linked in a traditional fashion.

The Compiler 42 will now update the SourceReferences property of the component and the Clients properties of each SourceReference. For each reference to, say, component B in the SourceReferences property of, say, component A, there must be a corresponding reference (which has the same dependency information) to component A in the Clients property of component B.

The Compiler 42 will create a change describing the ways in which the Declaration has changed from its previous value. The Compiler 42 will call the function PropagateChange on the component passing it the calculated change. The Compiler 42 will then set the new value of the Declaration. The function PropagateChange matches the change against the dependency of each reference in the component's Client List. If the match indicates that the referenced component has been affected by the change and its BuildState is not CompileError or UncertainError, its BuildState is set to NeedToCompile.

It is possible for the Compiler 42 to use the SetError function to issue warning messages or suggestions of various forms. In this case, if only warning messages are returned, the Compile function should return Done. The warning messages will be added to the Errors property and references will be added to the Project's ErrorList property. However, otherwise the compile is treated as successful. The appropriate BuildState will be set to Compiled and no errors will be propagated. If only warnings or suggestions are issued, then the program will be completely and correctly built.

Process for Conditionally Compiling a Component

Figure 18A:
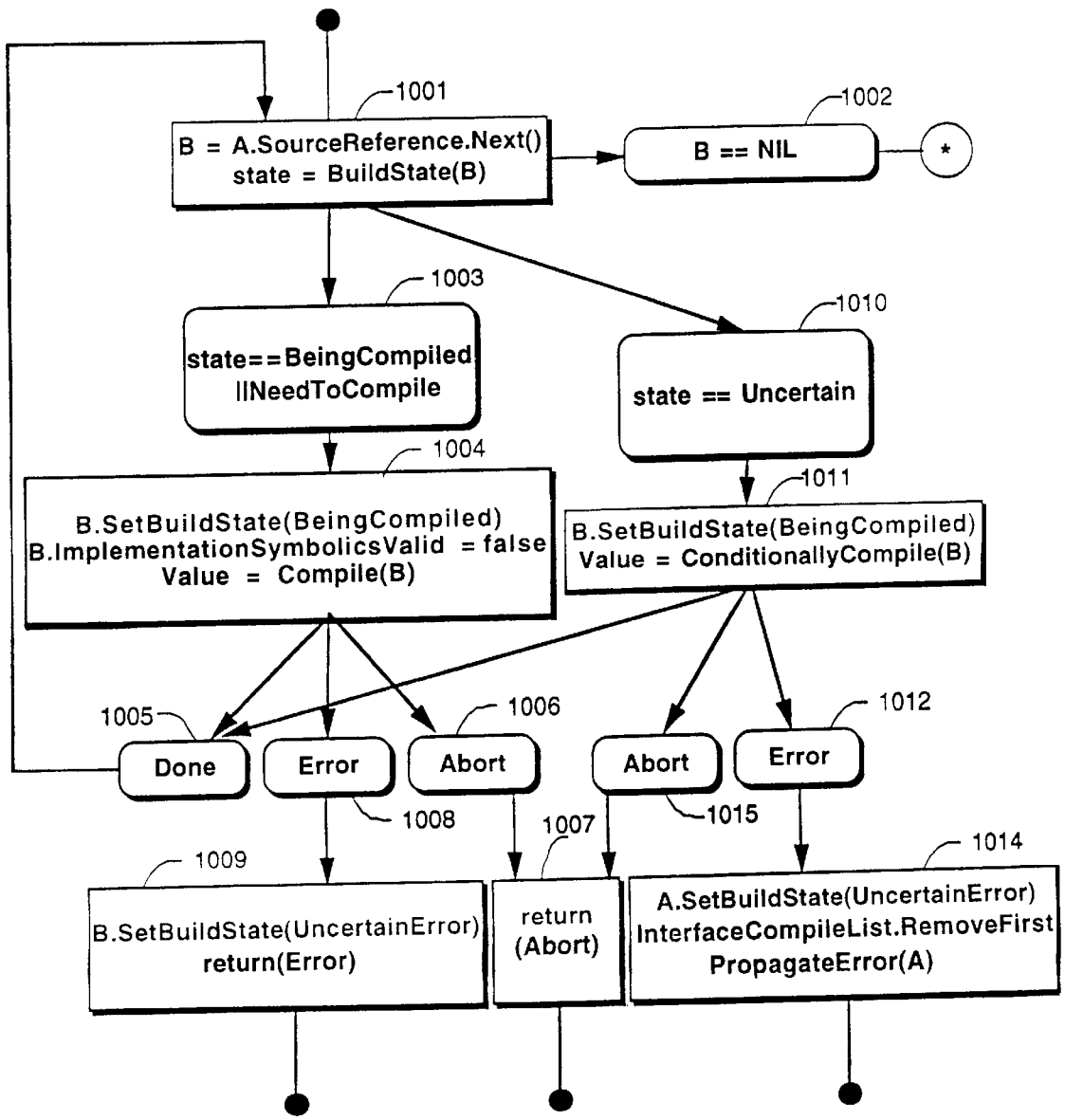
FIGS. 18A and 18B, taken together, are a flowchart showing the logic of the Conditionally Compile function.
Figure 18B:
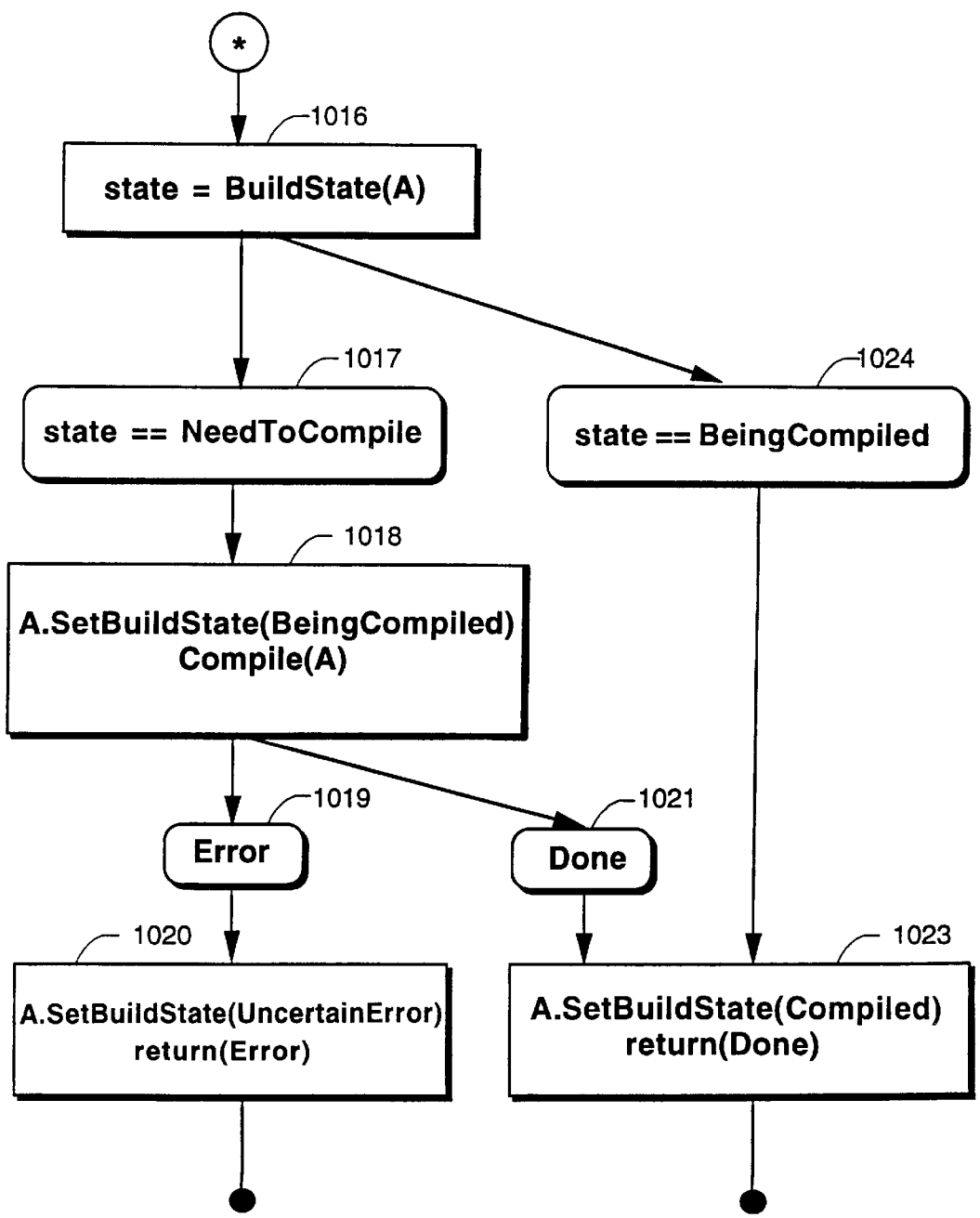

The flowchart for the function ConditionallyCompile is shown in FIGS. 18A and 18B, to which reference is now made. Each component B in a component A's SourceReferences is processed in block 1001. If all components B have been processed, as indicated by block 1002, then processing is complete as to the components B, and the process goes to FIG. 18B to compile component A. If the BuildState of component B is BeingCompiled or NeedToCompile, as indicated at block 1003, the BuildState of the component is set to BeingCompiled, the ImplementationSymbolicsValid flag is set to false, and the component is compiled in function block 1004. The Compile function may return one of the values Done, Abort or Error. If the value Done is returned in block 1005, processing continues in block 1001.

If the value returned is Abort in block 1006, the function is terminated and the Abort is returned in function block 1007. If the value returned is Error in block 1008, the original component's BuildState is set to UncertainError, the function is terminated, and Error is returned in function block 1009. If the BuildState of component B is Uncertain, as indicated at block 1010, then the BuildState is set to BeingCompiled and the component is conditionally compiled in function block 1011. Again, the ConditionallyCompile function may return one of the values Done, Abort or Error. If the value Done is returned in block 1005, processing continues in block 1001. If Error is returned in block 1012, the component's BuildState is set to UncertainError, the component A is removed from the InterfaceCompileList, and the PropagateError function is called in function block 1014 before the function is terminated. If Abort is returned in block 1015, Abort is returned in function block 1007 before the function is terminated.

Turning now to FIG. 18B, if all the references have been processed, then they all have the BuildStates compiled. However, one of the SourceReferences may have propagated a change to the component during the processing to this point, and so its BuildState may now be either BeingCompiled or NeedToCompile. Therefore, the BuildState of component A is determined in block 1016. If the BuildState is NeedToCompile, as indicated at block 1017, then the BuildState is set to BeingCompiled and component A is compiled in function block 1018. The Compiler 42 can return either Error or Done. Note that Abort should never occur because all the SourceReferences are Compiled at this stage. If Error is returned in block 1019, then the BuildState is set to CompileError and Error is returned in function block 1020. If Done is returned in block 1021, then the BuildState is set to Compiled and Done is returned in function block 1023. If the BuildState of component A is BeingCompiled, as indicated at block 1024, then the BuildState is set to Compiled and Done is returned in function block 1023.

The pseudocode for the function ConditionallyCompile is as follows:

```
value ConditionallyCompile( A ) {
    for each B in A.SourceReference{
        state = B.BuildState;
        if( state == NeedToCompile _ BeingCompiled ) {
            B.SetBuildState( BeingCompiled );
            B.ImplementationSymbolicsValid = false;
            value = Compile( B );
            if( value == Done ) {
                continue;
            }
            else if( value == Abort ) {
                return( Abort );
            }
            else if(value == Error ) {
                A.SetBuildState( UncertainError );
                return( Error );
            }
        }
        else if( state == Uncertain );
            A.SetBuildState( BeingCompiled );
            value = ConditionallyCompile( A );
            if( value == Done ) {
                continue;
            }
            else if( value == Abort ) {
                return( Abort );
            }
            else if( value == Error ) {
                A.SetBuildState( UncertainError );
                InterfaceCompileList.Remove( A );
                PropagateError( A );
            }
        }
    }
    state = A.BuildState;
    if( state == NeedToCompile ) {
        A.SetBuildState( Being Compiled );
        value = Compile( A );
        if( value == Done ) {
            A.SetBuildState( Compiled );
            return( Done );
        }
        else if( value == Error ) {
            A.SetBuildState( CompileError );
            return( Error );
        }
    }
    A.SetBuildState( Compiled );
    return( Done );
}
```

Method for Post Processing Errors

Post Processing errors is the fourth stage of the Build process. If any errors occurred during the build, then the function PostProcessErrors is called at the end of the build. For each reference in the InternalErrorList, if the reference's BuildState is CompileError, the BuildState is changed to NeedToCompile. If the reference's BuildState is UncertainError, the BuildState is changed to Compiled.

When all the references on the InternalErrorList have been processed, the list is cleared of all entries. As a convenience to the programmer, if the Project's ErrorList contains any entries, a window or the Browser is opened on the Project's ErrorList.

The pseudocode for the PostProcessErrors function is as follows:

```
PostProcessErrors() {
    for each A in InternalErrorList{
        state = A.BuildState;
        if( state == CompileError ) {
            A.SetBuildState( NeedToCompile );
        }
        else if( state == UncertainError ) {
            A.SetBuildState( Compiled );
        }
    }
```

```
    InternalErrorList.ClearAll() ;
    if( ErrorList.Count !=0 ) {
        OpenErrorWindow() ;
    }
}
```

Method for Incrementally Generating Symbolic Information

Figure 20:
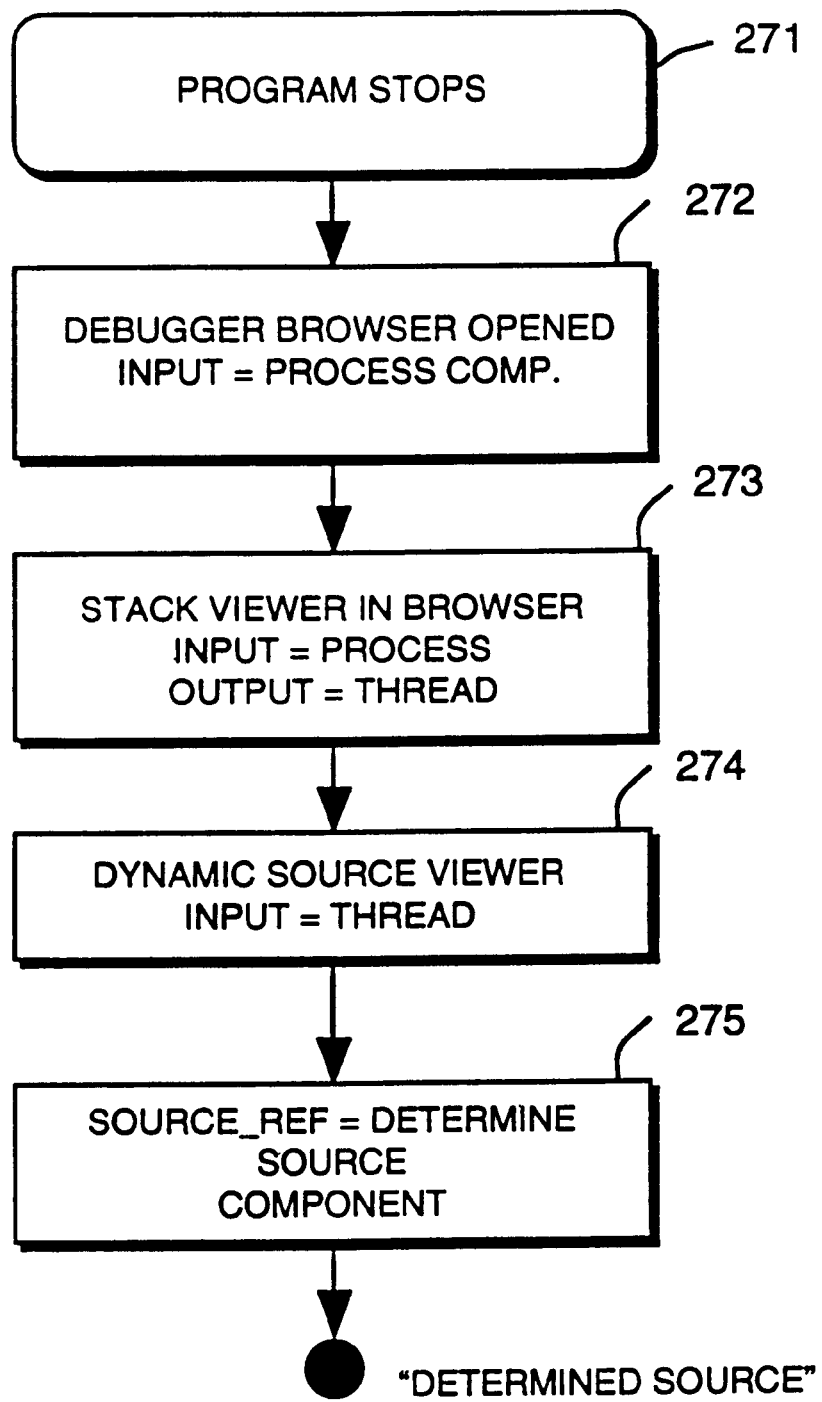
FIGS. 20 to 24 are flowcharts of the debugger logic in accordance with a preferred embodiment.

After the Build process has completed and the program is linked, the user chooses to start the program using the Build & Debug menu command using the Debugger 48. FIG. 20 is a flowchart showing the overall debugging process, and begins with step 271.

Program Stops

The program being debugged stops at 271 on a breakpoint or on some other condition such as a hardware exception. The HOOPS Debugger 48 is notified of the change in state by the operating system.

Debugger Browser Opened on Process

Figure 19:
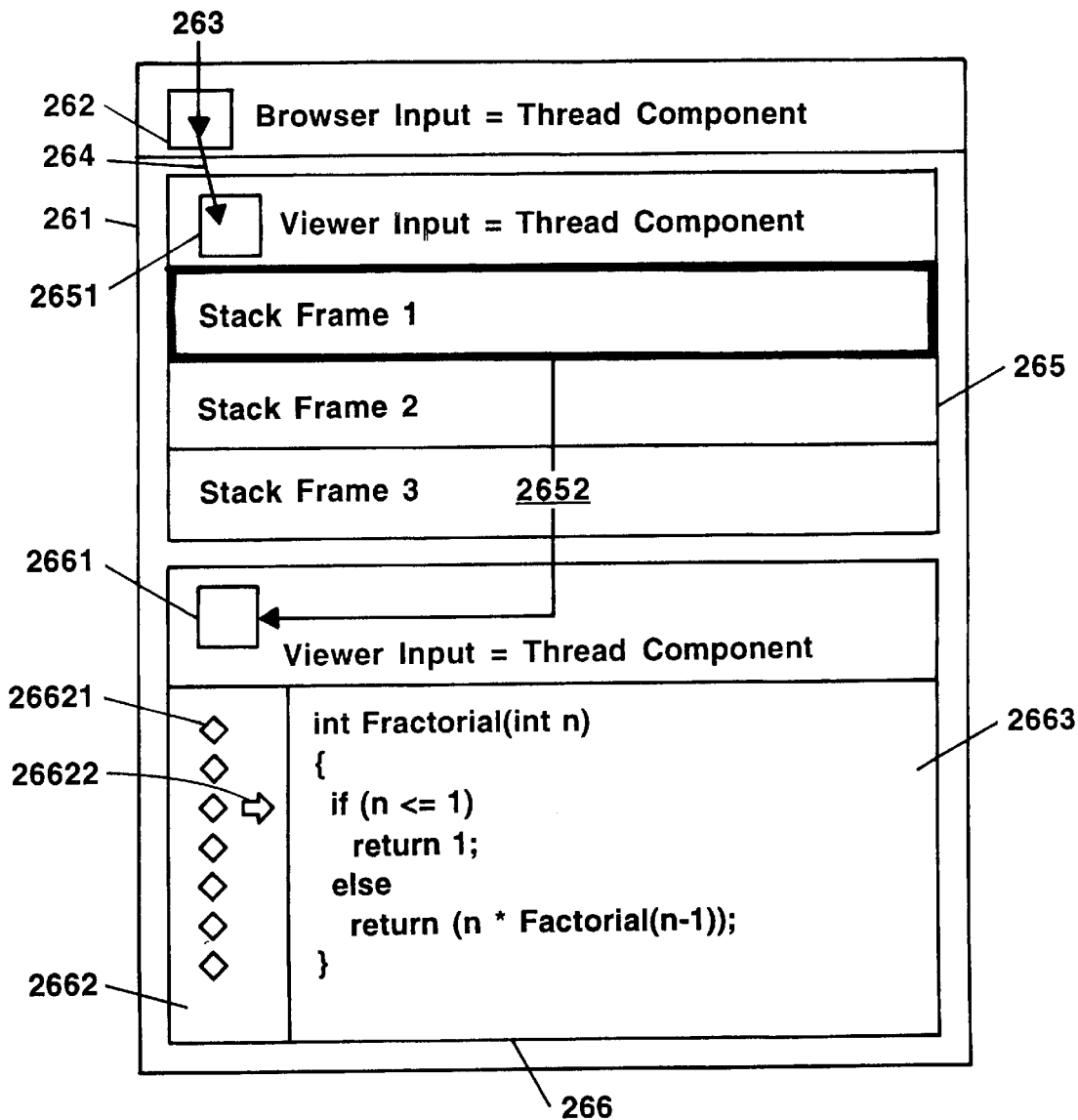
FIG. 19 is a view of the debugger browser in accordance with a preferred embodiment.
Figure 25:
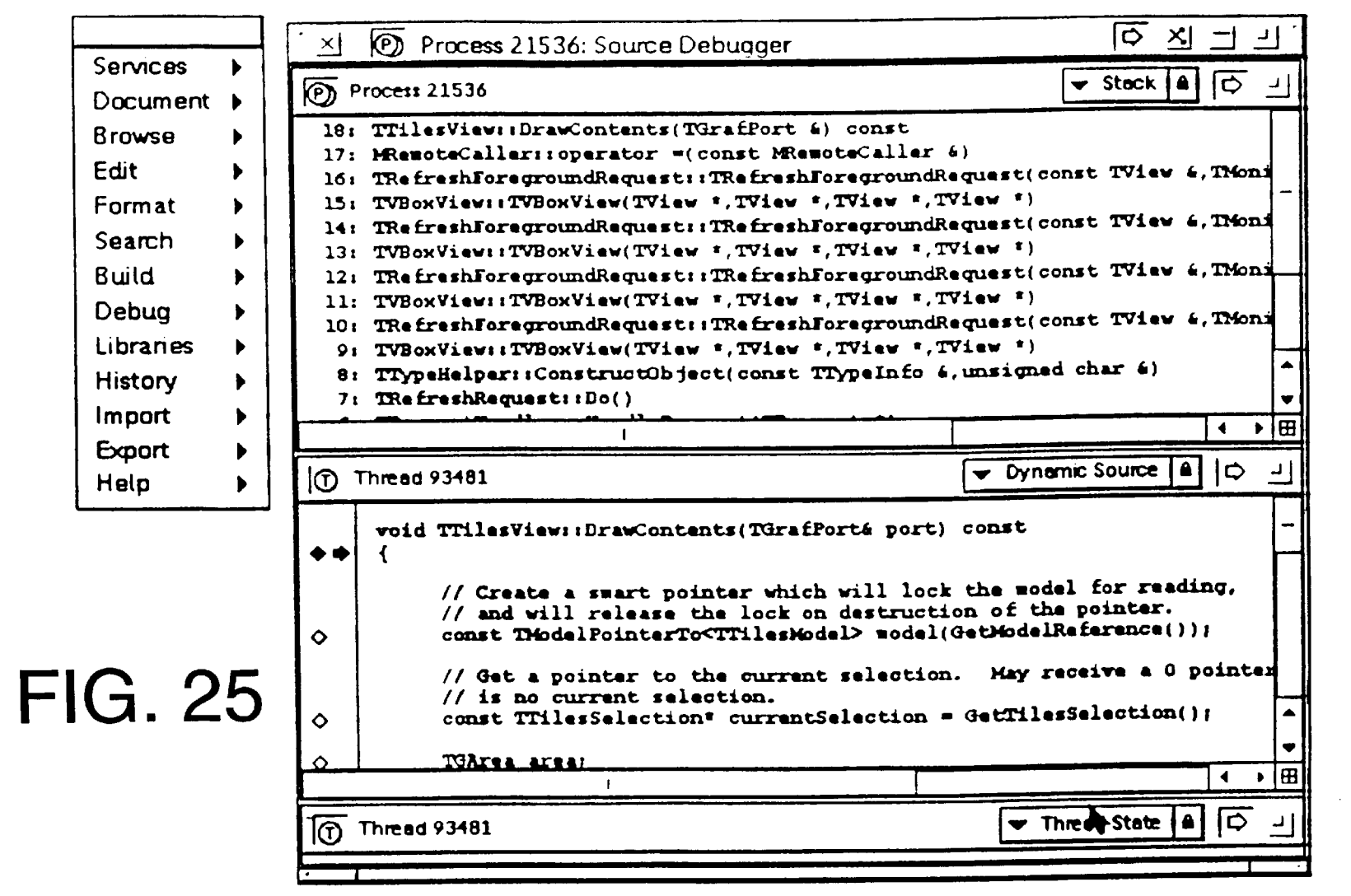

Responsive to the change in state, HOOPS opens a Browser 261 on the process, using the thread that stopped as the input to the Browser. FIG. 19 is a view of the Debugger Browser. The Debugger Browser contains five major parts, the Graphical Browser Window 261, the Browser Input Well 262, the Browser Input 263, the Stack Viewer 265 the Viewer Input 264 which is passed from the Browser Input Well 262 to the Stack View 265. Flow chart step 272 indicates the step of opening the Debugger Browser. A graphical screen representation of the Debugger 48 is shown in FIG. 25.

Debugger Thread is Passed as Input to the Thread Viewer

The thread input is passed from the Debugger Browser to the first viewer, Stack Viewer 265 of FIG. 19. Stack Viewer 265 uses the first stack frame as a selection, setting the viewer output to the thread component and the first stack frame. Stack Viewer 265 displays graphically, at 2663, one part of the debugged thread, its program stack. The Viewer Input 2651 takes its thread component input from the Browser. The Viewer reads the Thread State information from the Component Database 41, which is updated as a result of the earlier state change. By default, the Viewer selects the first stack frame, which corresponds to the currently executing function. This stack frame is set as the Stack Viewer output 265. Flow chart step 273 of FIG. 20 indicates the step of the progression of the data flow.

Debugger Thread is Passed as Input to the Dynamic Source Viewer.

As indicated in step 274, the Browser is configured to pass the Stack Viewer output 2652 of FIG. 19 to the Dynamic Source Viewer 266. This Viewer uses the thread input at the Input Well 2661, to determine a source component that best represents the thread state, and then displays the source code for the component, a breakpoint view 2662, breakpoints 26621 for the function and an indicator 26622 to the next statement that will be executed when the program restarts.

Step 275 of FIG. 20 indicates the subroutine to determine the source code for the thread component. The reference Source_Ref to the source component is returned from the subroutine. Once the source component is determined, the source Dynamic Source Viewer displays the component appropriately.

The Dynamic Source Viewer Displays Source Based on the Availability of Components.

Figure 21:
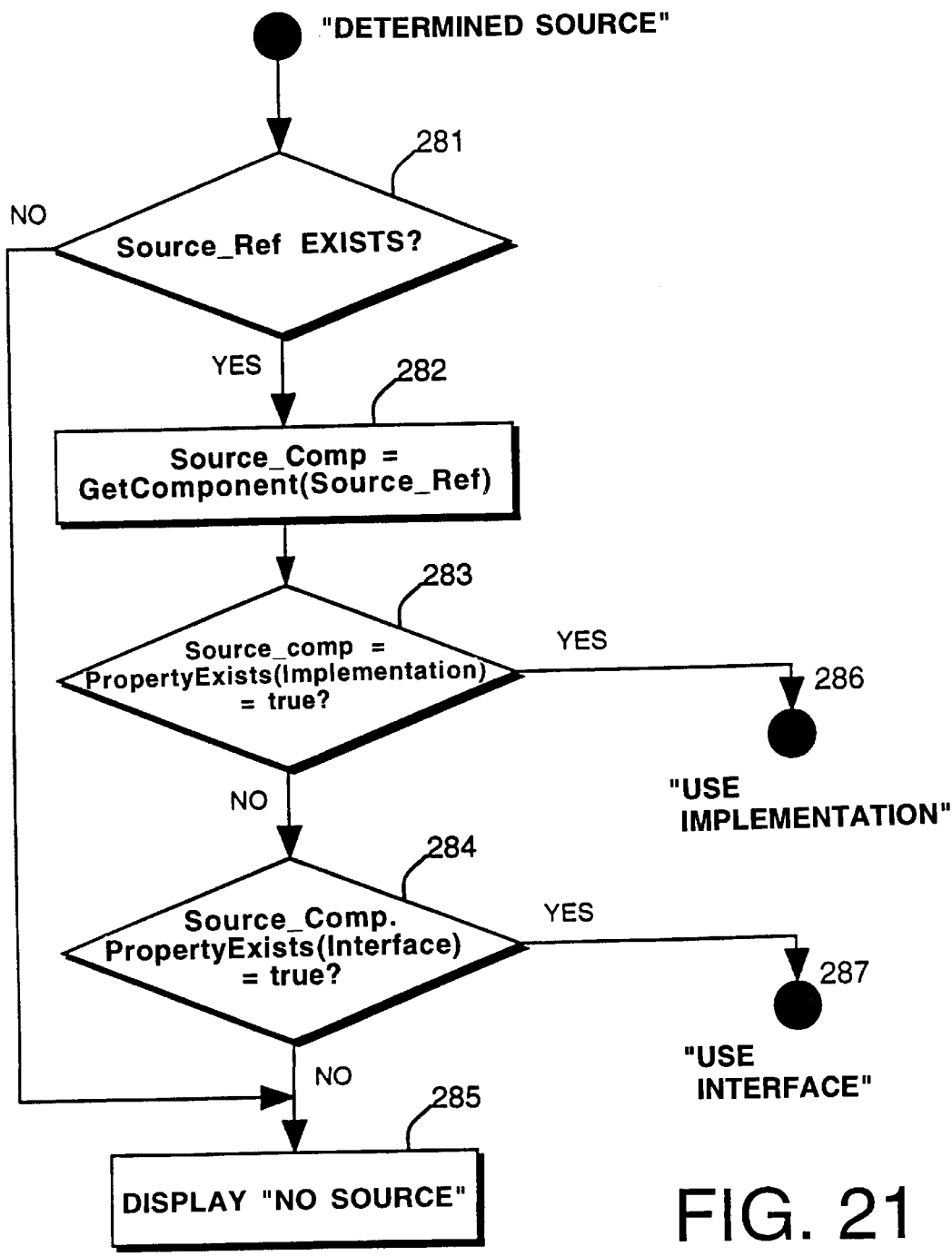

Continuing with FIG. 21, in decision block 281, the Source_Ref is tested for existence. If it does not exist, the Viewer immediately displays "No Source" in block 285. If the Source_Ref does refer to a source component that exists, the component is retrieved from the Database 41 in block 282. If the Implementation property exists, as tested in block 283, the property is used to display the source later in node 286. Otherwise, the Interface property is tested for existence in block 284, and the Interface property is used for display later in node 287. If neither of these two properties are available, "No Source" is displayed in the viewer in block 285.

The above steps show source in the following order of preference, from most desirable to least desirable.
  a) source component, Implementation property
  b) source component, Interface property
  c) no source component; no source shown at all.

The Implementation Property is Used to Display Source

Figure 23:
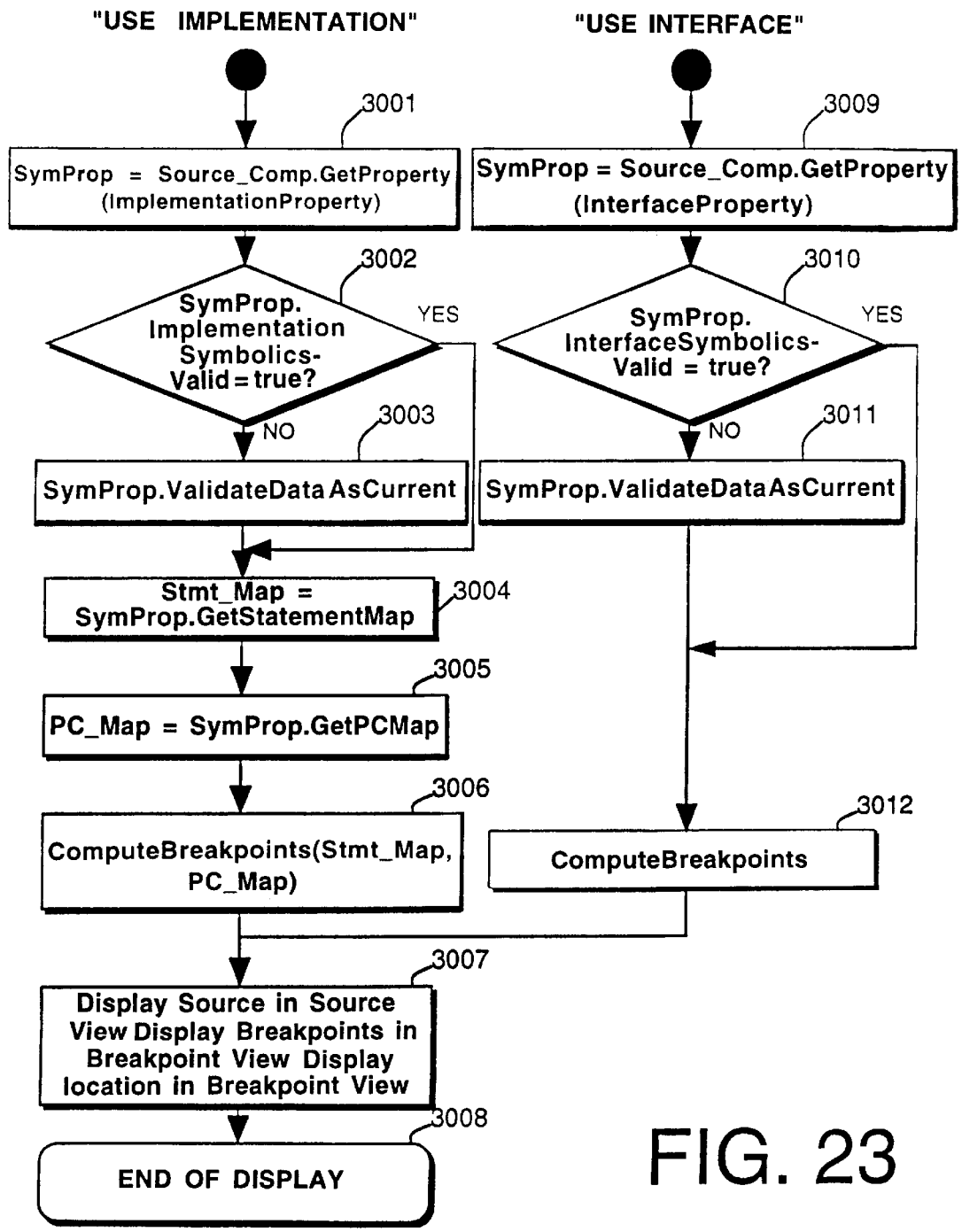

In FIG. 23, the Implementation Property is used to display source in the Dynamic Source View and the accompanying Breakpoint View. The Symbolic Property is retrieved from the Database 41 in block 3001. If the ImplementationSymbolicsValid flag is true in decision block 3002, then the symbolic information does not need to be generated on demand. If the flag is false, block 3003 is executed as a subroutine and the ValidateDataAsCurrent function is called. Once the Symbolic Property is filled with the compiled symbolic information, the Statement Map is retrieved in block 3004 by calling the Symbolic Property's GetStatementMap function, along with the PC Map in 3005 by calling the property's GetPCMap function. An algorithm is used in 3006 to determine where to display breakpoints graphically in the breakpoint view. In block 3007, the source text, breakpoints, and program location indicator are displayed. At this point the dynamic source viewer is finished displaying the source text with the breakpoints and the location indicator.

Subroutine for Determining the Source Component

Figure 22:
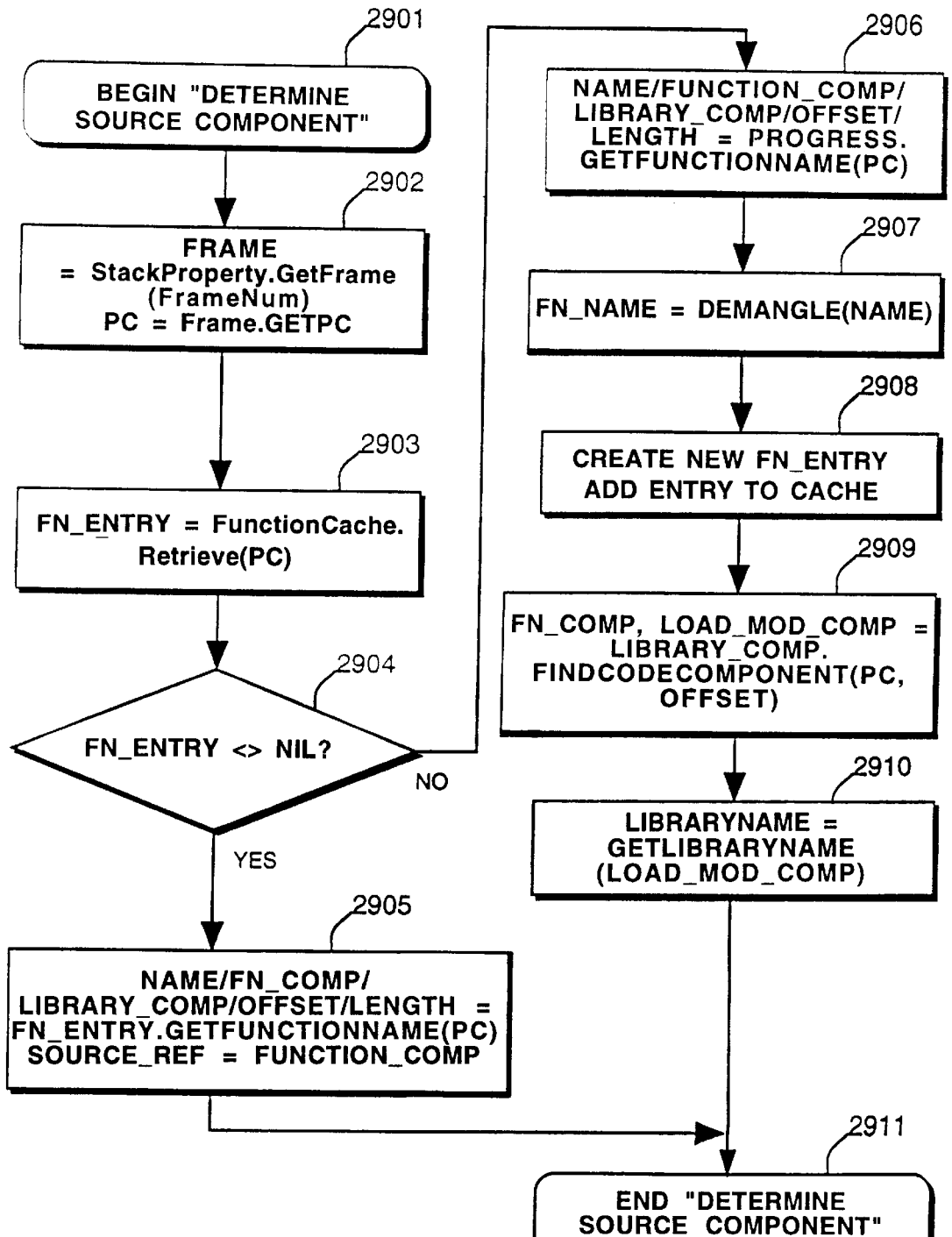

The subroutine for determining the source component for displaying in the Dynamic Source Viewer is shown in FIG. 22.

The Dynamic Source Viewer Determines the Program Counter from the Thread Property.

The Dynamic Source Viewer gets the Dynamic Source Property from the Thread Component. GetSourceProperty function is called on this property. The subroutine to Determine Source, shown in detail in FIG. 22, starts at the terminal block 2901. The FrameNum is determined in block 2902 by the selection in Viewer Component starts by determining the stack frame output 2652; the Program Counter is determined from the Frame object's GetPC function.

Function Cache::Retrieve(address) Checks to See if the Address is in its Cache.

Using the PC (program counter) in block 2903, the Debugger 48 checks the function cache by calling FunctionCache.Retrieve(PC). If a cache result is returned, then a combination of name, function component, library component, offset into the function, and length of the function are returned from the cache entry in block 2905. This information is used to complete the subroutine in 2911.

FunctionCache::Retrieve(address) Doesn't Return Anything.

If decision block 2904 indicates that the cache did not previously contain an entry for the function, then a cache miss occurred and the function and library information must be determined.

Convert the Address to a Function Name.

The Debugger 48 asks the portable debugging services to determine the function name Process::CetFunctionName in block 2906. This function will convert an address into the library and function.

Convert the Function Name to a Language Name (demangle)

The function name, NAME, is converted to a name, FN_NAME, that is recognizable by the Database 41 in block 2907. Encodings of names are used by some languages, such as C++, in which most compilers convert class and function names into a single name space that also encodes type parameters as part of the name.

Create a New Entry for the Cache.

A new entry is created in the cache in block 2908 so that the next time a function name is requested, the mapping is done more quickly.

Call FindCodeComponent Using the Address, Offset, Which Returns a Pointer to the Function Component and Load Module Component.

In block 2909, call the function named TLoadModuleProperty::FindCodeComponent to convert the Program Counter (PC) address to the function component, FN_COMP, and library component, LOAD_MOD_COMP.

Find the Library the Code Component is in, (use GetLibraryName) from the Load Module Component.

Get the library name using GetLibraryName in block 2910. If the LOAD_MOD_COMP doesn't exist, then use the PC address in the target address space, use the host operating system loader, runtime services, or portable debugging services as shown in block 2910 to determine where in memory the program code is located. From that address, determine the library that contains the code. Typically libraries contain contiguous blocks of memory that are located in well-known locations. The library name is put into the variable LIBRARYNAME.

AdoptStatementMap

Figure 24:
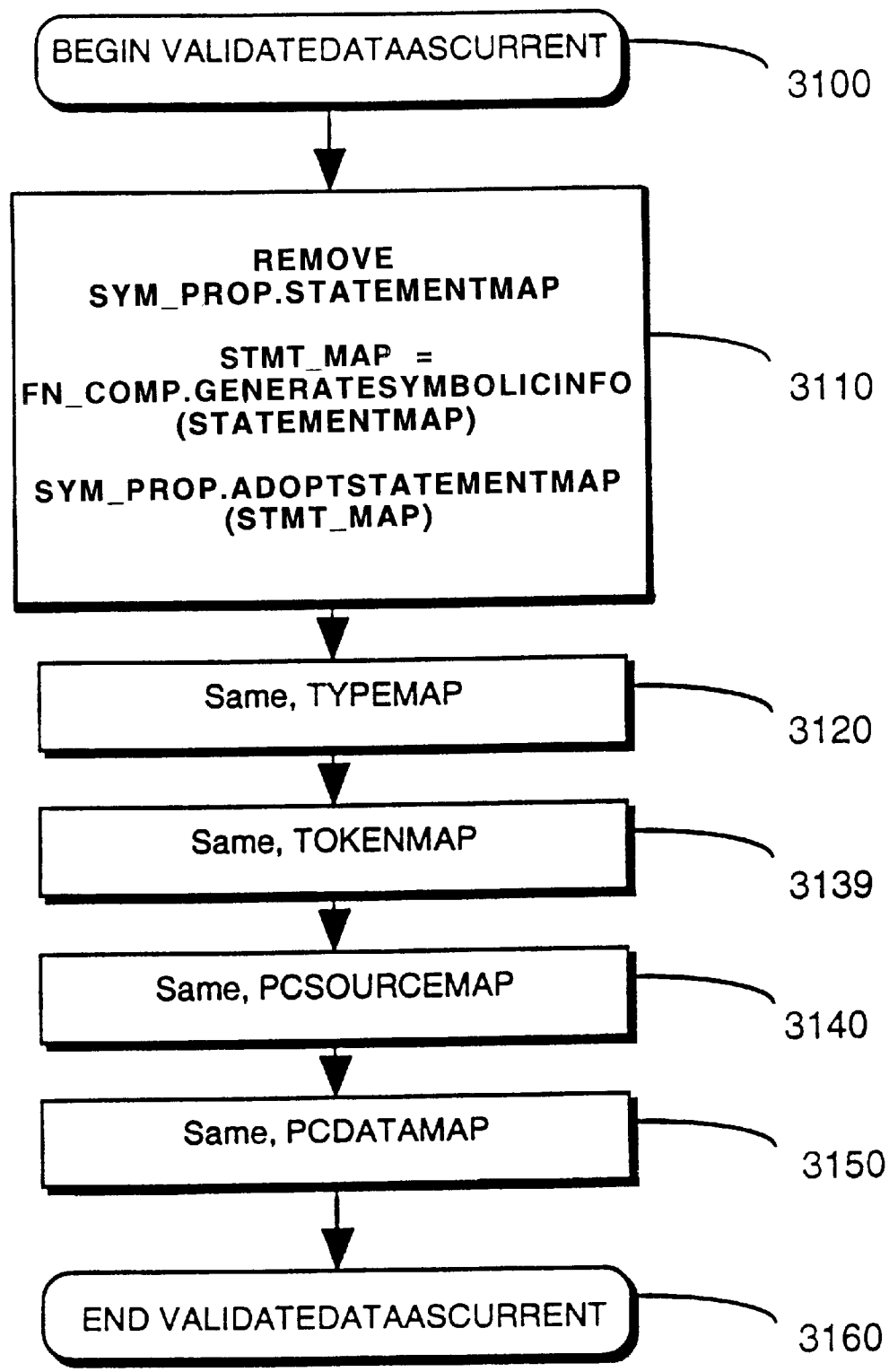

After the Compiler 42 generates the Statement Map data, it calls Property.AdoptStatementMap(PropertyName, map), at which point the pointer to the data is transferred to the Interface or Implementation property for ownership. FIG. 24 is a flowchart in accordance with a preferred embodiment of the invention.

Processing commences at label 3100 where the Compiler 42 is called to update the symbolic information in the symbolic property in the memory of the computer as part of the project Database 41. Then, in function block 3110 the Statement Map is deleted and the Compiler 42 is invoked to generate symbolic information for the Statement Map and the Compiler 42 calls the adopt Statement Map function in the symbolic property. In function block 3120, the Type Map is deleted and the Compiler 42 is invoked to generate symbolic information for the Type Map and the Compiler 42 calls the adopt Type Map function in the symbolic property.

In function block 3139, the Token Map is deleted and the Compiler 42 is invoked to generate symbolic information for the Token Map and the Compiler 42 calls the Adopt Token Map function in the symbolic property. In function block 3140, the PCSource Map is deleted and the Compiler 42 is invoked to generate symbolic information for the PCSource Map and the Compiler 42 calls the Adopt PCSource Map function in the symbolic property.

In function block 3150, the Data Map is deleted, the Compiler 42 is invoked to generate symbolic information for the Data Map, and the Compiler 42 calls the adopt Data Map function in the symbolic property. Finally, at terminal 3160 control is returned to the calling program.

Method for Statically Generating Symbolic Information

The user can decide to request the Compiler 42 to generate the symbolic properties for components without using the demand-based generation. By providing the Compiler 42 with compiler-options, it is able to compile the symbolic information at the time the program is built, before the program is debugged. This is called "statically generating symbolic information."

The information will be stored in the program Database 41 and, when the program stops or the user navigates to the program components containing the precompiled symbolic information, the Debugger 48 will use it directly instead of causing the Compiler 42 to be invoked, as is done in the demand-based case.

1. User Chooses "C++ Options" from the Build Menu

Figure 26:
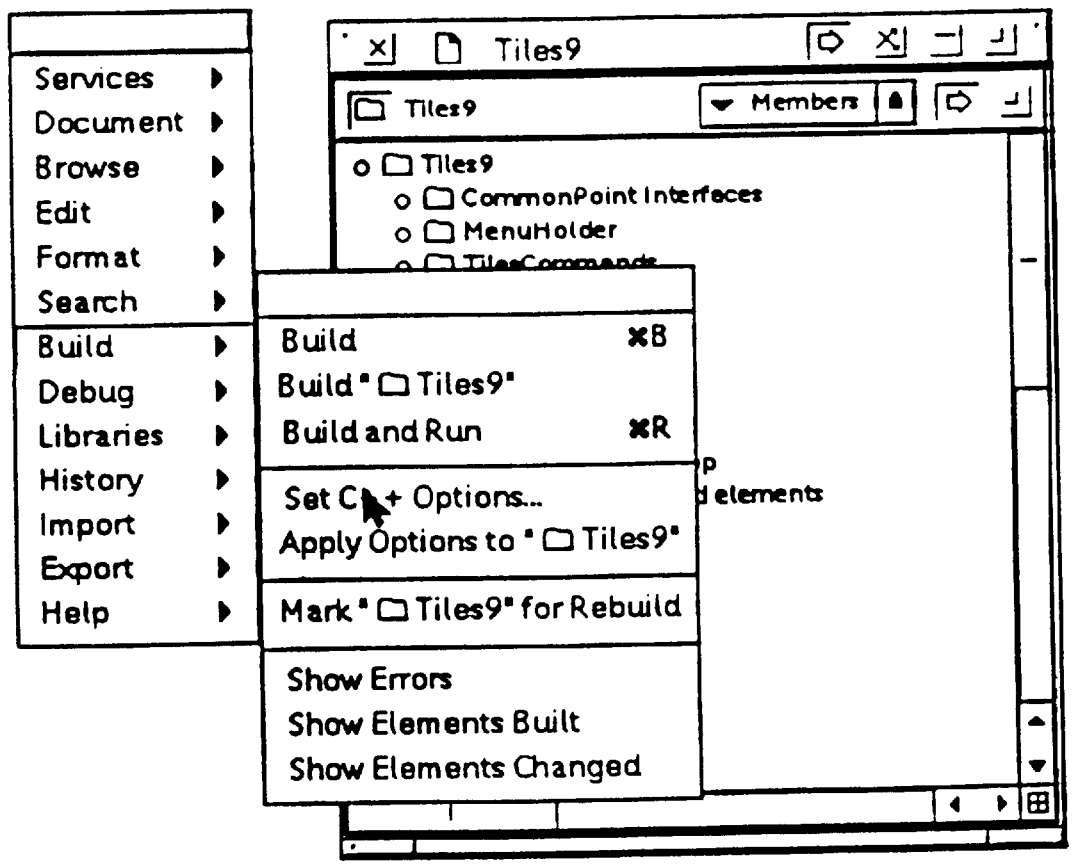
FIG. 26 is a menu and dialog for setting compile options in accordance with a preferred embodiments.
Figure 27:
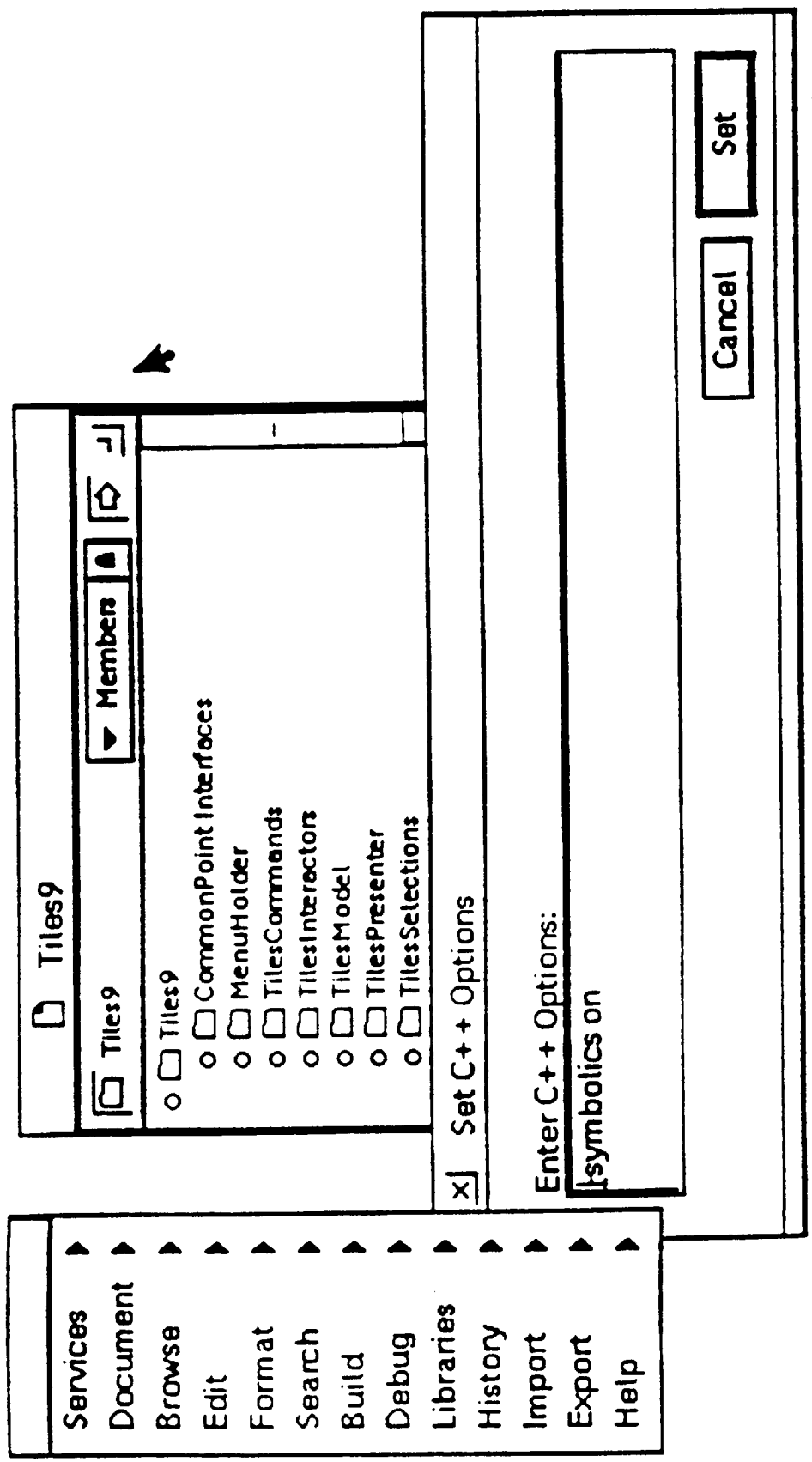
FIG. 27 shows a dialog box for entering C++ options.

The user chooses the C++ Options menu item shown in FIG. 26. This opens a dialog that contains a text box in which to type compiler options. The user accepts the change by using the mouse to click the "OK" button. FIG. 27 shows a dialog box for entering C++ options.

2. User Applies the Options to Components

Using a mouse, the user then selects the components for which he desires the symbolic property to be generated when the program is built. The user then chooses the "Apply Options" menu item from the Build Menu.

3. User Builds the Program

A program is compiled, and linked, by choosing Build from the Build Menu.

Method for Regenerating Symbolic Information

When a user edits a program, some parts of the program must be recompiled. When the user chooses the Build, Build & Run, or Build & Debug menu items, the program will be rebuilt. Each component that requires rebuilding will invalidate the symbolic property.

Method for Matching Draft Versions

A DraftID is used to identify a configuration of components. A Configuration of components is a set of data that is stored in a history database, which tags each component with the DraftID. Once a component has been stored in the history database, the user can retrieve the history by using a command that searches the history database, copying every component with the DraftID into the local HOOPS database. The DraftID is written into the load module or object file during the publish phase of the linker.

The DraftID is read from the target in memory using the TLoadModuleProperty::GetDraftIDOffset(address) function, which will get the offset into the load module that contains the DraftID specifying the publication version of the components. The Debugger 48 uses this address by reading the DraftID directly from the library in the process being debugged. The DraftID is stored within the Load Module Property.

After determining the DraftID, the Debugger 48 will determine if the DraftID is different from the current draft. If it is, the Debugger 48 places a dialog window on the screen, confirming if the user would like to retrieve the draft. If the user answers yes, the Debugger 48 retrieves the components with the DraftID from the history database.

At this point, the source components' Interface and Implementation properties are retrieved, along with the load module properties. The Debugger 48 regenerates the symbolic information by recompiling as is described in Method for Incrementally Generating Symbolic Information.

Using HOOPS

Figure 28:
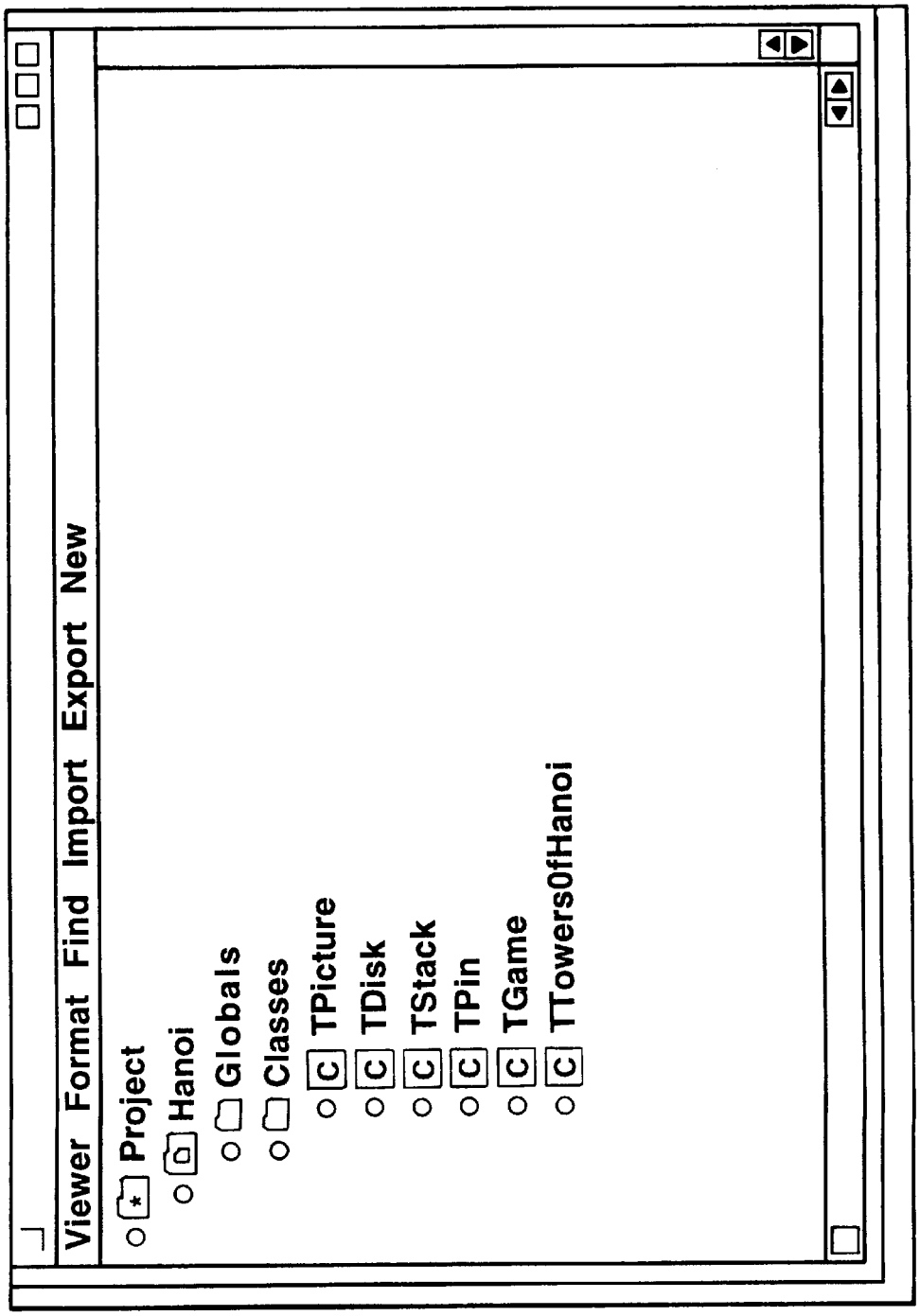
FIG. 28 is a pictorial representation of a computer screen showing a typical member viewer when the using the invention.

The Human-Oriented Object Programming System (HOOPS) according to the invention can be started on the computer by entering either a project name or an existing project name, depending on whether a new program is to be built or an existing program is to be edited. When HOOPS is started, a window is opened and an initial screen similar to the one shown in FIG. 28 is displayed. The initial window that HOOPS opens displays the Members property of the Project component and its immediate members. Although it initially only displays the immediate members, the same window is used to display every component starting at the project component. In the example shown in FIG. 28, a Project called "Payroll" has been imported.

Figure 29:
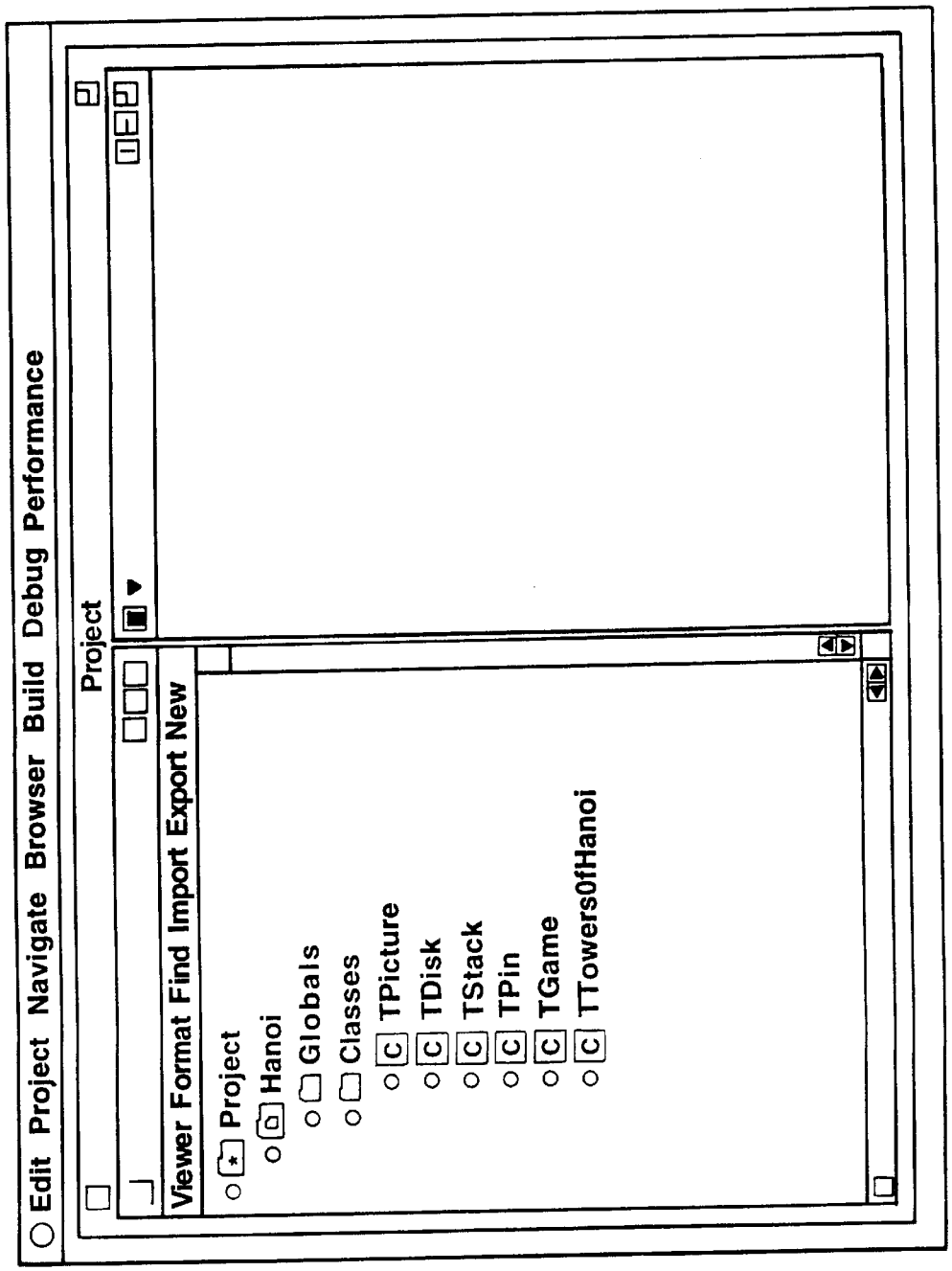
FIG. 29 is a pictorial representation of a computer screen showing a browser according to the invention.
Figure 30:
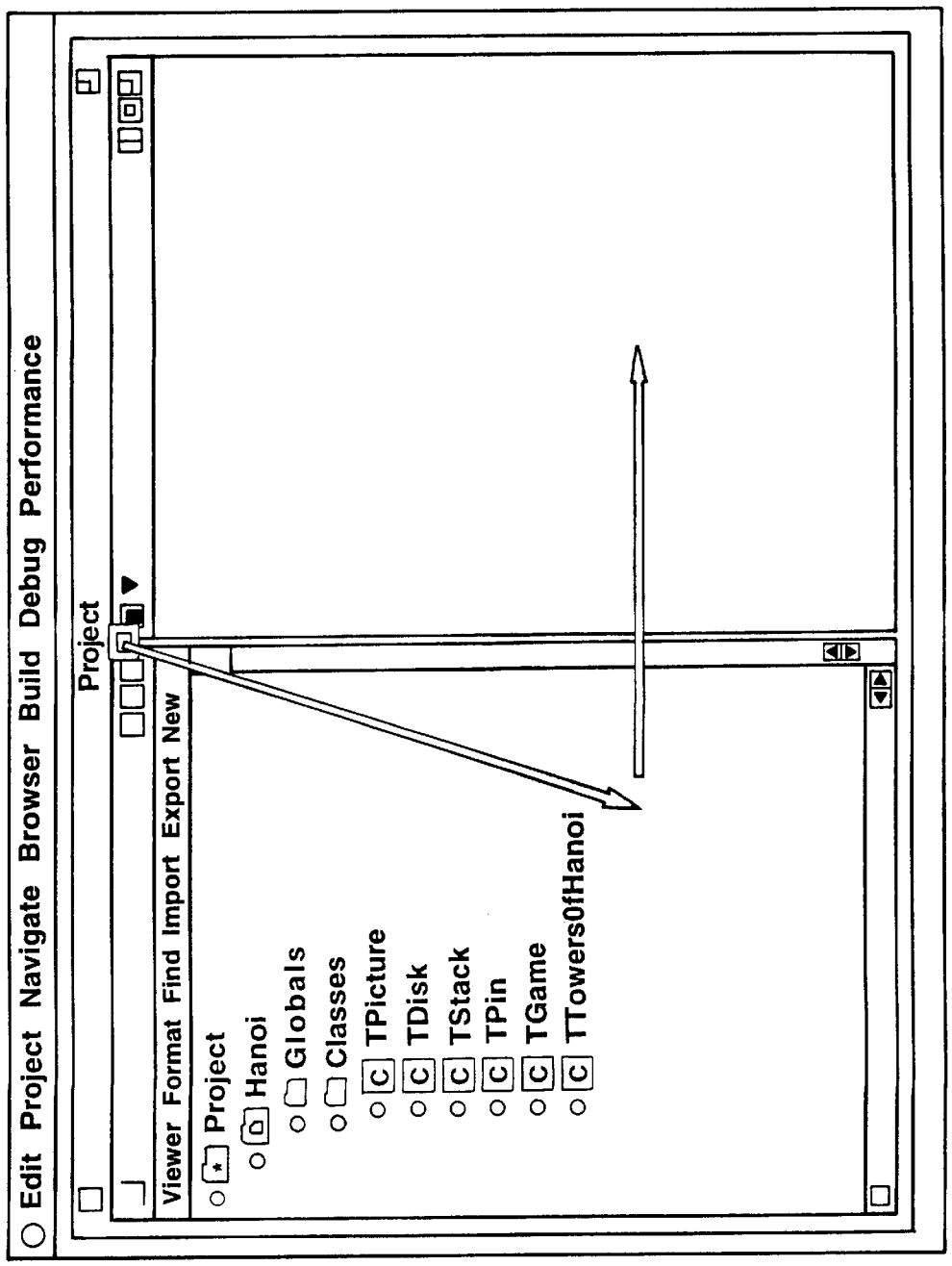

Every window in HOOPS is a browser. Browsers are temporary viewing and editing tools for looking at information in the Project. They can be deleted at any time by clicking on the close icon in the window. Any changes made to the Project while in the browser are automatically saved. A browser has an input component that is specified when it is opened. A property of the input component is displayed in a pane, and each pane displays one property viewer or is blank, as shown in FIG. 29. New panes are added to a browser by choosing one of the split icons in the upper right corner of a pane. When a new pane is created, default wiring is created from the pane being split to the new pane. Wiring is the logical relationship between a panes. A pane can have zero or one wire input and zero or more wires as output, but wiring cannot form a loop. When a component is selected in a pane, the selection is converted into a reference to a component in the project and becomes a new input to the destination of any wires emanating from that pane. The wiring can be turned on by choosing Turn on Wiring from the Browser menu selected from the menu bar, resulting in the display shown in FIG. 30. Using this display, it is possible to change the wiring between two panes by clicking down with the mouse on the new input location and dragging to the target pane.

Figure 31:
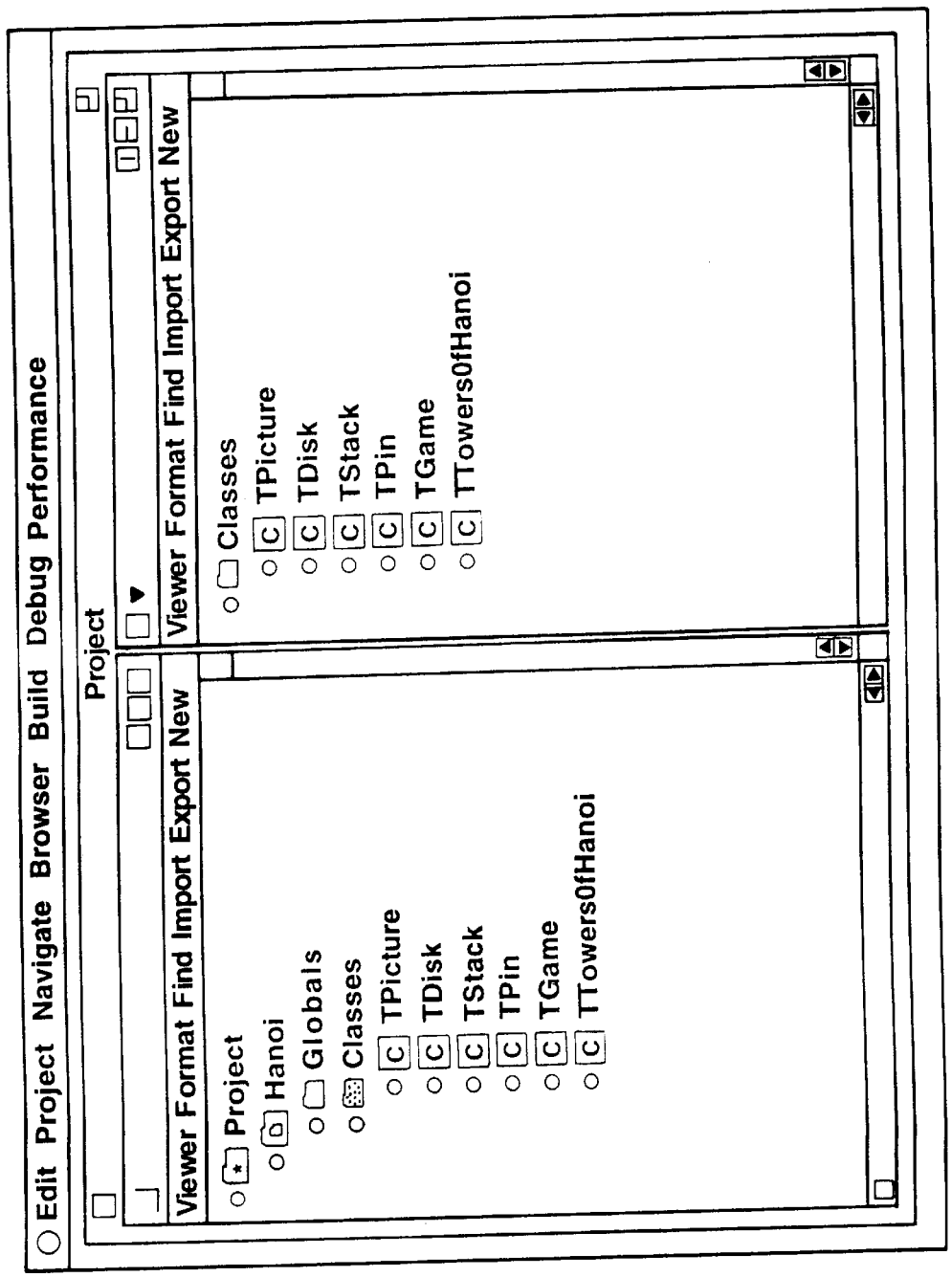
FIG. 31 is a pictorial representation of a computer screen showing a partially expanded project in a tree viewer.

In many viewers, such as Members, Clients and References, components can be distinguished by their names and their icons, which differ according to component kind. In other viewers, a component's name simply appears in the text, such as in Source or Documentation. The component hierarchy can be browsed by expanding and collapsing container components in the Members property viewer, producing a Tree view, an example of which is shown in FIG. 31. One level of a component's subtree can be expanded or collapsed by clicking the component's circular toggle switch. When a component is selected in a viewer, either by clicking on its icon if it has one or by selecting its name in a text display, the Property menu in the global menu bar is adjusted to list the properties for that type of component. Any property of any component can be viewed by selecting the component in a viewer and then choosing a property from the Property menu. This opens a new browser containing a single viewer that displays the chosen property of the selected component.

Components are created from within either a Members or Interface viewer by specifying where the new component is to be created, and the kind of component it will be. The location of the new component is specified by either selecting an existing component or by placing an insertion point between components. The kind of component created is determined by which menu item is selected from the New viewer menu. All editing is automatically stored. Only changed components, and their clients affected by the change, are compiled. The recompiled components can be viewed by choosing the Show Components Built menu item from the Build menu. To see the components changed since the last build, the Show Components Changed from the Build menu is chosen. A program is compiled, and linked, by choosing Build from the Build menu. The Build & Run menu also runs the program.

Figure 32:
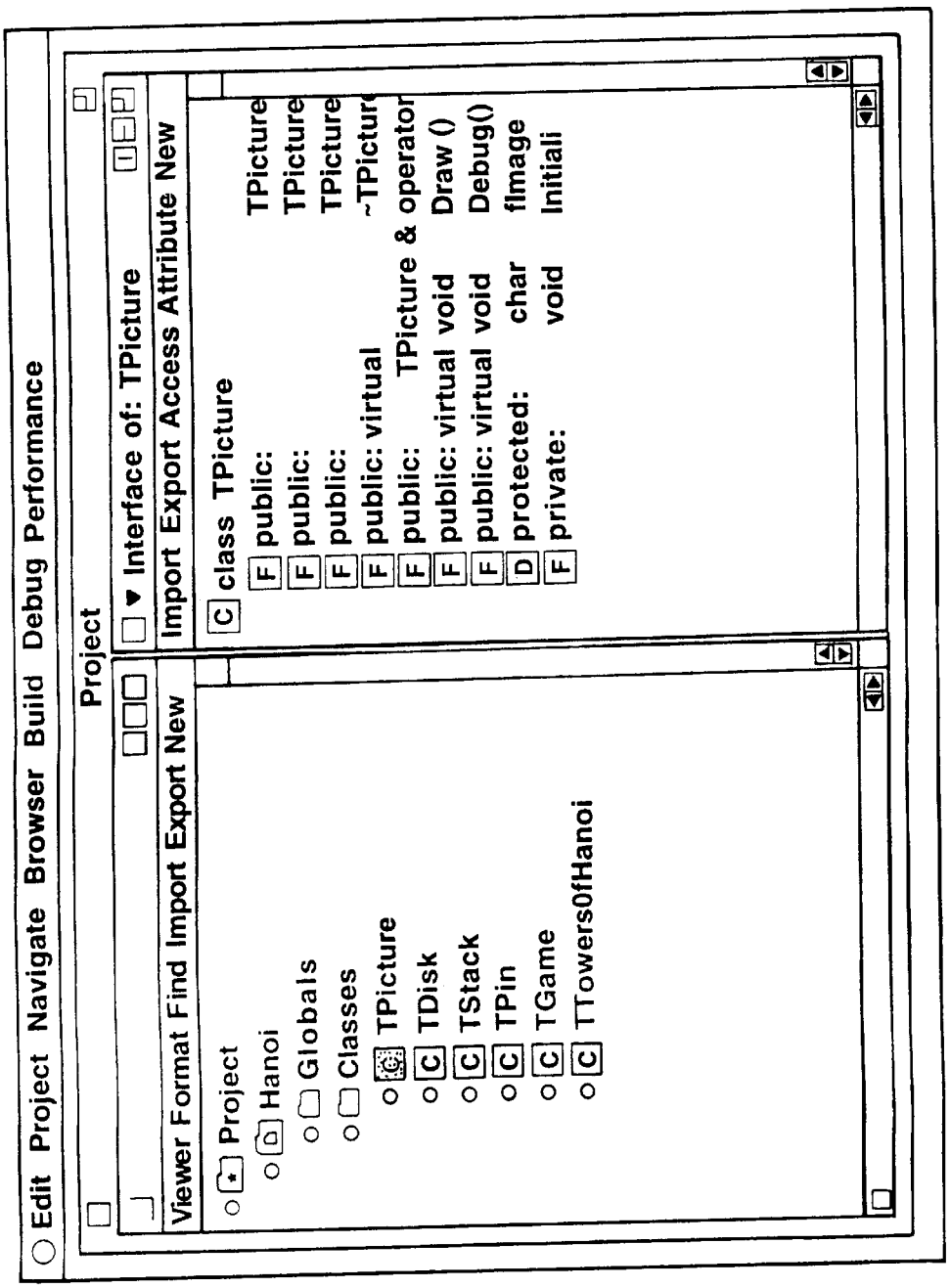
FIGS. 32–35 illustrate some of the screens displayed in the process of editing a component.
Figure 33:
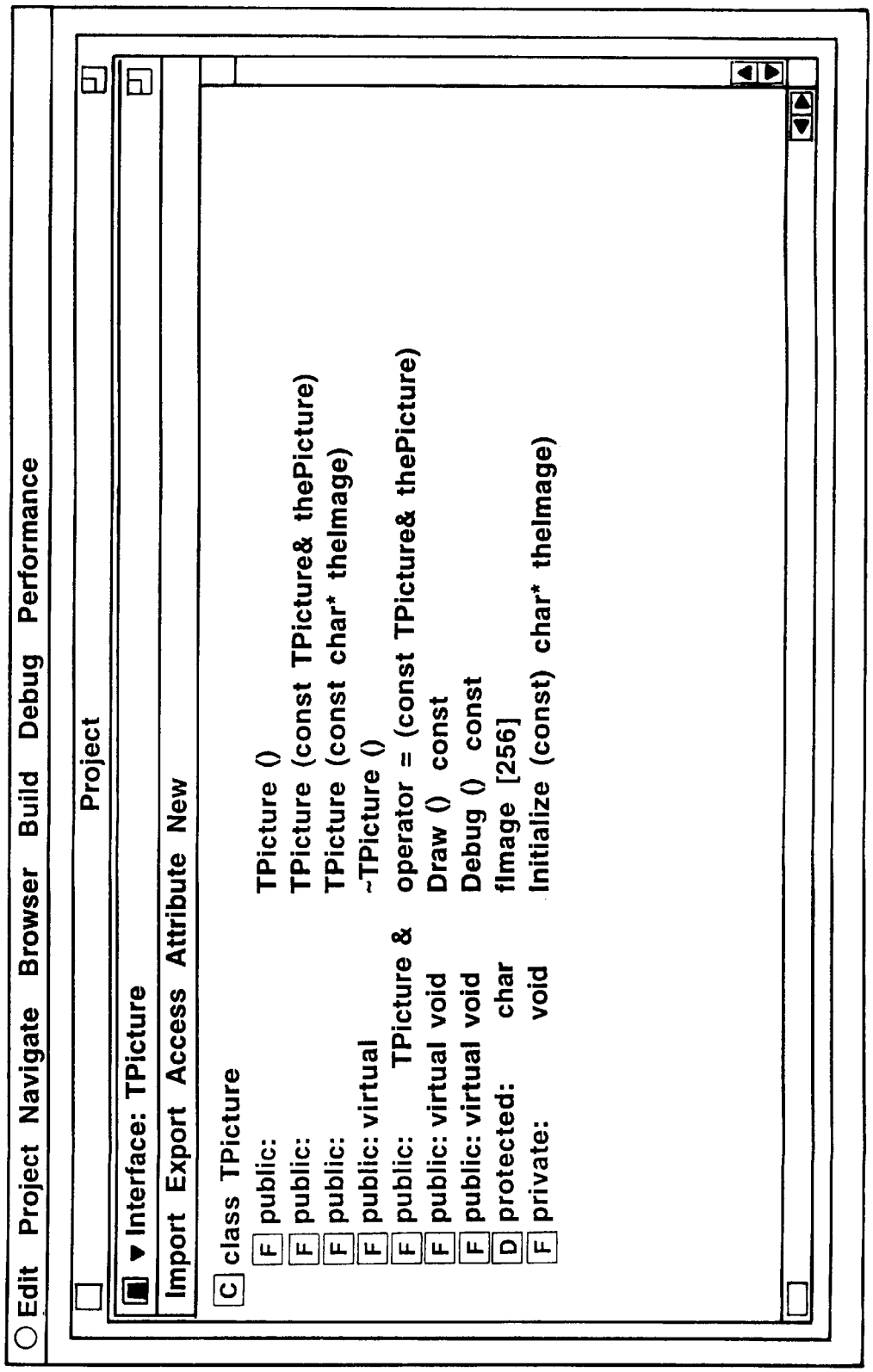
Figure 34:
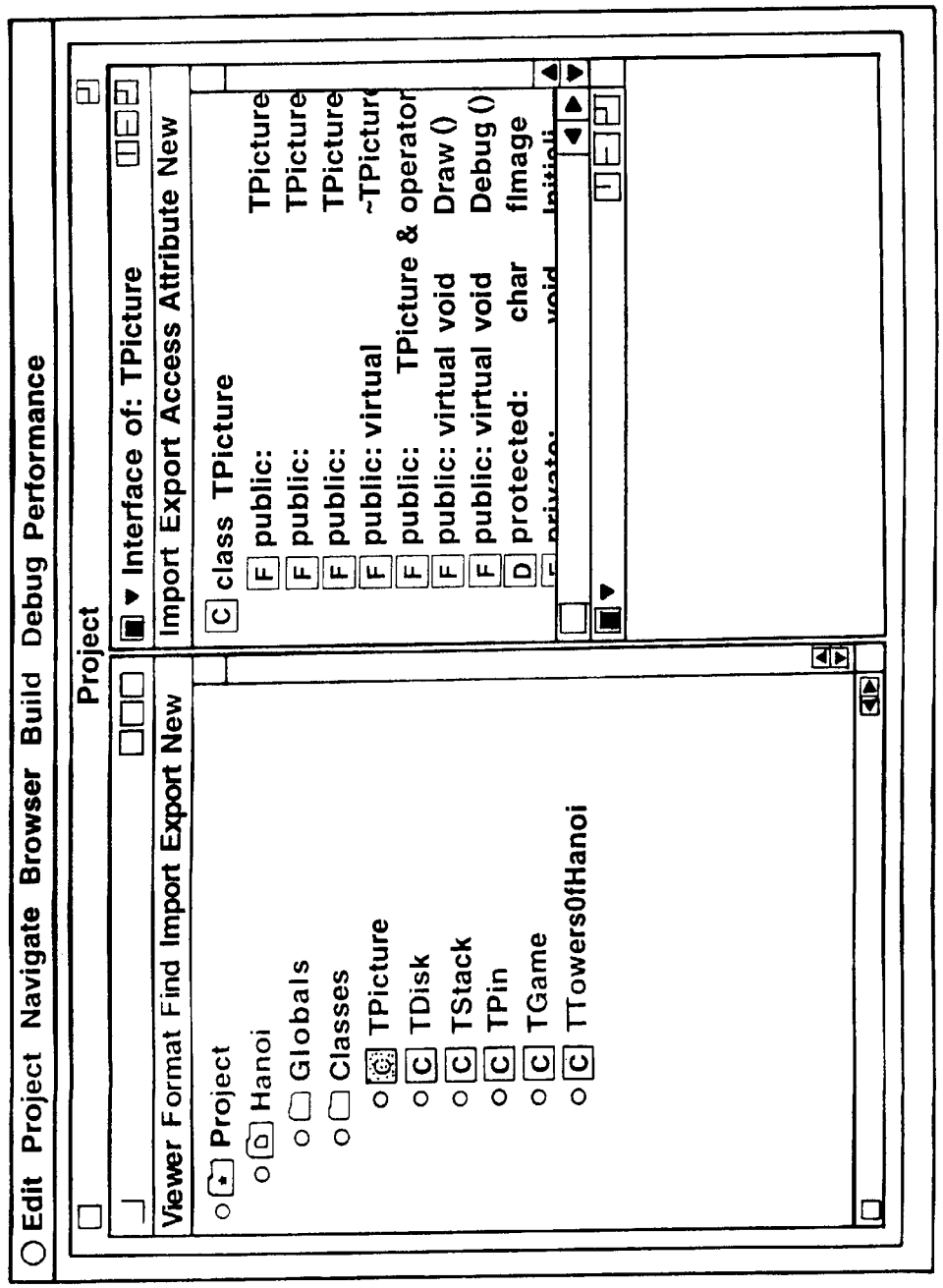
Figure 35:
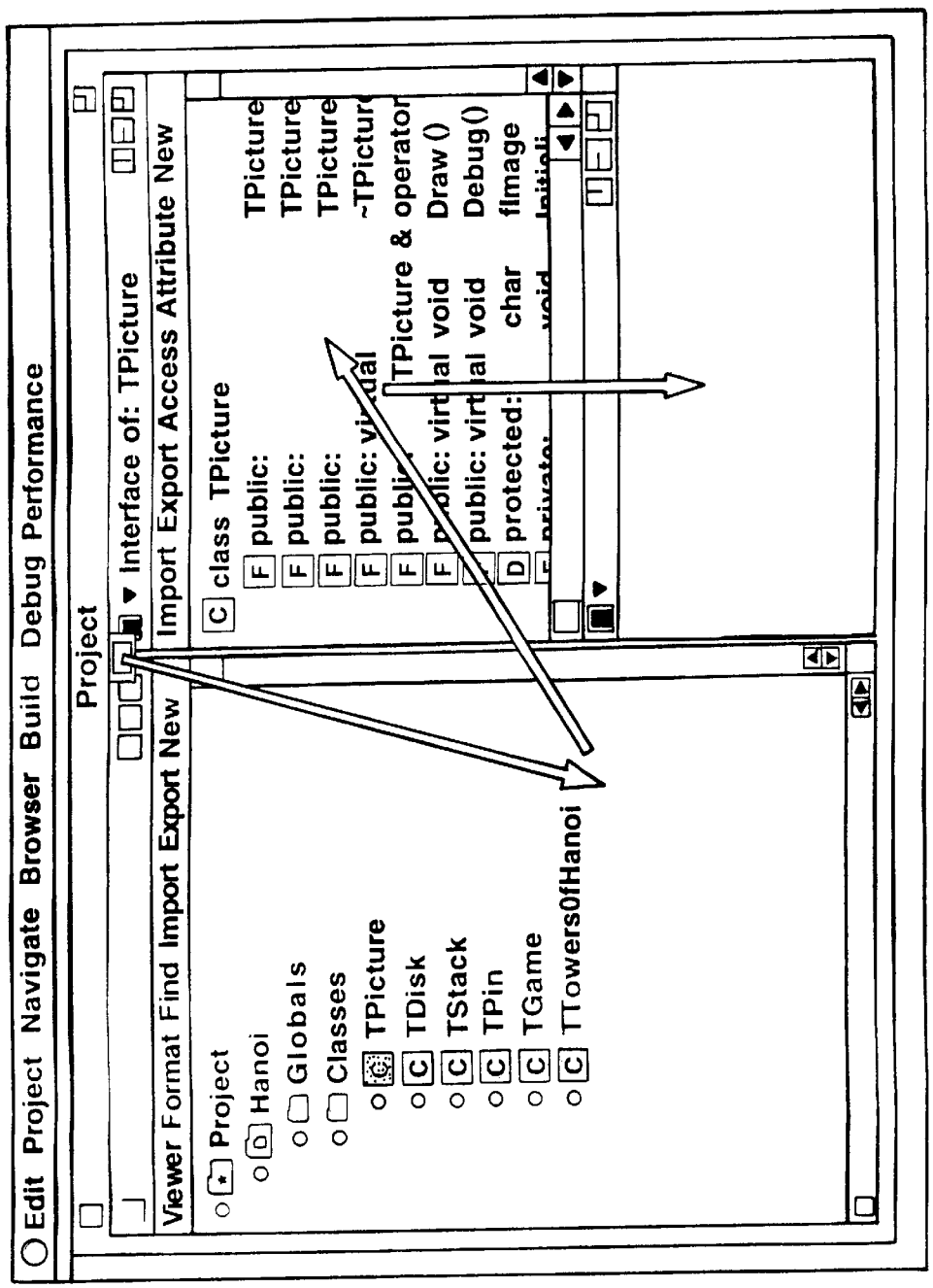

FIGS. 32 to 35 illustrated some of the screens displayed in the process of editing a component. FIG. 32 shows the display of the source code of an Implementation of a function called "main". In FIG. 33, the function "main" has been edited by changing numberDisks from "7" to "9". If the programmer now chooses Show Components Changed from the Build menu shown in FIG. 34, a browser like that shown in FIG. 35 appears. In the "Implementation Changes" viewer (on the right), the function "main" is displayed indicating that it has been changed.

The Build & Run menu item of FIG. 26 simply starts the program execution without using a debugger. Choosing Build & Debug will cause the program to start execution with a Debugger 48 attached. Choosing Attach will cause the Debugger 48 to attach to a program that is already executing but not being debugged.

Once the program is started with Build & Debug or attached using Attach, the program will come to a stop. The HOOPS Debugger 48 creates components that represent the process and the threads contained within it. The Debugger 48 then opens a browser using the thread component that was most recently executing as the browser's input. The browser contains viewers that are prespecified to show the programmer the thread's stack with the Stack Viewer, the source text with the Dynamic Source Viewer, the variables with the Dynamic Data Viewer, and the execution state using the Thread State Viewer.

Each of these Debugger viewer in the browser displays an aspect of the program being debugged. The Stack Viewer displays the current sequence of subroutine calls that caused the program to reach its current location. The Dynamic Source Viewer displays the location in the program corresponding to the actual Implementation or Interface property that is currently executing; it also displays the locations at which breakpoints may be set. The Thread State Viewer shows simply whether the thread is running, stopped, and if stopped, what was the reason for causing the program to stop. Using object-oriented programming techniques, the Dynamic Source Viewer is the Implementation Viewer with further additions to support the display of the current location and breakpoints as well as adding menus to control the debugged thread and process.

Object Oriented Linking

This description lists the important features of the HOOPS linker, then it provides background on the runtime environment of a preferred embodiment, and the HOOPS Database 41 to provide the context in which linking occurs. Finally, a discussion of component linkage, and the interaction of components with the HOOPS compiler, the HOOPS database, and the system loader is provided with reference to a preferred embodiment.

Linker Features

1. Linking occurs during the compilation process. There is no extra linking pass.
2. During a build, only newly-compiled functions and data are re-linked.
3. During incremental development, some shared library space is traded for speed.
4. The Compiler 42 interacts with components and properties to produce all object code and other linking information.

5. When a program is ready for release, a "publish" step will remove extra space and information used during incremental development, and separate the application from HOOPS.
6. A "QuickPublish" step will be available for quickly separating the application from HOOPS for sharing with others, or moving to another machine.
7. The linker is extensible because the Compiler 42 may specify new fixups that the linker doesn't normally handle.
8. A suspended program may be modified and then resume execution without being reloaded. Some changes will require a reload.

Background

The linker operates inside HOOPS, and creates files that are used by the loader. To understand the linker strategy, it is important to understand the unique aspects of both the runtime system and HOOPS.

An executable file interacts with the runtime much differently than in other runtime systems. Normally, a loader program must understand the executable file format. The executable file has known fields that describe various aspects of the program such as the amount of memory needed, the address of main, any relocation information if that is needed at load time, and any Debugger information that is packaged in the executable. In a runtime of a preferred embodiment, the loader interacts with the executable file through an abstract TLoadModule class interface. The TLoadModule provides protocols for all the loading operations. For example, operations such as specifying memory requirements, building metadata information, and linking with other shared libraries are all provided by methods of TLoadModule. With this approach, there can be many different ways in which a load module can respond to the loading requests.

The runtime definition provides shared libraries, and allows for cross-library calls to be resolved at load time. Since libraries may be loaded at any memory location, all code must be either position independent, or must be patched at load time. In addition to position-independent code, calls to other shared libraries must be resolved at load time. This is because the static linker does not know what the location, or the relative offset, of the external library will be in memory.

Figure 36:
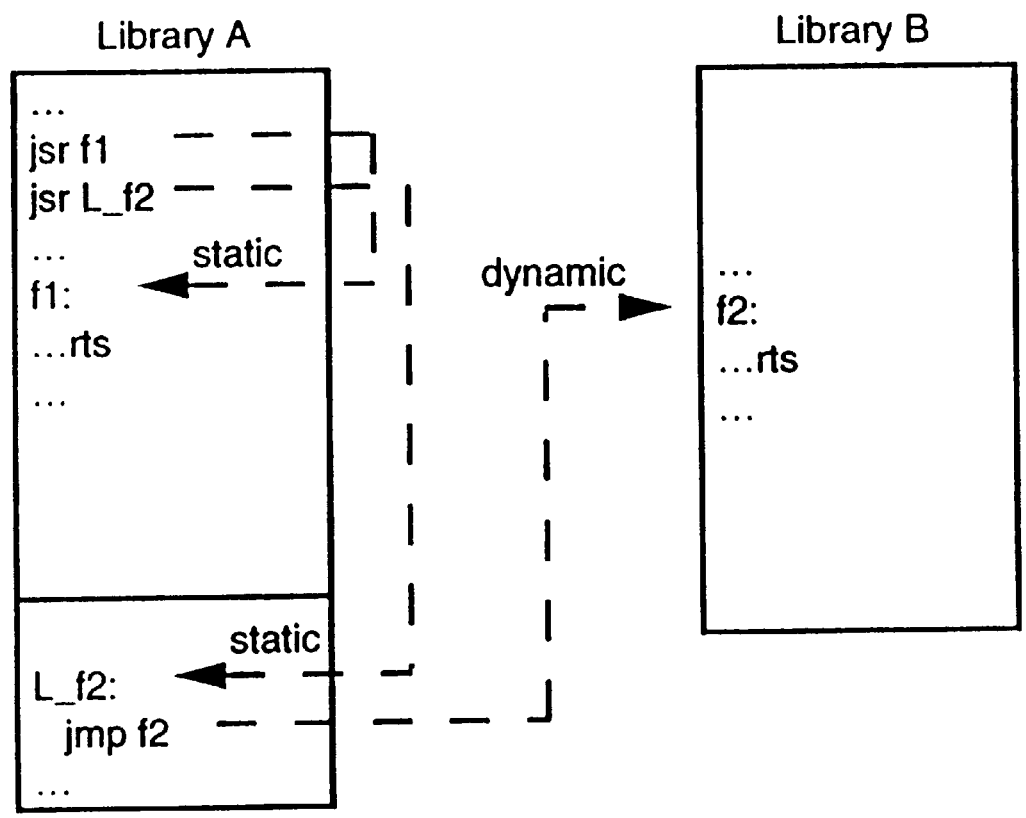
FIG. 36 illustrates an internal and cross-library call in accordance with a preferred embodiment.

While each TLoadModule class may implement cross-library calls in many different ways, the standard method is to jump through a linkage area that is patched at load time. The linkage area serves as an indirect jump table between libraries. An external call will JSR to the linkage area, and the linkage area will then JMP to the called function. Internal calls can JSR directly to the called function. An example of an internal and cross-library call is shown in FIG. 36 and described below.

The call to f1( ) 1900 is an internal call, so the JSR goes directly to f1( ) 1910. The call to f2( ) 1920 is a cross-library call; therefore, the call goes to the external linkage area 1930 that is patched at load time.

The HOOPS environment also provides a unique context for the linker. A program is represented as a collection of components. Each component has an associated set of properties. During the compilation of each component, the Compiler 42 will generate and store properties applicable to that component. The HOOPS build process orders the building of components so that all Interfaces (declarations) are compiled before Implementations (definitions).

A HOOPS project may consist of several library components. All source components are members of one of these library components. Each library component represents a shared library build.

Overview

To support incremental linking, and allow a final application to be as small and fast as possible, two different types of load modules are created. During development, HOOPS generates and modifies a TIncrementalLoadModule. There is a second load file, TStandardLoadModule, that is created when publishing applications.

A preferred embodiment discloses an approach for building and updating code during development. Converting a TIncrementalLoadModule into a TStandardLoadModule involves an extra "publish" step. This step will be much like a normal link step, in that each function or data item will be relocated and patched. However, external references are not resolved until load time.

Compiler Interaction

As the Compiler 42 generates code for a component, it passes the code to the object code property with a set of fixups that are used to patch the object code. Each compiled component has its object code property filled. The Compiler 42 uses an "object group" model. That is, a component can be made up of multiple types of object code. For example, a function could also have a private static data area associated with it, along with a destructor sequence for that static data area. A static data item could have a constructor and destructor sequence associated with it to initialize it at runtime.

For example, suppose the following component was compiled:

```
TFoo::Print()
{
static int timesCalled = 0;
cout << "Hello world:" << timesCalled << "\n";
timesCalled++;
}
```

The Compiler 42 will generate two pieces of object code and associate them with the component TFoo::Print. There will be the object code for the function, and 4 bytes of private data for the static variable timesCalled.

This might look something like the following:

Object Code Property of TFoo::Print-code

| 0x0000: | LINK   | A6,#0                         |
| 0x0004: | MOVE.L | A5,--(A7)                     |
| 0x0006: | PEA    | L1                            |
| 0x000A: | MOVE.L | <timesCalled>,--(A7)          |
| 0x000E: | PEA    | L2                            |
| 0x0012: | MOVE.L | cout,--(A7)                   |
| 0x0016: | BSR    | <operator<<(char*)>           |
| 0x001C: | ADDQ.L | #8,A7                         |
| 0x001E: | MOVE.L | D0,--(A7)                     |
| 0x0020: | BSR    | <operator<<(int)>             |
| 0x0026: | ADDQ.L | #8,A7                         |
| 0x0028: | MOVE.L | D0,--(A7)                     |
| 0x002A: | BSR    | <operator(char*)>             |
| 0x0030: | ADDQ.L | #8,A7                         |

-continued

| | | |
|---|---|---|
| 0x0032: | ADDQ.L | #1,<timesCalled> |
| 0x0034: | UNLK | A6 |
| 0x0036: | RTS | |
| L1 | DB | "\n" |
| L2 | DB | "Hello world:" |

Object Code Property of TFoo::Print-data

Along with the object code, the Compiler 42 will specify different fixups that must be applied as the code is relocated. These might look something like:

```
reference to timesCalled @ offset 0x0c
reference to cout @ offset 0x14
reference to ostream::operator<<(const char *) @ offset 0x18
reference to ostream::operator<<(int) @ offset 0x22
reference to ostream::operator<<(const char *) @ offset 0x2c
reference to timesCalled @ offset 0x34
```

Notice that the fixups may specify references to the other pieces of objects associated with this same component (the private static variable timesCalled), or to other components (such as cout).

When the Compiler 42 has completely specified the full set of objects and fixups associated with a component, the object code property relocates all of its pieces, and links itself at the same time. There is no second link pass performed after all the components are compiled. As each component is compiled, it is also fully linked.

Fixup Lists

Figure 37:
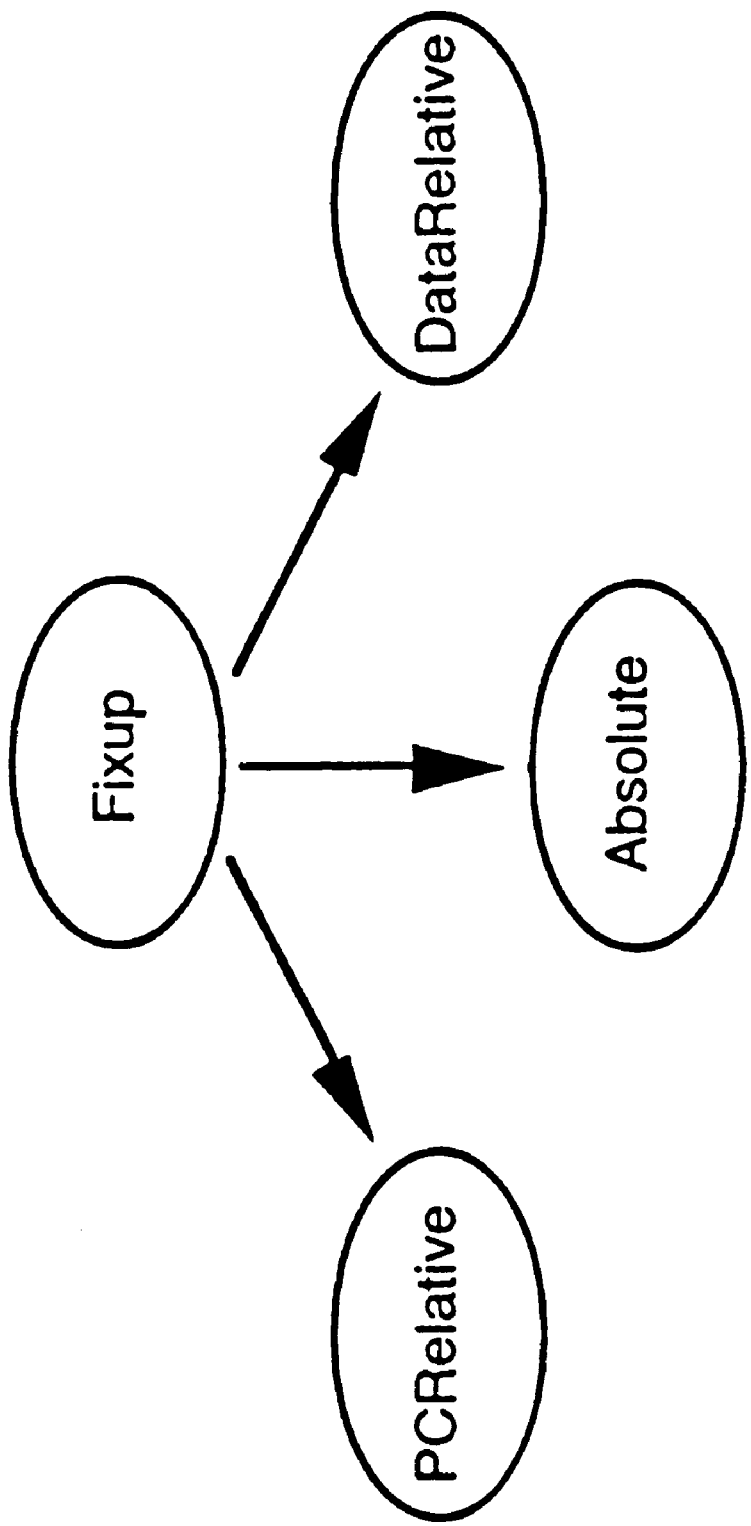
FIG. 37 illustrates a set of fixup classes in accordance with a preferred embodiment.

Linking is essentially a matter of iterating through the list of fixups and patching the code in an appropriate manner. Different types of fixups are specified through a class hierarchy, with each fixup knowing how to calculate the patch value. For example, a pc-relative fixup knows that it must calculate the difference between the address of its location, and the component which it references. An absolute fixup knows that it must delay calculations until load time. While the linker specifies a set of fixup classes, new compilers may specify new types of fixups. FIG. 37 illustrates a set of fixup classes in accordance with a preferred embodiment.

Address Calculation

The main problem with linking each component as it is compiled is that some components that it references may have not yet been compiled.

Each source component is a member of exactly one library component. Associated with each library component is a load module property. The load module property works as the clearing house for all components that belong to the shared library. As a fixup prepares to calculate a patch value, it queries the load module property for the address of a component. The load module property checks to see if the component has been compiled. If it has, then it returns the address of the component. However, if the component has not yet been compiled, the load module property performs two actions depending on the type of the component.

If the type of the component is a data component, then it just returns a constant address. If the type of the component is a function component, then it creates a linkage area for that function, and returns the address of the linkage area.

Object Placement

As mentioned before, as each component is compiled, it is allocated a position in the shared library. As this is done, some extra work must be done so that all references are consistent.

If the component is a data component, all its clients are notified of the position. Some clients may have initially been linked with bogus addresses, so this process cleans up all the clients and provides them with the right address. If the component is a function component, then the linkage area for that function is updated with the new address. Notice that this two style approach provides indirect access to functions, and direct access to data.

In addition, extra space is allocated so that future updates of the object code has a higher probability of being able to use the same area. Twelve percent extra is provided for functions and 25% extra is provided for large data objects.

Linkage Area

Figure 38:
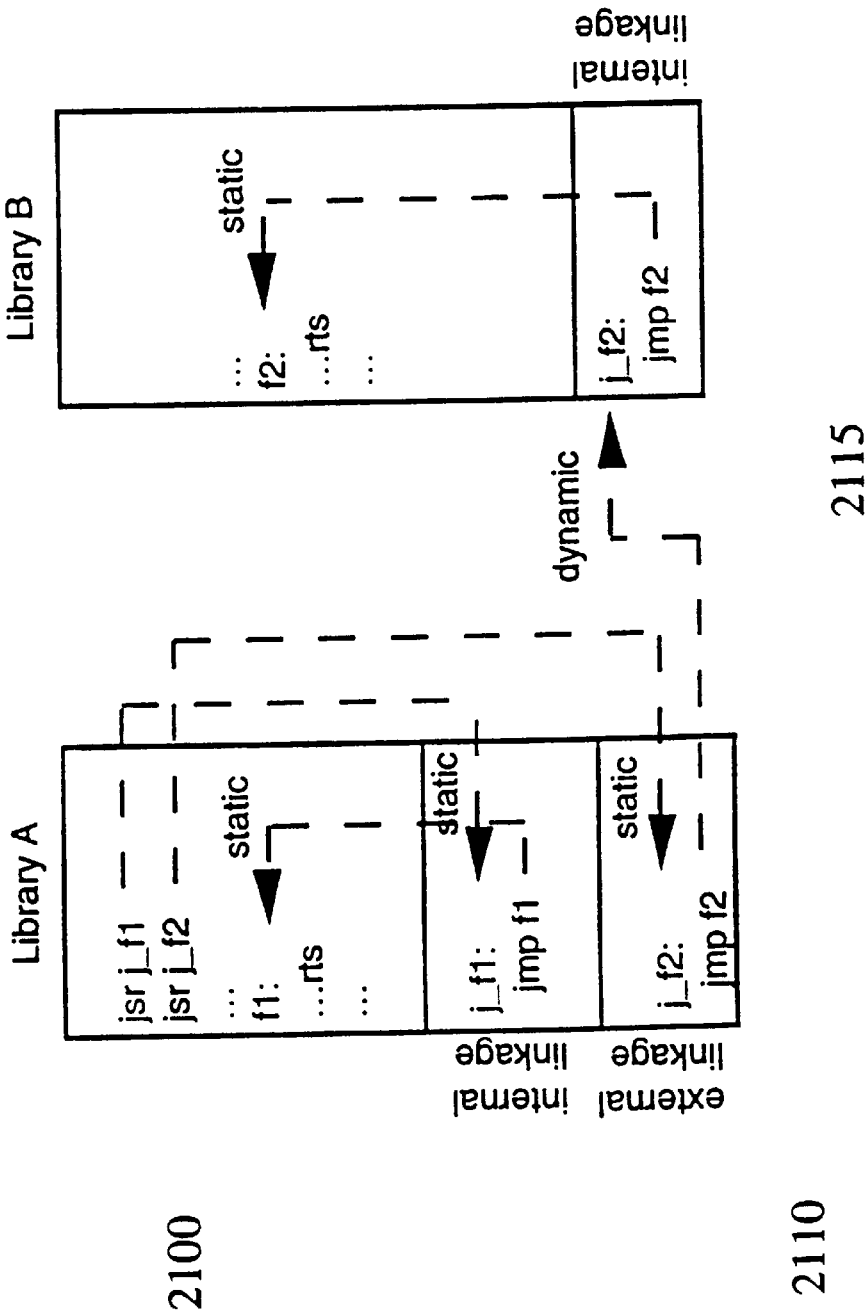
FIG. 38 illustrates a linkage area in accordance with a preferred embodiment.

As mentioned above, when the load module property is asked for the address of a function, it will give the address of the linkage area. This means that every function reference is indirect. FIG. 38 illustrates a linkage area in accordance with a preferred embodiment.

Notice that not only the internal library calls pass indirectly through the internal linkage area, but cross-library calls to functions go indirectly through a library's internal linkage area (i.e.: the call to f2 in Library B, 2100, 2110, 2115, 2120). This must be done so that f2 may change position without updating both its internal and external clients, and also for consistency so that items such as function pointers work correctly. In addition, all virtual table function pointers will also point to the internal linkage area.

Any functions that are referenced, but not defined, will point to a common Unimplemented( ) function. Having all uncompiled functions point to Unimplemented( ), facilitates the load and run partial-applications without forcing the programmer to create stub functions.

Another benefit of having the internal linkage area is that it provides a bottleneck to all functions. During development, the internal linkage area can be useful for activities that require function tracing such as debugging or performance monitoring.

Incremental Linking

The previous discussion has laid the foundation for a detailed discussion of incremental linking. When a component is recompiled, the new component size is compared to the old component size to determine if the new component fits in the current location. If it will, then it is stored there, and it is iterated through its fixup list. Linking is then complete.

If the object code for the new component must be relocated, then the old space is marked as garbage, and the new object code is relocated to a new area. Then it iterates through its fixup list. If the component is a function, the linkage entry is updated. Linking is then complete. However, if the component is a data item, then the component must iterate over the list of clients and update their references to this component. Linking is then complete for the data.

Notice that the initial link and incremental link follow the exact same steps. The only extra step done in incremental updates is handling the case when a data item must change location.

Object Code Storage

The object code and load module property are normal component properties, and as such, are stored like all other properties in the HOOPS database. However, the object code property describes the object code, but does not contain the actual bits. The actual bits are stored in segments owned by the load module property. The load module property maintains four different segments. These segments include: code, uninitialized data, initialized data, and linkage.

Figure 39:
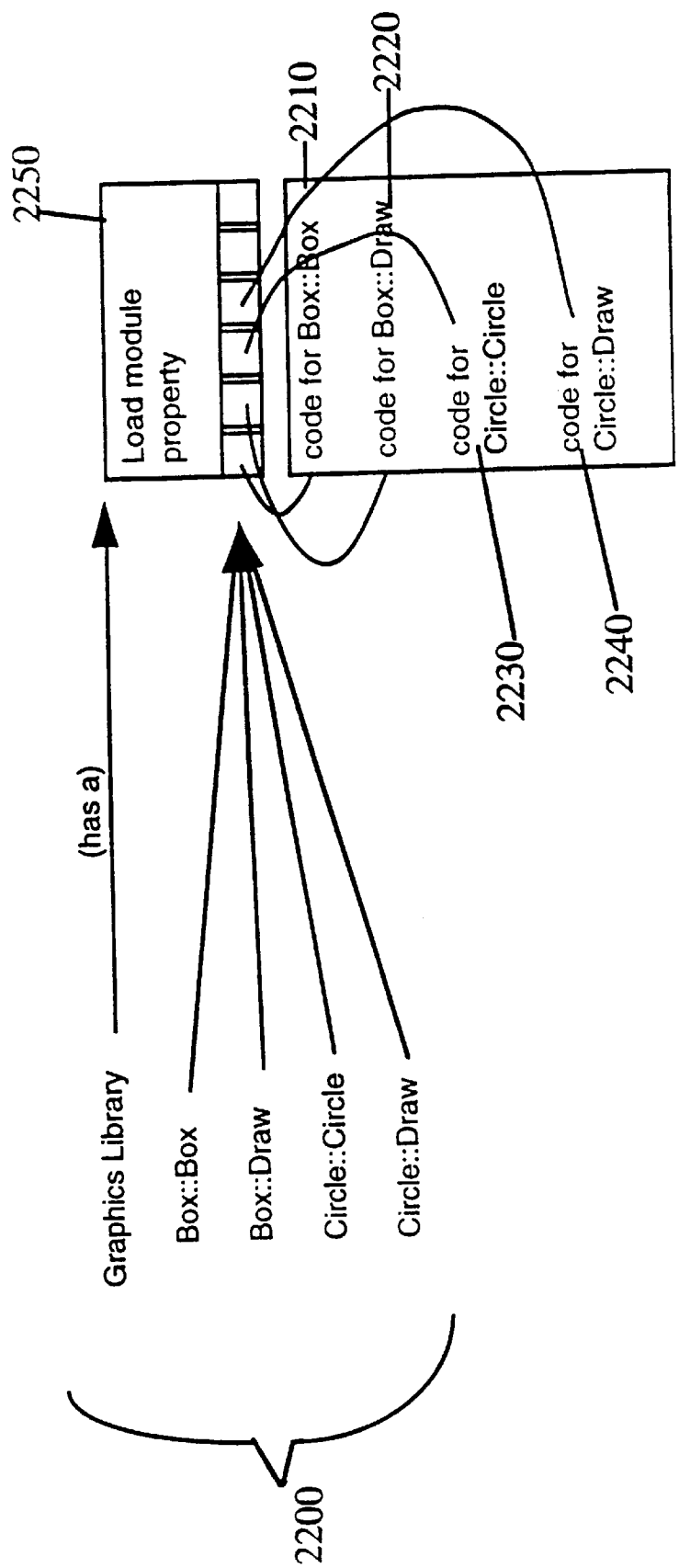
FIG. 39 illustrates the storage of object code in accordance with a preferred embodiment.

FIG. 39 illustrates the storage of object code in accordance with a preferred embodiment. Each of the graphic objects 2200 has an associated load module property 2250 containing the individual object code associated with the graphic objects 2210, 2220, 2230 and 2240. Since all code is linked as it is compiled, and support is provided for changing and incremental building, the load module property maintains a map of all the objects allocated in each segment. It also tries to keep extra space available for growth. This extra space wastes some virtual memory space, but does not occupy backing store or real memory. If during the process of repeatedly changing and building an application, the extra space is exhausted, additional space will be allocated, affected segments must be relocated, and all references into and out of that segment must be updated.

Figure 40:
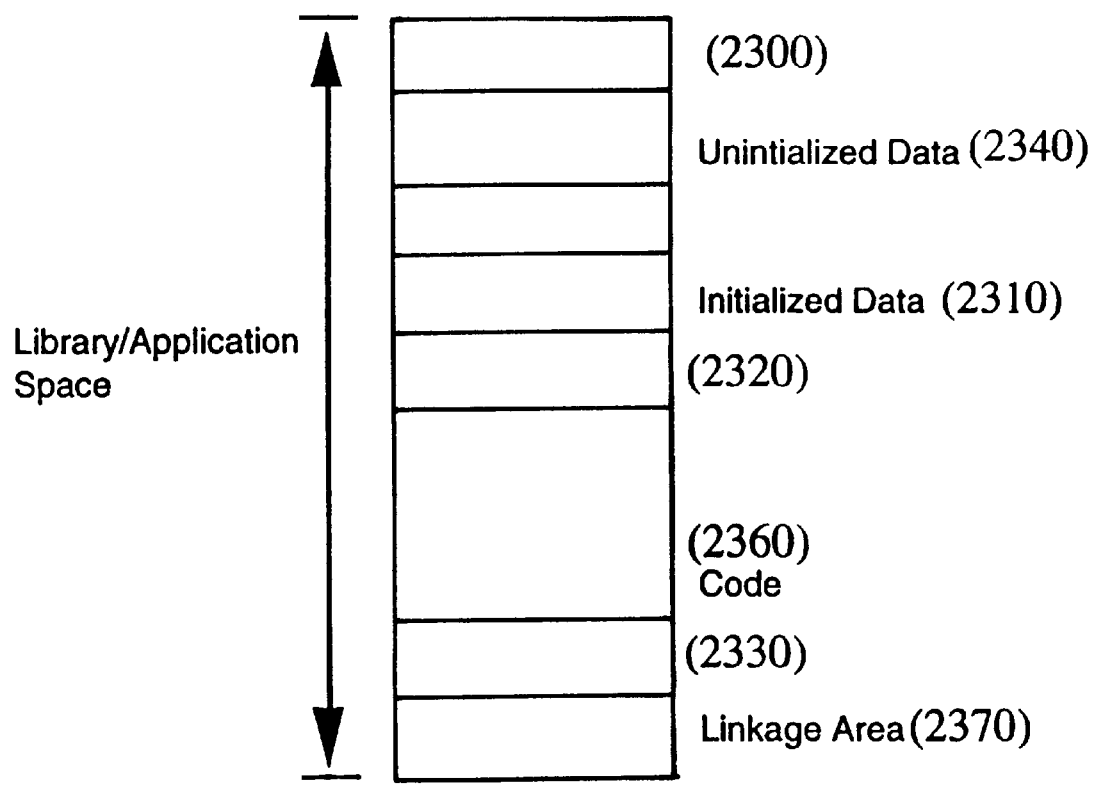
FIG. 40 illustrates a loaded library in accordance with a preferred embodiment.

FIG. 40 illustrates a loaded library in accordance with a preferred embodiment. The white sections 2300, 2310, 2320 and 2330 represent free space. Four sections are provided for uninitialized data 2340, initialized data 2350, code 2360 and a linkage area 2370. In HOOPS, the segments have no spatial relationship. Linking uses what will be the loaded relationship, not the relationship that they might have within HOOPS itself.

Loading

To run a program, the loader must be given a streamed TLoadModule class. During program building, a streamed TLoadModule class is created. When loaded, it loads the segments created in HOOPS. The segments are shared between the loaded application and HOOPS. This provides two benefits: first, it greatly reduces the amount of copying that must be done, and second it allows for incremental updates while the program is loaded.

Streams must be written from start to finish, since the loader requires a streamed TLoadModule class, the TIncrementalLoadModule attempts to reduce the amount of information streamed. This means that for most changes in a program, the TIncrementalLoadModule will not have to be re-streamed. The TIncrementalLoadModule gets all the mapping information from HOOPS through the use of a shared heap. Otherwise, any change in data location, or function size would require a new TIncrementalLoadModule to be built and streamed. FIG. 41 is a memory map of a load module in accordance with a preferred embodiment.

Incremental Updates

Incremental linking facilitates modification of a loaded library without removing it from execution. This requires changes made in HOOPS to be reflected in the address space of the running application. This will be handled by loading the library as a shared segment. Any modifications made on the HOOPS side will be reflected on the running application side. Remember that on the HOOPS side, the segment is interpreted as a portion of the HOOPS database, on the application side, it is just a segment that contains object code.

The model for active program modification is as follows. The Debugger 48 first stops execution, modified functions are compiled, and located at different locations even if they fit in their current location, the internal linkage area is updated, and the program is continued. If a modified function was active on the stack, the old version will execute until the next invocation of that function. An alternative is to kill the program if active functions are modified.

Publishing a Program

When an application is published, the linker will copy all object code to a file outside of the database. As the segments are copied to an external file, the linker will relocate and patch all the functions. In addition, all internal calls will become direct calls, and the internal linkage area will be removed. Besides just relocating and linking the object code, the linker must include the metadata necessary for virtual table creation. Notice that this step is essentially a relink, the Compiler 42 is not involved.

Once the segments are copied, the DraftID used to create the components are written into the load module. This DraftID is used later to allow the HOOPS system and Debugger 48 to retrieve all components that were used to build the system.

A second style of publishing is also required, the style is referred to as a quick publish. A quick publish copies the required segments from the database to an external file. The purpose of this second publish is to support quick turnaround for cross development, or shared work.

Implementation Details

```
enum EObjectKind        { kCode, kData, kStaticCtor,
kStaticDtor };
class TObjectProperty :  public TProperty {
public:
                         TObjectProperty();
    virtual              ~TObjectProperty();
//  Compiler Interface
    virtual void         WriteBits(EObjectKind whichOne,
LinkSize length,
        void* theBits, unsigned short alignment);
    virtual void         AdoptFixup (EObjectKind whichOne,
TFixup* theFixup);
//  Getting/Setting
    void*                CopyBits(EObjectKind whichOne) const;
    LinkOffset           GetOffset(EObjectKind whichOne) const;
    LinkSize             GetLength(EObjectKind whichOne) const;
    ELinkSegment         GetLinkSegment (EObjectKind whichOne)
const;
    Boolean              Contains(EObjectKind whichOne) const;
    virtual EObjectKind  GetPublicKind() const = 0;
//  Linking
    virtual void         GetLocation(EObjectKind whichOne,
TLocation&   fillInLocation) const;
    TIterator*           CreateFixupIterator() const;
};
```

The object code property delegates the fixup work to individual fixup objects.

```
class TFixup {
public:
    void      DoFixup(void* moduleBase) = 0;
private:
    TComponent* fReference;
    long      fOffset;
};
```

Derived from TFixup are the classes TPCRelativeFixup, TAbsoluteFixup, and TDataRelativeFixup. Each fixup class understands how to perform the appropriate patching for its type. This is completely different than the normal compiler/ linker interaction where the linker must interpret different bits to decide what action to take. Another advantage of this approach is that a new compiler for a new architecture doesn't have to worry about a fixup type not being supported in the linker.

Reference Types

The linker must handle 4 types of references. They are code-to-code, code-to-data, data-to-code, and data-to-data. The way each type of reference is handled (for 68 K) is described below:

Code-to-Code

Example: Foo( )

The Compiler 42 handles this case in two different ways depending on the context. It can either go pc-relative to Foo( ), or it can load the address of Foo( ), and go indirect through a register. Any internal call can use either style. The linker will always report the address of the linkage area. Cross-library calls must use the load address of style. These will use absolute addresses that will be patched at load time.

Code-to-Data

Example: gValue=1;

The Compiler 42 will generate a pc-relative access to gValue. However, if gValue is in a different shared library, the Compiler 42 will automatically generate an indirection. The linker will catch the indirect reference and provide a local address which will be patched with the external address at load time.

Data-to-Code & Data-to-Data

Example (Data-to-Code): void (*pfn)( )=Foo;

Example (Data-to-Data): int& pi=i;

Since both of these references require absolute addresses, they will be handled during loading. The patching of data references at load time will be handled just like the patching of external references.

FIG. 42 shows what happens in each type of reference. All of these cases show the internal usage case. If an external library references these same components, this library will receive several GetExportAddress( ) calls at load time. In response to the GetExportAddress( ), a library will return the internal linkage area address for functions, and the real address for data. This allows the functions to move around while the library is loaded.

Linkage Areas

The internal linkage area is completely homogeneous (each entry is: JMP address). The external area has different types of entries. A normal function call will have a jump instruction in the linkage area, while a virtual function call will have a thunk that indexes into the virtual table. Pointers to member functions have a different style of thunk.

While the invention has been described in terms of a preferred embodiment in a specific programming environment, those skilled in the art will recognize that the invention can be practiced with modification within the spirit and scope of the appended claims.

What is claimed is:

1. A method for enabling the dynamic generation of debugging information in a computer system having a memory, a display, a program counter with a value, and a debugger operational during debugging to detect a halt in execution of a program that includes a plurality of named components stored in the memory, each component including an attribute representing the validity of the component data, source code for implementing properties of the component and object code for executing the component, the method comprising the steps of:

(a) providing class libraries for retention in the memory from which may be instantiated
  (1) a database functionally for persistently storing and retrieving the named components in the memory,
  (2) a compiler functionality for calculating dependencies associated with each component and for compiling source code of the each component to obtain component object code, and
  (3) a build functionality for sequencing the compilation of components responsive to the component properties and dependencies:

(b) providing a run-time environment to
  (1) support the instantiation of the database, compiler and build functionalities; and
  (2) support the execution of the debugger and the program such that
    (i) when program execution halts during debugging, using the program counter value to locate a component in the memory,
    (ii) checking the attribute of the located component to ascertain the validity of symbolic debugging information relating the located component object code to the located component source code,
    (iii) generating new symbolic debugging information by compiling the located component source code when the symbolic debugging information is not valid, and
    (iv) associating valid symbolic debugging information with the located component.

2. The method in claim 1 wherein step (b)(2)(i) further comprises the steps of:
  (1) using the program counter value to address a cache memory; and
  (2) obtaining a component name from the cache memory.

3. The method in claim 2 wherein step (b)(2)(i) further comprises the steps of:
  (3) converting the program counter value into a component name when the cache memory does not contain a component name at a location addressed by the program counter value; and
  (4) storing the component name determined in step (b)(2)(i)(3) in the cache memory.

4. The method in claim 1 wherein step (b)(2)(iii) further comprises the steps of:
  (1) using the compiler functionality to create, as part of the symbolic debugging information, at least one map representing a relation between the located component object code and the located component source code; and
  (2) associating the at least one map with the located component.

5. The method in claim 4 wherein the program is constructed as a collection of components with dependencies among them, each component having an interface and an implementation and wherein step (b)(2)(iii) further comprises the step of:
  (3) recompiling the source code for the located component and all components having a dependency with the located component.

6. The method in claim 5 wherein step (b)(2)(iii) further comprises the step of:
  (4) updating the original symbolic debugging information responsive to the recompiling step (b)(2)(iii)(3).

7. The method in claim 1 wherein step (b)(2) further comprises the step of:

(v) executing a browser program that uses the symbolic debugging information from step(b)(2)(iii) to present the located component source code on the display when the program execution halts during debugging in response to an exception generated by a thread of execution in the program.

8. The method in claim 7 wherein step (b)(2)(v) further comprises the steps of:

(1) accepting, as an input to the browser program, data representing the thread of execution that generated the exception.

* * * * *